United States Patent
Bradwell et al.

(10) Patent No.: US 11,411,254 B2
(45) Date of Patent: Aug. 9, 2022

(54) MOLTEN SALT BATTERY WITH SOLID METAL CATHODE

(71) Applicant: Ambri Inc., Marlborough, MA (US)

(72) Inventors: David J. Bradwell, Arlington, MA (US); Gregory A. Thompson, Cambridge, MA (US); Alex T. Vai, Sudbury, MA (US); Steve Onorato, Woburn, MA (US); Alexander W. Elliott, Billerica, MA (US); Jianyi Cui, Andover, MA (US); Jennifer Cocking, Cambridge, MA (US); Allan Blanchard, Boston, MA (US); Jeff Miller, Brookline, MA (US); David A. H. McCleary, Watertown, MA (US); William Timson, Walpole, MA (US); Ian Redfern, Cambridge, MA (US)

(73) Assignee: Ambri Inc., Marlborough, MA (US)

( * ) Notice: Subject to any disclaimer, the term of this patent is extended or adjusted under 35 U.S.C. 154(b) by 378 days.

(21) Appl. No.: 16/593,278

(22) Filed: Oct. 4, 2019

(65) Prior Publication Data

US 2020/0176824 A1     Jun. 4, 2020

Related U.S. Application Data

(63) Continuation of application No. PCT/US2018/026601, filed on Apr. 6, 2018.
(Continued)

(51) Int. Cl.
    *H01M 10/39* (2006.01)
    *H01M 10/44* (2006.01)

(52) U.S. Cl.
    CPC ........ *H01M 10/399* (2013.01); *H01M 10/44* (2013.01); *H01M 2300/0057* (2013.01)

(58) Field of Classification Search
    None
    See application file for complete search history.

(56) References Cited

U.S. PATENT DOCUMENTS

| | | |
|---|---|---|
| 11,374 A | 7/1854 | Leue |
| 2,587,443 A | 2/1952 | Crabtree |
| (Continued) | | |

FOREIGN PATENT DOCUMENTS

| | | |
|---|---|---|
| AU | 2014229643 A1 | 9/2015 |
| AU | 2016225020 A1 | 9/2017 |
| (Continued) | | |

OTHER PUBLICATIONS

Advisory Action Before Filing of Appeal Brief dated May 10, 2012 for U.S. Appl. No. 12/839,130.
(Continued)

*Primary Examiner* — Leigh M Garbowski
(74) *Attorney, Agent, or Firm* — Wilson Sonsini Goodrich & Rosati

(57) ABSTRACT

The present disclosure provides an energy storage device comprising at least one electrochemical cell comprising a negative current collector, a negative electrode in electrical communication with the negative current collector, an electrolyte in electrical communication with the negative electrode, a positive current collector, and a positive electrode in electrical communication with the positive current collector and electrolyte. The positive electrode comprises a material that is solid at the operating temperature of the energy storage device.

20 Claims, 10 Drawing Sheets

Related U.S. Application Data

(60) Provisional application No. 62/483,208, filed on Apr. 7, 2017.

(56) References Cited

U.S. PATENT DOCUMENTS

| | | |
|---|---|---|
| 3,057,946 A | 10/1962 | Eidensohn |
| 3,238,437 A | 3/1966 | Foster et al. |
| 3,245,836 A | 4/1966 | Agruss |
| 3,404,035 A | 10/1968 | Kummer et al. |
| 3,419,432 A | 12/1968 | Hesson |
| 3,488,221 A | 1/1970 | Hiroshi et al. |
| 3,507,703 A | 4/1970 | Laszlo |
| 3,535,214 A | 10/1970 | Rene |
| 3,588,573 A | 6/1971 | Chen et al. |
| 3,607,405 A | 9/1971 | Harold |
| 3,607,407 A | 9/1971 | Harry |
| 3,635,765 A | 1/1972 | Jacob |
| 3,663,295 A | 5/1972 | Baker |
| 3,716,409 A | 2/1973 | Cairns et al. |
| 3,770,506 A | 11/1973 | Rightmire et al. |
| 3,775,181 A | 11/1973 | Ryerson |
| 3,833,420 A | 9/1974 | Will |
| 3,833,421 A | 9/1974 | Rubischko et al. |
| 3,833,422 A | 9/1974 | Will et al. |
| 3,837,918 A | 9/1974 | Nakabayashi |
| 3,870,561 A | 3/1975 | Charbonnier et al. |
| 3,877,984 A | 4/1975 | Werth |
| 3,878,296 A | 4/1975 | Vine et al. |
| 3,884,715 A | 5/1975 | Gay et al. |
| 3,887,396 A | 6/1975 | Walsh et al. |
| 3,898,096 A | 8/1975 | Heredy et al. |
| 3,907,589 A | 9/1975 | Gay et al. |
| 3,915,742 A | 10/1975 | Battles et al. |
| 3,926,673 A | 12/1975 | Saridakis |
| 3,930,888 A | 1/1976 | Bowser et al. |
| 3,933,521 A | 1/1976 | Vissers et al. |
| 3,941,612 A | 3/1976 | Steunenberg et al. |
| 3,947,291 A | 3/1976 | Yao et al. |
| 3,954,504 A | 5/1976 | Zellhoefer |
| 3,959,012 A | 5/1976 | Liang et al. |
| 3,960,594 A | 6/1976 | Fritz et al. |
| 3,969,139 A | 7/1976 | Lai |
| 3,980,495 A | 9/1976 | Roche et al. |
| 3,988,164 A | 10/1976 | Liang et al. |
| 4,002,807 A | 1/1977 | Ludwig |
| 4,011,374 A | 3/1977 | Kaun |
| 4,015,054 A | 3/1977 | Cleaver et al. |
| 4,018,969 A | 4/1977 | Fischer et al. |
| 4,029,860 A | 6/1977 | Vissers et al. |
| 4,032,614 A | 6/1977 | Lewis |
| 4,044,194 A | 8/1977 | Evans et al. |
| 4,060,667 A | 11/1977 | Askew et al. |
| 4,061,841 A | 12/1977 | Sharma et al. |
| 4,065,602 A | 12/1977 | Roche et al. |
| 4,069,372 A | 1/1978 | Voinov |
| 4,107,401 A | 8/1978 | Goodson et al. |
| 4,125,683 A | 11/1978 | Beckford et al. |
| 4,130,500 A | 12/1978 | Melendres et al. |
| 4,164,608 A | 8/1979 | Coetzer |
| 4,169,120 A | 9/1979 | Miller |
| 4,189,529 A | 2/1980 | Birt et al. |
| 4,195,123 A | 3/1980 | Jumel |
| RE30,353 E | 7/1980 | Voinov |
| 4,216,273 A | 8/1980 | Cadart et al. |
| 4,238,553 A | 12/1980 | Gerlach et al. |
| 4,265,984 A | 5/1981 | Kaye |
| 4,287,268 A | 9/1981 | Coetzer |
| 4,287,269 A | 9/1981 | Coetzer et al. |
| 4,299,890 A | 11/1981 | Rea et al. |
| 4,315,974 A | 2/1982 | Athearn et al. |
| 4,338,380 A | 7/1982 | Erickson et al. |
| 4,360,574 A | 11/1982 | Park |
| 4,367,159 A | 1/1983 | Mrazek et al. |
| 4,405,433 A | 9/1983 | Payne |
| 4,407,912 A | 10/1983 | Virkar et al. |
| 4,457,989 A | 7/1984 | Coetzer |
| 4,510,210 A | 4/1985 | Hunt |
| 4,565,751 A | 1/1986 | Faust et al. |
| 4,582,553 A | 4/1986 | Buchta |
| 4,588,663 A | 5/1986 | Mason et al. |
| 4,596,637 A | 6/1986 | Kozarek et al. |
| 4,622,111 A | 11/1986 | Brown et al. |
| 4,657,830 A | 4/1987 | Kagawa |
| 4,692,390 A | 9/1987 | Roy |
| 4,764,437 A | 8/1988 | Kaun |
| 4,800,143 A | 1/1989 | Harbach et al. |
| 4,818,638 A | 4/1989 | Roy |
| 4,833,046 A | 5/1989 | Roy |
| 4,849,682 A | 7/1989 | Bauer et al. |
| 4,877,695 A | 10/1989 | Cipriano et al. |
| 4,886,715 A | 12/1989 | McCullough, Jr. et al. |
| 4,929,521 A | 5/1990 | Cipriano et al. |
| 4,945,012 A | 7/1990 | Bugga et al. |
| 4,945,257 A | 7/1990 | Marrocco, III |
| H816 H | 9/1990 | Carder et al. |
| 4,954,403 A | 9/1990 | Plichta et al. |
| 4,965,146 A | 10/1990 | McCullough et al. |
| 4,975,344 A | 12/1990 | Wedlake et al. |
| 4,999,097 A | 3/1991 | Sadoway |
| 5,011,748 A | 4/1991 | Shacklette et al. |
| 5,024,737 A | 6/1991 | Claus et al. |
| 5,034,290 A | 7/1991 | Sands et al. |
| 5,039,351 A | 8/1991 | Cooper et al. |
| 5,044,551 A | 9/1991 | Tanaka et al. |
| 5,139,895 A | 8/1992 | Roy et al. |
| 5,185,068 A | 2/1993 | Sadoway |
| 5,198,638 A | 3/1993 | Massacesi |
| 5,254,232 A | 10/1993 | Sadoway |
| 5,284,562 A | 2/1994 | Beck et al. |
| 5,286,359 A | 2/1994 | Richards et al. |
| 5,369,547 A | 11/1994 | Evans |
| 5,380,406 A | 1/1995 | Horton et al. |
| 5,392,191 A | 2/1995 | Thomas et al. |
| 5,407,119 A | 4/1995 | Churchill et al. |
| 5,429,895 A | 7/1995 | Lian et al. |
| 5,469,325 A | 11/1995 | Evans |
| 5,476,733 A | 12/1995 | Coetzer et al. |
| 5,491,037 A | 2/1996 | Kawakami |
| 5,532,078 A | 7/1996 | Redey et al. |
| 5,536,600 A | 7/1996 | Kaun |
| 5,538,813 A | 7/1996 | Li |
| 5,549,989 A | 8/1996 | Anani |
| 5,559,667 A | 9/1996 | Evans |
| 5,563,765 A | 10/1996 | Lian et al. |
| 5,578,389 A | 11/1996 | Tsuchimoto et al. |
| 5,587,872 A | 12/1996 | Lian et al. |
| 5,597,331 A | 1/1997 | Gable et al. |
| 5,604,053 A | 2/1997 | Coetzer et al. |
| 5,658,447 A | 8/1997 | Watson et al. |
| 5,661,403 A | 8/1997 | Mackenzie |
| 5,687,056 A | 11/1997 | Harshe et al. |
| 5,688,613 A | 11/1997 | Li et al. |
| 5,688,614 A | 11/1997 | Li et al. |
| 5,693,434 A | 12/1997 | Li et al. |
| 5,714,283 A | 2/1998 | Briscoe et al. |
| 5,716,731 A | 2/1998 | Coetzer et al. |
| 5,735,933 A | 4/1998 | Yokoyama et al. |
| 5,737,181 A | 4/1998 | Evans |
| 5,763,117 A | 6/1998 | Wright et al. |
| 5,798,308 A | 8/1998 | Chatterjee et al. |
| 5,807,412 A | 9/1998 | Li et al. |
| 5,834,131 A | 11/1998 | Lutz et al. |
| 5,856,041 A | 1/1999 | Inoue et al. |
| 5,874,183 A | 2/1999 | Uematsu |
| 5,939,221 A | 8/1999 | Tsuchimoto et al. |
| 5,972,533 A | 10/1999 | Coetzer et al. |
| 5,982,609 A | 11/1999 | Evans |
| 6,007,943 A | 12/1999 | Coetzer |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |

(56) References Cited

U.S. PATENT DOCUMENTS

| | | |
|---|---|---|
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh et al. |
| 6,387,153 B1 | 5/2002 | Burke |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |
| 6,498,406 B1 | 12/2002 | Hoeriuchi et al. |
| 6,517,605 B1 | 2/2003 | Bates et al. |
| 6,531,846 B1 | 3/2003 | Smith et al. |
| 6,548,212 B1 | 4/2003 | Heider et al. |
| 6,549,423 B1 | 4/2003 | Brodnick |
| 6,558,525 B1 | 5/2003 | Bradford et al. |
| 6,579,817 B2 | 6/2003 | Harada et al. |
| 6,585,929 B1 | 7/2003 | Bates et al. |
| 6,602,321 B2 | 8/2003 | Dry et al. |
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B2 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,255,937 B2 | 8/2007 | Park |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,513,219 B2 | 4/2009 | Louden |
| 7,554,220 B2 | 6/2009 | Sugawara |
| 7,568,537 B2 | 8/2009 | King et al. |
| 7,578,702 B1 | 8/2009 | Tom et al. |
| 7,603,144 B2 | 10/2009 | Jenson et al. |
| 7,612,537 B2 | 11/2009 | Wynne et al. |
| 7,632,604 B2 | 12/2009 | Iacovangelo et al. |
| 7,678,484 B2 | 3/2010 | Tao et al. |
| 7,776,190 B2 | 8/2010 | Hiltmann et al. |
| 7,776,191 B2 | 8/2010 | Hiltmann et al. |
| 7,776,478 B2 | 8/2010 | Klaassen |
| 7,808,131 B2 | 10/2010 | Hurst et al. |
| 7,858,228 B2 | 12/2010 | Yoon |
| 7,877,120 B2 | 1/2011 | Jacobs et al. |
| 7,883,796 B2 | 2/2011 | Kida et al. |
| 7,931,989 B2 | 4/2011 | Klaassen |
| 7,939,205 B2 | 5/2011 | Klaassen |
| 7,943,270 B2 | 5/2011 | Blake et al. |
| 8,034,484 B2 | 10/2011 | Inatomi et al. |
| 8,044,508 B2 | 10/2011 | Jenson et al. |
| 8,080,326 B2 | 12/2011 | Chan et al. |
| 8,101,293 B2 | 1/2012 | Chan et al. |
| 8,110,301 B2 | 2/2012 | Iacovangelo et al. |
| 8,142,569 B2 | 3/2012 | Kalynushkin et al. |
| 8,178,231 B2 | 5/2012 | Soloveichik et al. |
| 8,202,641 B2 | 6/2012 | Winter et al. |
| 8,219,140 B2 | 7/2012 | Jacobs et al. |
| 8,221,912 B2 | 7/2012 | Fujiwara |
| 8,236,440 B2 | 8/2012 | Bendert |
| 8,237,407 B2 | 8/2012 | Hurst et al. |
| 8,257,868 B2 | 9/2012 | Hagiwara et al. |
| 8,268,471 B2 | 9/2012 | Sadoway et al. |
| 8,281,877 B2 | 10/2012 | Shahin et al. |
| 8,298,701 B2 | 10/2012 | Whitacre et al. |
| 8,306,671 B1 | 11/2012 | Marcus |
| 8,311,681 B1 | 11/2012 | Marcus |
| 8,313,719 B2 | 11/2012 | Barker et al. |
| 8,323,816 B2 | 12/2012 | Bradwell et al. |
| 8,329,336 B2 | 12/2012 | Soloveichik et al. |
| 8,334,053 B2 | 12/2012 | Shapiro et al. |
| 8,343,646 B1 | 1/2013 | Wilkins et al. |
| 8,409,744 B2 | 4/2013 | Ijaz et al. |
| 8,436,489 B2 | 5/2013 | Stahlkopf et al. |
| 8,457,800 B2 | 6/2013 | Marcus |
| 8,459,314 B2 | 6/2013 | Frazier et al. |
| 8,460,814 B2 | 6/2013 | Deane et al. |
| 8,471,520 B2 | 6/2013 | Coe et al. |
| 8,475,954 B2 | 7/2013 | Ijaz et al. |
| 8,504,214 B2 | 8/2013 | Genc et al. |
| 8,537,581 B2 | 9/2013 | Wagoner et al. |
| 8,539,763 B2 | 9/2013 | McBride et al. |
| 8,568,915 B2 | 10/2013 | Fuhr et al. |
| 8,642,201 B2 | 2/2014 | Cheng et al. |
| 8,643,500 B2 | 2/2014 | Lee et al. |
| 8,652,672 B2 | 2/2014 | Whitacre et al. |
| 8,722,226 B2 | 5/2014 | Carter et al. |
| 8,764,962 B2 | 7/2014 | Allanore et al. |
| 8,766,642 B2 | 7/2014 | Bogdan, Jr. et al. |
| 8,806,866 B2 | 8/2014 | McBride et al. |
| 8,815,445 B2 | 8/2014 | Sugiura et al. |
| 9,000,713 B2 | 4/2015 | Boysen et al. |
| 9,035,617 B2 | 5/2015 | Parakulam et al. |
| 9,076,996 B2 | 7/2015 | Bradwell et al. |
| 9,106,980 B2 | 8/2015 | Parakulam et al. |
| 9,153,803 B2 | 10/2015 | Chung et al. |
| 9,312,522 B2 | 4/2016 | Bradwell et al. |
| 9,437,864 B2 * | 9/2016 | Tan ............ H01M 4/362 |
| 9,502,737 B2 | 11/2016 | Bradwell et al. |
| 9,520,618 B2 | 12/2016 | Bradwell et al. |
| 9,559,386 B2 | 1/2017 | Bradwell et al. |
| 9,728,814 B2 | 8/2017 | Bradwell et al. |
| 9,735,450 B2 | 8/2017 | Bradwell et al. |
| 9,787,119 B2 | 10/2017 | Yamauchi et al. |
| 9,825,265 B2 | 11/2017 | Bradwell et al. |
| 9,876,258 B2 | 1/2018 | Bradwell et al. |
| 9,893,385 B1 | 2/2018 | Nayar et al. |
| 9,925,881 B2 | 3/2018 | Manotas et al. |
| 10,181,800 B1 | 1/2019 | Nayar et al. |
| 10,270,139 B1 | 4/2019 | Deak et al. |
| 10,297,870 B2 | 5/2019 | Bradwell |
| 10,541,451 B2 | 1/2020 | Bradwell et al. |
| 10,566,662 B1 | 2/2020 | Nayar et al. |
| 10,608,212 B2 | 3/2020 | Bradwell et al. |
| 10,637,015 B2 | 4/2020 | Thompson et al. |
| 10,903,528 B2 | 1/2021 | Ouchi et al. |
| 2002/0009649 A1 | 1/2002 | Sato et al. |
| 2002/0012833 A1 | 1/2002 | Gow et al. |
| 2002/0051912 A1 | 5/2002 | Fitter et al. |
| 2002/0064704 A1 | 5/2002 | Thackeray et al. |
| 2003/0008212 A1 | 1/2003 | Akashi et al. |
| 2003/0044686 A1 | 3/2003 | Bushong et al. |
| 2003/0052646 A1 | 3/2003 | Minamiura et al. |
| 2003/0186111 A1 | 10/2003 | Tamakoshi |
| 2003/0196908 A1 | 10/2003 | Brown |
| 2003/0203279 A1 | 10/2003 | Tsukamoto et al. |

(56) References Cited

U.S. PATENT DOCUMENTS

| | | |
|---|---|---|
| 2003/0207161 A1 | 11/2003 | Rusta-Sallehy et al. |
| 2003/0228520 A1 | 12/2003 | Kaun |
| 2004/0061841 A1 | 4/2004 | Black et al. |
| 2004/0076885 A1 | 4/2004 | Sato et al. |
| 2004/0229116 A1 | 11/2004 | Malinski et al. |
| 2004/0258953 A1 | 12/2004 | Kido et al. |
| 2005/0079411 A1 | 4/2005 | Kairawicz et al. |
| 2005/0237029 A1 | 10/2005 | Takezawa et al. |
| 2005/0238954 A1 | 10/2005 | Kawada |
| 2006/0127735 A1 | 6/2006 | Sabin et al. |
| 2006/0151333 A1 | 7/2006 | Banek |
| 2006/0187614 A1 | 8/2006 | Ushio et al. |
| 2007/0067119 A1 | 3/2007 | Loewen et al. |
| 2007/0184711 A1 | 8/2007 | Thrap et al. |
| 2007/0215483 A1 | 9/2007 | Johansen et al. |
| 2007/0252556 A1 | 11/2007 | West et al. |
| 2008/0023321 A1 | 1/2008 | Sadoway |
| 2008/0044725 A1 | 2/2008 | Sadoway et al. |
| 2008/0050295 A1 | 2/2008 | Uchida et al. |
| 2008/0053838 A1 | 3/2008 | Yamaguchi et al. |
| 2008/0118428 A1 | 5/2008 | Awano et al. |
| 2008/0145755 A1 | 6/2008 | Iacovangelo et al. |
| 2008/0241689 A1 | 10/2008 | Takami et al. |
| 2008/0264565 A1 | 10/2008 | Sun et al. |
| 2008/0308415 A1 | 12/2008 | Hiltmann et al. |
| 2009/0011331 A1 | 1/2009 | Stringer et al. |
| 2009/0014320 A1 | 1/2009 | Chiang et al. |
| 2009/0029236 A1 | 1/2009 | Mailley et al. |
| 2009/0162736 A1 | 6/2009 | Vallance et al. |
| 2009/0208836 A1 | 8/2009 | Fuhr et al. |
| 2009/0212743 A1 | 8/2009 | Hagiwara et al. |
| 2009/0253017 A1 | 10/2009 | Larsen et al. |
| 2009/0297892 A1 | 12/2009 | Ijaz et al. |
| 2010/0028723 A1 | 2/2010 | Haba |
| 2010/0047671 A1 | 2/2010 | Chiang et al. |
| 2010/0058578 A1 | 3/2010 | Vallance et al. |
| 2010/0068610 A1 | 3/2010 | Sudworth |
| 2010/0089547 A1 | 4/2010 | King et al. |
| 2010/0119847 A1 | 5/2010 | Wu et al. |
| 2010/0154205 A1 | 6/2010 | Nakagawa et al. |
| 2010/0178532 A1 | 7/2010 | Shapiro et al. |
| 2010/0233518 A1 | 9/2010 | Kwon et al. |
| 2010/0240517 A1 | 9/2010 | Ashkin et al. |
| 2010/0243017 A1 | 9/2010 | Normann et al. |
| 2010/0291443 A1 | 11/2010 | Farmer |
| 2011/0014503 A1 | 1/2011 | Bradwell et al. |
| 2011/0014505 A1 | 1/2011 | Bradwell et al. |
| 2011/0020694 A1 | 1/2011 | Khakhalev et al. |
| 2011/0027624 A1 | 2/2011 | Deane et al. |
| 2011/0027627 A1 | 2/2011 | Deane et al. |
| 2011/0027633 A1 | 2/2011 | Deane et al. |
| 2011/0027637 A1 | 2/2011 | Deane et al. |
| 2011/0027638 A1 | 2/2011 | Deane et al. |
| 2011/0027639 A1 | 2/2011 | Deane et al. |
| 2011/0048066 A1 | 3/2011 | Gielda et al. |
| 2011/0050235 A1 | 3/2011 | Bogdan, Jr. et al. |
| 2011/0052968 A1 | 3/2011 | Venkataramani et al. |
| 2011/0086258 A1 | 4/2011 | Yaginuma et al. |
| 2011/0104570 A1 | 5/2011 | Galloway et al. |
| 2011/0111296 A1 | 5/2011 | Berdichevsky et al. |
| 2011/0135975 A1 | 6/2011 | Fuhr et al. |
| 2011/0144861 A1 | 6/2011 | Lakirovich et al. |
| 2011/0177413 A1 | 7/2011 | Tao et al. |
| 2011/0189520 A1 | 8/2011 | Carter et al. |
| 2011/0200848 A1 | 8/2011 | Chiang et al. |
| 2011/0262794 A1 | 10/2011 | Yoon |
| 2012/0003508 A1 | 1/2012 | Narbonne et al. |
| 2012/0003513 A1 | 1/2012 | Fuhr |
| 2012/0015235 A1 | 1/2012 | Fuhr et al. |
| 2012/0077095 A1 | 3/2012 | Roumi et al. |
| 2012/0086128 A1 | 4/2012 | Ponoth et al. |
| 2012/0091806 A1 | 4/2012 | Tsutsumi et al. |
| 2012/0094194 A1 | 4/2012 | Visco et al. |
| 2012/0104990 A1 | 5/2012 | Boysen et al. |
| 2012/0107675 A1 | 5/2012 | Kim et al. |
| 2012/0125784 A1 | 5/2012 | Berlin et al. |
| 2012/0129056 A1 | 5/2012 | Majima et al. |
| 2012/0146585 A1 | 6/2012 | Darcy |
| 2012/0161083 A1 | 6/2012 | Jha et al. |
| 2012/0171524 A1 | 7/2012 | Hiraiwa et al. |
| 2012/0183838 A1 | 7/2012 | An et al. |
| 2012/0190252 A1 | 7/2012 | Pavlinsky et al. |
| 2012/0191262 A1 | 7/2012 | Marcus |
| 2012/0194140 A1 | 8/2012 | Rijssenbeek et al. |
| 2012/0196170 A1 | 8/2012 | Ijaz et al. |
| 2012/0217032 A1 | 8/2012 | Beaupre et al. |
| 2012/0244404 A1 | 9/2012 | Obasih et al. |
| 2012/0244418 A1 | 9/2012 | Cheng et al. |
| 2012/0263988 A1 | 10/2012 | Obasih et al. |
| 2012/0264021 A1 | 10/2012 | Sugiura et al. |
| 2012/0265397 A1 | 10/2012 | Aliberti et al. |
| 2012/0282501 A1 | 11/2012 | Haynes et al. |
| 2012/0282508 A1 | 11/2012 | Bendert |
| 2012/0297772 A1 | 11/2012 | Mcbride et al. |
| 2012/0319653 A1 | 12/2012 | Kumar et al. |
| 2012/0328910 A1 | 12/2012 | La et al. |
| 2012/0328930 A1 | 12/2012 | Inagaki et al. |
| 2012/0328935 A1 | 12/2012 | Matsui et al. |
| 2013/0009602 A1 | 1/2013 | Hoff et al. |
| 2013/0017417 A1 | 1/2013 | Whitacre et al. |
| 2013/0022845 A1 | 1/2013 | Davis et al. |
| 2013/0022852 A1 | 1/2013 | Chang et al. |
| 2013/0029195 A1 | 1/2013 | Peace |
| 2013/0045408 A1 | 2/2013 | Sadoway et al. |
| 2013/0049466 A1 | 2/2013 | Adams et al. |
| 2013/0049478 A1 | 2/2013 | Wagoner et al. |
| 2013/0055559 A1 | 3/2013 | Slocum et al. |
| 2013/0057220 A1 | 3/2013 | Whitacre |
| 2013/0059176 A1 | 3/2013 | Stefani et al. |
| 2013/0059185 A1 | 3/2013 | Whitacre et al. |
| 2013/0065122 A1 | 3/2013 | Chiang et al. |
| 2013/0069001 A1 | 3/2013 | Luo et al. |
| 2013/0071306 A1 | 3/2013 | Camp et al. |
| 2013/0073234 A1 | 3/2013 | Leport et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0084474 A1 | 4/2013 | Mills |
| 2013/0119937 A1 | 5/2013 | Arseneault et al. |
| 2013/0130085 A1 | 5/2013 | Choi |
| 2013/0134928 A1 | 5/2013 | Uchihashi et al. |
| 2013/0136980 A1 | 5/2013 | Bartling |
| 2013/0143139 A1 | 6/2013 | Tao et al. |
| 2013/0145764 A1 | 6/2013 | Mcbride et al. |
| 2013/0149567 A1 | 6/2013 | Schaefer |
| 2013/0166085 A1 | 6/2013 | Cherian et al. |
| 2013/0183544 A1 | 7/2013 | Yoshioka et al. |
| 2013/0295435 A1 | 11/2013 | Vu |
| 2013/0315659 A1 | 11/2013 | Kumar et al. |
| 2014/0000251 A1 | 1/2014 | McBride et al. |
| 2014/0038011 A1 | 2/2014 | Fukunaga et al. |
| 2014/0038012 A1 | 2/2014 | Alimario et al. |
| 2014/0038038 A1 | 2/2014 | Vallance et al. |
| 2014/0099522 A1 | 4/2014 | Spatocco et al. |
| 2014/0113181 A1 | 4/2014 | Bradwell et al. |
| 2014/0162090 A1 | 6/2014 | Whitacre et al. |
| 2014/0176147 A1 | 6/2014 | Wiegman et al. |
| 2014/0220428 A1 | 8/2014 | Zinck et al. |
| 2014/0242466 A1 | 8/2014 | Murashi et al. |
| 2014/0248521 A1 | 9/2014 | Chiang et al. |
| 2014/0272481 A1 | 9/2014 | Chung et al. |
| 2014/0272508 A1 | 9/2014 | Musetti |
| 2014/0277791 A1 | 9/2014 | Lenard et al. |
| 2014/0315097 A1 | 10/2014 | Tan et al. |
| 2014/0349159 A1 | 11/2014 | Bartling et al. |
| 2014/0365027 A1 | 12/2014 | Namba et al. |
| 2015/0004455 A1 | 1/2015 | Bradwell et al. |
| 2015/0010792 A1 | 1/2015 | Amendola et al. |
| 2015/0015210 A1 | 1/2015 | Bradwell et al. |
| 2015/0037670 A1 | 2/2015 | Tanaka et al. |
| 2015/0093614 A1 | 4/2015 | Fukuhara et al. |
| 2015/0132627 A1 | 5/2015 | Bradwell et al. |

(56) References Cited

U.S. PATENT DOCUMENTS

| | | | |
|---|---|---|---|
| 2015/0132628 | A1 | 5/2015 | Bradwell et al. |
| 2015/0214579 | A1 | 7/2015 | Boysen et al. |
| 2015/0249273 | A1 | 9/2015 | Bradwell et al. |
| 2015/0249274 | A1 | 9/2015 | Bradwell et al. |
| 2015/0280480 | A1 | 10/2015 | Mitri et al. |
| 2015/0303525 | A1 | 10/2015 | Bradwell et al. |
| 2015/0318586 | A1 | 11/2015 | Rahmane et al. |
| 2015/0325821 | A1 | 11/2015 | Bradwell et al. |
| 2015/0380713 | A1 | 12/2015 | Kimura et al. |
| 2016/0006090 | A1 | 1/2016 | Licht |
| 2016/0156068 | A1 | 6/2016 | Burke et al. |
| 2016/0172714 | A1 | 6/2016 | Ouchi et al. |
| 2016/0186235 | A1 | 6/2016 | Joseph et al. |
| 2016/0190607 | A1 | 6/2016 | Wyser et al. |
| 2016/0211555 | A9 | 7/2016 | Bradwell et al. |
| 2016/0254512 | A1 | 9/2016 | Yin et al. |
| 2016/0301038 | A1 | 10/2016 | Modest et al. |
| 2016/0336623 | A1 | 11/2016 | Nayar et al. |
| 2016/0344066 | A1 | 11/2016 | Sudworth et al. |
| 2016/0365612 | A1 | 12/2016 | Bradwell et al. |
| 2016/0372763 | A1 | 12/2016 | Lu et al. |
| 2017/0018811 | A1 | 1/2017 | Bradwell et al. |
| 2017/0104244 | A1 | 4/2017 | Bull et al. |
| 2017/0149095 | A1 | 5/2017 | Amendola et al. |
| 2017/0222273 | A1 | 8/2017 | Bradwell et al. |
| 2017/0248041 | A1 | 8/2017 | Lenk et al. |
| 2017/0259648 | A1 | 9/2017 | Putcha et al. |
| 2017/0263951 | A1 | 9/2017 | Kanno et al. |
| 2017/0309979 | A1 | 10/2017 | Lee et al. |
| 2017/0338451 | A9 | 11/2017 | Bradwell et al. |
| 2017/0358941 | A1 | 12/2017 | Mitri et al. |
| 2018/0034110 | A1 | 2/2018 | Sudworth et al. |
| 2018/0083274 | A1 | 3/2018 | Martin |
| 2018/0090726 | A1 | 3/2018 | Thompson et al. |
| 2018/0097259 | A1 | 4/2018 | Bradwell et al. |
| 2018/0191162 | A1 | 7/2018 | Hanada et al. |
| 2019/0089013 | A1 | 3/2019 | Ouchi et al. |
| 2019/0115632 | A1 | 4/2019 | Beuning et al. |
| 2019/0123369 | A1 | 4/2019 | Ma et al. |
| 2019/0296276 | A1 | 9/2019 | Bradwell et al. |
| 2020/0076006 | A1 | 3/2020 | Bradwell et al. |
| 2020/0287247 | A1 | 9/2020 | Bradwell et al. |
| 2021/0036273 | A1 | 2/2021 | Thompson et al. |
| 2021/0043982 | A1 | 2/2021 | Bradwell et al. |
| 2021/0376394 | A1 | 12/2021 | Bradwell et al. |
| 2022/0013835 | A1 | 1/2022 | Bradwell et al. |
| 2022/0077508 | A1 | 3/2022 | Nayar et al. |

FOREIGN PATENT DOCUMENTS

| | | |
|---|---|---|
| CA | 2767920 A1 | 1/2011 |
| CA | 2811218 A1 | 3/2012 |
| CA | 2887201 A1 | 4/2014 |
| CH | 703320 B1 | 12/2011 |
| CN | 1429417 A | 7/2003 |
| CN | 1578553 A | 2/2005 |
| CN | 1743056 A | 3/2006 |
| CN | 1750309 A | 3/2006 |
| CN | 101436780 A | 5/2009 |
| CN | 101506117 A | 8/2009 |
| CN | 101519313 A | 9/2009 |
| CN | 101828285 A | 9/2010 |
| CN | 101942676 A | 1/2011 |
| CN | 201809448 U | 4/2011 |
| CN | 201908137 U | 7/2011 |
| CN | 102181883 A | 9/2011 |
| CN | 202076339 U | 12/2011 |
| CN | 102498589 A | 6/2012 |
| CN | 102646808 A | 8/2012 |
| CN | 103001239 A | 3/2013 |
| CN | 202797170 U | 3/2013 |
| CN | 103137916 A | 6/2013 |
| CN | 103342556 A | 10/2013 |
| CN | 103367663 A | 10/2013 |
| CN | 104364930 A | 2/2015 |
| CN | 105190984 A | 12/2015 |
| CN | 105659415 A | 6/2016 |
| CN | 105830247 A | 8/2016 |
| DE | 3239964 A1 | 5/1984 |
| DE | 19618609 A1 | 11/1997 |
| DE | 102012103386 A1 | 10/2013 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| EP | 2665120 A1 | 11/2013 |
| EP | 2709188 A1 | 3/2014 |
| GB | 2062939 A | 5/1981 |
| JP | S4933815 B1 | 9/1974 |
| JP | S5268929 A | 6/1977 |
| JP | S55053877 A1 | 4/1980 |
| JP | S61114664 A | 6/1986 |
| JP | H06223872 A | 8/1994 |
| JP | H06310171 A | 11/1994 |
| JP | H09167631 A | 6/1997 |
| JP | H1012270 A | 1/1998 |
| JP | H10208771 A | 8/1998 |
| JP | H117923 A | 1/1999 |
| JP | H11185800 A | 7/1999 |
| JP | 2001115369 A | 4/2001 |
| JP | 2001243994 A | 9/2001 |
| JP | 3355377 B2 | 12/2002 |
| JP | 2003146771 A | 5/2003 |
| JP | 2007157373 A | 6/2007 |
| JP | 2010206101 A | 9/2010 |
| JP | 2010214396 A | 9/2010 |
| JP | 2010535942 A | 11/2010 |
| JP | 2011508379 A | 3/2011 |
| JP | 2012124009 A | 6/2012 |
| JP | 2012226866 A | 11/2012 |
| JP | 2012533865 A | 12/2012 |
| JP | 2013055193 A | 3/2013 |
| JP | 2013537361 A | 9/2013 |
| JP | 2014154337 A | 8/2014 |
| JP | 2014526114 A | 10/2014 |
| JP | 2016510936 A | 4/2016 |
| JP | 2016535392 A | 11/2016 |
| KR | 20120059106 A | 6/2012 |
| RU | 2031491 C1 | 3/1995 |
| RU | 2013111960 A | 10/2014 |
| SG | 188400 A1 | 4/2013 |
| WO | WO-9965642 A1 | 12/1999 |
| WO | WO-0005774 A1 | 2/2000 |
| WO | WO-2008045996 A2 | 4/2008 |
| WO | WO-2008105807 A2 | 9/2008 |
| WO | WO-2008045996 A3 | 10/2008 |
| WO | WO-2008105811 A3 | 12/2008 |
| WO | WO-2009046533 A1 | 4/2009 |
| WO | WO-2009151639 A1 | 12/2009 |
| WO | WO-2010130583 A2 | 11/2010 |
| WO | WO-2011011056 A1 | 1/2011 |
| WO | WO-2011014242 A1 | 2/2011 |
| WO | WO-2011014243 A1 | 2/2011 |
| WO | WO-2011022390 A2 | 2/2011 |
| WO | WO-2011025574 A1 | 3/2011 |
| WO | WO-2011047067 A2 | 4/2011 |
| WO | WO-2011022390 A3 | 5/2011 |
| WO | WO-2011050924 A1 | 5/2011 |
| WO | WO-2011079548 A1 | 7/2011 |
| WO | WO-2011082659 A1 | 7/2011 |
| WO | WO-2011047067 A3 | 8/2011 |
| WO | WO-2011100686 A1 | 8/2011 |
| WO | WO-2011116236 A2 | 9/2011 |
| WO | WO-2011148347 A1 | 12/2011 |
| WO | WO-2011153312 A2 | 12/2011 |
| WO | WO-2012003649 A1 | 1/2012 |
| WO | WO-2012009145 A2 | 1/2012 |
| WO | WO-2012033692 A2 | 3/2012 |

(56) References Cited

FOREIGN PATENT DOCUMENTS

| WO | WO-2012040176 A1 | 3/2012 |
|---|---|---|
| WO | WO-2011153312 A3 | 4/2012 |
| WO | WO-2012009145 A3 | 4/2012 |
| WO | WO-2012051790 A1 | 4/2012 |
| WO | WO-2012033692 A3 | 6/2012 |
| WO | WO-2012129827 A1 | 10/2012 |
| WO | WO-2012138576 A1 | 10/2012 |
| WO | WO-2012144344 A1 | 10/2012 |
| WO | WO-2012145314 A2 | 10/2012 |
| WO | WO-2012158751 A1 | 11/2012 |
| WO | WO-2012158781 A2 | 11/2012 |
| WO | WO-2013025608 A1 | 2/2013 |
| WO | WO-2013032667 A1 | 3/2013 |
| WO | WO-2013048704 A1 | 4/2013 |
| WO | WO-2013052494 A1 | 4/2013 |
| WO | WO-2014055873 A1 | 4/2014 |
| WO | WO-2014062702 A1 | 4/2014 |
| WO | WO-2014062706 A1 | 4/2014 |
| WO | WO-2014140792 A2 | 9/2014 |
| WO | WO-2014190318 A1 | 11/2014 |
| WO | WO-2015042295 A1 | 3/2015 |
| WO | WO-2015058010 A1 | 4/2015 |
| WO | WO-2015058165 A1 | 4/2015 |
| WO | WO-2015066359 A1 | 5/2015 |
| WO | WO-2016050329 A1 | 4/2016 |
| WO | WO-2016138499 A1 | 9/2016 |
| WO | WO-2016141354 A2 | 9/2016 |
| WO | WO-2018/052797 | 3/2018 |
| WO | WO-2018/187777 | 11/2018 |

OTHER PUBLICATIONS

Advisory Action Before Filing of Appeal Brief dated Jun. 8, 2012 for U.S. Appl. No. 12/839,130.
Agruss. The Thermally Regenarative Liquid-Metal Cell, J. Electrochem. Soc. Nov. 1963; 110(11):1097-1103.
Allanore, A. Features and Challenges of Molten Oxide Electrolytes for Metal Extraction. Journal of The Electrochemical Society, 162 (1): E13-E22 (2015). Published Nov. 25, 2014.
Allanore, et al. A new anode material for oxygen evolution in molten oxide electrolysis. Nature, vol. 497, May 16, 2013, pp. 353-356 and Online Methods Section. Published online May 8, 2013.
ATI Technical Data Sheet, ATI 18CrCb Stainless Steel, Feb. 17, 2014.
Atthey. A Mathematical Model for Fluid Flow in a Weld Pool at High Currents. J. Fluid Mech. 1980; 98(4):787-801.
Biswas, et al. Towards Implementation of Smart Grid: An Updated Review on Electrical Energy Storage Systems. Smart Grid and Renewable Energy. 2013; 4:122-132. Published online Feb. 2013.
Bradwell, et al. Magnesium-antimony liquid metal battery for stationary energy storage. J Am Chem Soc. Feb. 1, 2012;134(4):1895-7. doi: 10.1021/ja209759s. Published on web Jan. 6, 2012.
Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.
Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.
Bradwell, et al. Supporting Material: Magnesium-antimony liquid metal battery for stationary energy storage. J Am Chem Soc. Feb. 1, 2012;134(4):S1-S11. doi: 10.1021/ja209759s. Published on web Jan. 6, 2012.
Bradwell. Liquid metal batteries: ambipolar electrolysis and alkaline earth electroalloying cells. Thesis. Massachusetts Institute of Technology. Dept. of Materials Science and Engineering. 2011.
Bradwell. Technical and economic feasibility of a high-temperature self-assembling battery. Thesis. Department of Material Science and Engineering. MIT. 2006.
Cairns, et al. Galvanic Cells with Fused-Salt Electrolytes. AEC Research and Development. 220 pages, Nov. 1967.
Cairns, et al. High Temperature Batteries Research in high-temperature electrochemistry reveals compact, powerful energy-storage cells. Science. Jun. 20, 1969; 164(3886):1347-1355.
Cerablak™ technology. Atfi Surface Science Solutions. http://www.atfinet.com/index.php/technology. Accessed Feb. 24, 2016.
Chuang. Floating capacitor active charge balancing for PHEV application. Thesis. Ohio State University. 2010.
Co-pending U.S. Appl. No. 15/628,538, inventor Bradwell; David J., filed Jun. 20, 2017.
Co-pending U.S. Appl. No. 16/740,178, inventors Nayarhari et al., filed Jan. 10, 2020.
Co-pending U.S. Appl. No. 17/136,432, inventors Nayarhari et al., filed Dec. 29, 2020.
Crowley, B. New battery could be solar power's BFF video. http://money.cnn.com/video/technology/2012/08/16/bsg-liquid-metal-battery-energy.cnnmoney. CNN Money, 2012. Accessed Jun. 29, 2015.
Cubicciotti, et al. Metal-Salt Interactions at High Temperatures: The Solubilities of Some alkaline Earth Metals in their Halides. J. Am. Chem. Soc. 1949; 71(6):2149-2153.
Davis, J.R., Effect of temperature on properties. ASM specialty handbook—Copper and copper alloys. ASM international. 2001: pp. 430-439.
Donald Sadoway: The Colbert Report video. http://thecolbertreport.cc.com/videos/8uddyg/donald-sadoway. The Colbert Report, Oct. 22, 2012. Accessed Jun. 29, 2015.
Donald Sadoway: The missing link to renewable energy Youtube Video. https://www.youtube.com/watch?v=Sddb0Khx0yA. TED, Mar. 2012. Accessed Jun. 29, 2015.
Dworkin, et al. The Electrical Conductivity of Solutions of Metals in their Molten Halides. VIII. alkaline Earth Metal Systems. J. Phys. Chem. Jul. 1966; 70(7):2384.
Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.
Electroville: High-Amperage Energy Storage Device—Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.
Energy 2064 with Professor Donald R. Sadoway Youtube Video. https://www.youtube.com/watch?v=0iwG32R2R5o. Alger, Oct. 7, 2014. Accessed Jun. 29, 2015.
EP17851347.9 Extended European Search Report dated Mar. 16, 2020.
EP18194103.0 Extended European Search Report dated Mar. 19, 2019.
EP18781400.9 Extended European Search Report dated Dec. 11, 2020.
"European Extended Search Report and opinion dated May 29, 2017 for EP Application No. 14857245.".
European search report and search opinion dated Feb. 12, 2014 for EP Application No. 13196841.4.
European search report and search opinion dated May 6, 2016 for EP Application No. 13847926.
European search report and search opinion dated May 13, 2016 for EP Application No. 13846301.
European supplemental search report and opinion dated Mar. 16, 2017 for EP Application No. 14853610.
Fujiwara, et al. New molten salt systems for high temperature molten salt batteries: Ternary and quaternary molten salt systems based on LiF—LiCl, LiF—LiBr, and LiCl—LiBr. Journal of Power Sources. Apr. 15, 2011; 196(8):4012-4018.
Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.
GE Energy Storage Durathon Battery Durathon E620 Battery Module Technical Specifications. Available at http://www.geenergystorage.com/images/ge/PDF/DurathonGridE620ModuleSpecSheet.pdf. 2012, Accessed on Oct. 18, 2012.
GE Energy Storage Durathon DC System Technical Specifications—MWh Series, 2014. Accessed Apr. 7, 2015. https://renewables.

(56) References Cited

OTHER PUBLICATIONS gepower.com/content/dam/gepower-renewables/global/en_US/documents/Durathon_DCMWh_Spec_Sheet_GEA-988123002A.pdf.
Hall-heroult cell. Wikimedia Commons. Accessed Nov. 10, 2014. http://commons.wikimedia.org/wiki/File:Hall-heroult-kk-2008-12-31.png. Dec. 30, 2008.
Intermetallic—Wikipedia Website, https://en.wikipedia.org/wiki/Intermetallic. Accessed Jul. 2, 2015.
International preliminary report on patentability and written opinion dated Jan. 24, 2012 for PCT Application No. US2010/002035.
International preliminary report on patentability and written opinion dated Feb. 17, 2009 for PCT Application No. US2007/018168.
International preliminary report on patentability and written opinion dated Mar. 26, 2013 for PCT Application No. US2011/052316.
International preliminary report on patentability and written opinion dated Apr. 7, 2015 for PCT Application No. US2013/063472.
International preliminary report on patentability and written opinion dated Apr. 21, 2015 for PCT Application No. US2013/065086.
International preliminary report on patentability and written opinion dated Apr. 21, 2015 for PCT Application No. US2013/065092.
International preliminary report on patentability and written opinion dated Sep. 15, 2015 for PCT Application No. IB2014/000617.
International preliminary report on patentability and written opinion dated Nov. 24, 2015 for PCT Application No. US2014/039439.
International preliminary report on patentability dated Mar. 31, 2016 for PCT Application No. PCT/US2014/056367.
International preliminary report on patentability dated Apr. 28, 2016 for PCT Application No. PCT/US2014/060979.
International preliminary report on patentability dated Apr. 28, 2016 for PCT Application No. PCT/US2014/061266.
International preliminary report on patentability dated May 12, 2016 for PCT Application No. PCT/US2014/0063222.
International search report and written opinion dated Jan. 22, 2015 for PCT Application No. US2014/061266.
International search report and written opinion dated Jan. 23, 2015 for PCT Application No. PCT/US2014/056367.
International search report and written opinion dated Jan. 24, 2014 for PCT/US2013/065086.
International search report and written opinion dated Jan. 27, 2014 for PCT Application No. US2013/063472.
International search report and written opinion dated Jan. 29, 2015 for PCT Application No. US2014/060979.
International search report and written opinion dated Feb. 7, 2011 for PCT/US2010/002035.
International search report and written opinion dated Jun. 1, 2016 for PCT/US2016/019970.
International search report and written opinion dated Jun. 11, 2015 for PCT Application No. IB2014/002608.
International search report and written opinion dated Sep. 7, 2016 for PCT/US2016/021048.
International search report and written opinion dated Sep. 18, 2008 for PCT/US2007/018168.
International search report and written opinion dated Oct. 20, 2014 for PCT Application No. US2014/039439.
International search report and written opinion dated Dec. 26, 2013 for PCT Application No. US2013/065092.
International search report and written opinion dated Dec. 29, 2011 for PCT/US2011/052316.
International search report and written opnion dated Feb. 13, 2015 for PCT Application No. US2014/063222.
International search report dated Oct. 15, 2014 for PCT Application No. IB2014/000617.
Jarret, et al. Advances in the Smelting of aluminum. Metallurgical Treatises, pp. 137-157, 1981.
Javadekar, et al. Energy Storage in Electrochemical Cells with Molten Sb Electrodes. Journal of The Electrochemical Society, 159 (4) A386-A389 (2012); Jan. 24, 2012 http://repository.upenn.edu/cgi/viewcontent.cgi?article=1170&context=cbe_papers.
Jungblut, et al. Diffusion of lithium in highly oriented pyrolytic graphite at low concentrations and high temperatures. Phys Rev B Condens Matter. Dec. 1, 1989;40(16):10810-10815.
Kane, et al. Electrochemical Determination of the Thermodynamic Properties of Lithium-Antimony Alloys. Journal of the Electrochemical Society, 162 (3) A421-A425 (2015). Published Dec. 31, 2014.
Kaufman, J.G., Application of aluminum alloys and tempers. Introduction to aluminum alloys and tempers—Preface. ASM International. 2000; pp. 87-118.
Kaufman, J.G., Properties and Characteristics of Aluminum and Aluminum Alloys. Fire Resistance of Aluminum and Aluminum Alloys and Measuring the Effects of Fire Exposure on the Properties of Aluminum Alloys. 2016. 9 Pages.
Kelley, et al. Mixing in a liquid metal electrode. Physics of Fluids 26, 2014, 057102, pp. 1-12. Published online May 20, 2014.
Kim, et al. Calcium-bismuth electrodes for large-scale energy storage (liquid metal batteries). Journal of Power Sources, vol. 241, 2013, pp. 239-248. Available online Apr. 19, 2013.
Kim, et al. Electrolysis of Molten Iron Oxide with an Iridium Anode: The Role of Electrolyte Basicity. Journal of The Electrochemical Society, 158 (10) E101-E105 (2011). Published Aug. 5, 2011.
Kim, et al. Liquid Metal Batteries: Past, Present, and Future. Chemical Reviews, vol. 113, No. 3, Mar. 13, 2013, pp. 2075-2099. Published on web Nov. 27, 2012.
Kipouros, et al. Toward new technologies for the production of Lithium. JOM, May 1998, pp. 24-26.
Lalau, et al. Sodium-bismuth-lead low temperature liquid metal battery. Journal for Electrochemistry and Plating Technology, Jun. 2015, pp. 1-7.
Lee, et al., Oxidation Behavior of Copper at a Temperature below 300° C and the Methodology for Passivation. Materials Research. 2016; 19(1): 51-56.
Li, et al. High Performance Liquid Metal Battery with Environmentally Friendly Antimony-Tin Positive Electrode. ACS Appl Mater Interfaces. May 25, 2016;8(20):12830-5. doi: 10.1021/acsami.6b02576. Epub May 5, 2016.With supporting information.
Li, et al. Liquid Metal Electrodes for Energy Storage Batteries. Advanced Energy Materials (2016) 6:1600483-1-19. DOI: 10.1002/aenm.201600483. Published May 31, 2016.
Liquid Metal Battery Research Company website, http://www.lmbrc.com/. 2015. Accessed Jul. 7, 2015.
Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.
Magnuski, H. Innovations in Energy Storage—Professor Sadoway Video. https://vimeo.com/20906061. MIT Club of Northern California, Mar. 8, 2011. Accessed Jun. 29, 2015.
Mcalister, A. J. The Al-Li (Aluminum-Lithium) System. Bulletin of Alloy Phase Diagrams, vol. 3, No. 2, 1982, pp. 177-178. doi: 10.1007/BF02892377.
Merriam-Webster's Medical Dictionary Website. http://merriam-webster.com/medical/room%20temperature. Apr. 2009.
MIT Electroville—Liquid Metal Battery wesite. http://www.ct-si.org/events/EnergyInnovation/showcase/popt.html?id=198. 2011. Accessed Jul. 2, 2015.
Molten metal batteries aimed at the grid. BBC News website. Sep. 21, 2014. Accessed Dec. 9, 2014. http://www.bbc.com/news/science-environment-29284934.
NAS Sodium Sulfur Battery Energy Storage System website, accessed Jul. 13, 2015. https://www.ngk.co.jp/nas/specs/#topto_specs.
Ning, et al. Self-healing Li-Bi liquid metal battery for grid-scale energy storage. Journal of Power Sourches 275 (2015) 370-376. Available online Oct. 29, 2014.
Norbert Weber et al., Sloshing instability and electrolyte layer rupture in liquid metal batteries. arxiv.org, Cornell university library, 201 OLIN library Cornell university ithaca, NY 14853, Dec. 12, 2016, XP081362128.
Notice of allowance dated Jan. 6, 2015 for U.S. Appl. No. 13/237,215.
Notice of allowance dated Jan. 11, 2018 for U.S. Appl. No. 15/136,337.

(56) References Cited

OTHER PUBLICATIONS

Notice of allowance dated Mar. 8, 2016 for U.S. Appl. No. 13/801,333.
Notice of allowance dated Mar. 12, 2015 for U.S. Appl. No. 12/839,130.
Notice of allowance dated Apr. 6, 2015 for U.S. Appl. No. 13/801,333.
Notice of allowance dated Apr. 11, 2017 for U.S. Appl. No. 14/688,214.
Notice of allowance dated Apr. 13, 2017 for U.S. Appl. No. 14/688,179.
Notice of allowance dated Apr. 20, 2012 for U.S. Appl. No. 12/505,937.
Notice of allowance dated Apr. 22, 2014 for U.S. Appl. No. 12/839,130.
Notice of allowance dated Apr. 30, 2015 for U.S. Appl. No. 13/801,333.
"Notice of allowance dated May 11, 2017 for U.S. Appl. No. 14/688,214".
Notice of allowance dated Jul. 5, 2016 for U.S. Appl. No. 14/178,806.
Notice of allowance dated Jul. 13, 2012 for U.S. Appl. No. 11/839,413.
"Notice of allowance dated Jul. 17, 2017 for U.S. Appl. No. 14/688,214".
Notice of allowance dated Jul. 25, 2016 for U.S. Appl. No. 14/286,369.
"Notice of allowance dated Jul. 28, 2017 for U.S. Appl. No. 14/688,214".
Notice of allowance dated Jul. 31, 2015 for U.S. Appl. No. 13/801,333.
Notice of allowance dated Aug. 2, 2012 for U.S. Appl. No. 12/505,937.
Notice of allowance dated Aug. 22, 2016 for U.S. Appl. No. 14/536,549.
"Notice of allowance dated Sep. 11, 2017 for U.S. Appl. No. 15/289,857".
Notice of allowance dated Sep. 18, 2015 for U.S. Appl. No. 13/801,333.
"Notice of allowance dated Sep. 28, 2017 for U.S. Appl. No. 14/688,214".
Notice of allowance dated Oct. 4, 2017 for U.S. Appl. No. 15/136,337.
Notice of allowance dated Oct. 7, 2016 for U.S. Appl. No. 14/178,806.
Notice of allowance dated Oct. 19, 2017 for U.S. Appl. No. 14/688,214.
Notice of allowance dated Nov. 17, 2017 for U.S. Appl. No. 15/136,337.
Notice of allowance dated Dec. 11, 2015 for U.S. Appl. No. 13/801,333.
Notice of allowance dated Dec. 20, 2017 for U.S. Appl. No. 15/136,337.
Notice of allowance dated Mar. 22, 2017 for U.S. Appl. No. 14/536,563.
"Notice of allowance dated Aug. 31, 2018 for U.S. Appl. No. 15/057,732".
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS A Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems, http://www.nuvation.com/battery-management-system. Accessed Feb. 4, 2015.
Nuvation BMS. Grid Battery Controller Battery Management Solution for Multi-Stack Grid-Scale Energy Storage Systems. 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.
Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Office action—Requirement for Restriction Election dated Aug. 13, 2015 for U.S. Appl. No. 14/045,967.
Office action dated Jan. 5, 2012 for U.S. Appl. No. 12/839,130.
Office action dated Jan. 10, 2014 for U.S. Appl. No. 12/839,130.
"Office action dated Feb. 5, 2016 for U.S. Appl. No. 14/536,549.".
Office action dated Mar. 14, 2014 for U.S. Appl. No. 13/237,215.
Office action dated Mar. 16, 2012 for U.S. Appl. No. 12/839,130.
"Office action dated Mar. 27, 18 for U.S. Appl. No. 15/140,434.".
"Office action dated Apr. 18, 2018 for U.S. Appl. No. 14/975,587.".
"Office action dated Apr. 20, 2018 for U.S. Appl. No. 15/057,732.".
"Office action dated May 1, 2017 for U.S. Appl. No. 14/678,602.".
Office action dated May 13, 2011 for U.S. Appl. No. 11/839,413.
Office action dated Jun. 7, 2016 for U.S. Appl. No. 14/045,967.
"Office action dated Jun. 7, 2018 for U.S. Appl. No. 14/687,838.".
"Office action dated Jun. 15, 2017 for U.S. Appl. No. 14/687,838".
"Office action dated Jun. 25, 2018 for U.S. Appl. No. 15/063,842.".
Office action dated Jun. 30, 2016 for U.S. Appl. No. 14/536,563.
Office action dated Jul. 31, 2015 for U.S. Appl. No. 14/210,051.
Office action dated Aug. 21, 2014 for U.S. Appl. No. 12/839,130.
"Office action dated Aug. 30, 2017 for U.S. Appl. No. 14/975,587".
Office action dated Sep. 3, 2014 for U.S. Appl. No. 13/801,333.
"Office action dated Sep. 5, 2017 for U.S. Appl. No. 15/140,434".
Office action dated Oct. 4, 2011 for U.S. Appl. No. 11/839,413.
Office action dated Nov. 5, 2015 for U.S. Appl. No. 14/178,806.
Office action dated Nov. 9, 2015 for U.S. Appl. No. 14/286,369.
Office action dated Nov. 13, 2017 for U.S. Appl. No. 14/678,602.
Office action dated Nov. 18, 2016 for U.S. Appl. No. 14/688,179.
Office action dated Nov. 22, 2016 for U.S. Appl. No. 14/688,214.
Office action dated Nov. 24, 2015 for U.S. Appl. No. 14/045,967.
Office action dated Dec. 1, 2014 for U.S. Appl. No. 14/210,051.
Office action dated Dec. 5, 2014 for U.S. Appl. No. 12/839,130.
Office action dated Dec. 11, 2012 for U.S. Appl. No. 13/588,741.
Ouchi, et al. Calcium-Antimony Alloys as Electrodes for Liquid Metal Batteries. Journal of The Electrochemical Society. 2014; 161 (12):A1898-A1904. Published Sep. 9, 2014.
Ouchi, et al. Calcium-based multi-element chemistry for grid-scale electrochemical energy storage. Nat Commun. Mar. 22, 2016;7:10999. doi: 10.1038/ncomms10999.With supplementary materials.
"SPATOCCO, et al. Low-Temperature Molten Salt Electrolytes for Membrane-Free Sodium Metal Batteries. Published Oct. 20, 2015, available at http://jes.ecsdl.org/content/162/14/A2729.full.pdf+html".
PCT/US2017/050544 International Search Report dated Apr. 24, 2018.
PCT/US2018/026601 International Search Report dated Jul. 30, 2018.
PCT/US2019/066231 International Search Report and Written Opinion dated Mar. 2, 2020.
Pflanz, K. A Liquid Layer Solution for the Grid, http://energy.gov/articles/liquid-layer-solution-grid. Sep. 15, 2011. Accessed Jul. 2, 2015.
Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Qingsong; Wang et al., "Thermal Runaway Caused Fire and Explosion of Lithium Ion Battery", Journal of Power Sources, 2012, 208, 210-224.
Response After Final Rejection dated Apr. 27, 2012 for U.S. Appl. No. 12/839,130.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th AISI/DOE TRP Industry Briefing Session, Oct. 10, 2007, Salt Lake City. http://steeltrp.com/Briefing07slides/09-TRP9956_MIT-07IBS.pdf.
Sadoway, Donald R. Electrochemical Pathways Towards Carbon-Free Metals Production Presentation. Presented at GCEP Carbon Management in Manufacturing Industries workshop, Apr. 15-16,

(56) References Cited

OTHER PUBLICATIONS

2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.
Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.
Sadoway, et al. Innovation in Energy Storage: What I Learned in 3.091 was All I Needed to Know video, http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Shannon. Revised effective ionic radii and systematic studies of interatomic distances in halides and chalcogenides. Acta Crystallographica Section A: Crystal Physics, Diffraction, Theoretical and General Crystallography. Mar. 9, 1976; A32:751-767.
Shen, et al. Thermal convection in a liquid metal battery. Theoretical and Computational Fluid Dynamics (2015): 1-20.
Shimotake, et al. Bimetallic Galvanic Cells With Fused-Salt Electrolytes. Advances in Energy Conversion Engineering, pp. 951-962. 1967 Intersociety Energy Conversion Engineering Conference. American Society of Mechanical Engineers, 1967.
Shimotake, et al. Secondary Cells with Lithium Anodes and Immobilized Fused-Salt Electrolytes. I & EC ProcessDesign and Development, vol. 8, No. 1, Jan. 1969, pp. 51-56.
Sodium Sulfur-Battery Definition; Wikipedia website. Accessed Sep. 3, 2015. https://en.wikipedia.org/wiki/Sodium%E2%80%93sulfur_battery.
Spatocco, et al. Cost-based discovery for engineering solutions. pp. 1-43. Adv. In Electrochemical Science and Technology (vol. XV), Feb. 9, 2015.
Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22-2012-donald-sadoway.
U.S. Appl. No. 15/647,468 Notice of Allowance dated Oct. 2, 2019.
U.S. Appl. No. 13/999,704, filed Mar. 14, 2014.
U.S. Appl. No. 14/210,051, filed Mar. 13, 2014.
U.S. Appl. No. 14/687,838 Notice of Allowance dated Nov. 26, 2019.
U.S. Appl. No. 14/975,587 Notice of Allowance dated Jan. 9, 2019.
U.S. Appl. No. 14/975,587 Notice of Allowance dated Mar. 15, 2019.
U.S. Appl. No. 14/975,587 Notice of Allowance dated Oct. 9, 2018.
U.S. Appl. No. 15/057,732 Notice of Allowance dated Oct. 10, 2018.
U.S. Appl. No. 15/063,842 Office Action dated Feb. 17, 2021.
U.S. Appl. No. 15/063,842 Office Action dated Feb. 26, 2019.
U.S. Appl. No. 15/063,842 Office Action dated May 27, 2020.
U.S. Appl. No. 15/063,842 Office Action dated Sep. 20, 2019.
U.S. Appl. No. 15/130,129 Office Action dated Dec. 6, 2018.
U.S. Appl. No. 15/130,129 Office Action dated Jul. 3, 2019.
U.S. Appl. No. 15/130,129 Office Action dated Jul. 9, 2020.
U.S. Appl. No. 15/130,292 Office Action dated Jan. 24, 2020.
U.S. Appl. No. 15/130,292 Office Action dated Mar. 20, 2019.
U.S. Appl. No. 15/130,292 Office Action dated Nov. 19, 2018.
U.S. Appl. No. 15/140,434 Office Action dated Jun. 12, 2019.
U.S. Appl. No. 15/140,434 Office Action dated Sep. 19, 2018.
U.S. Appl. No. 15/647,468 Notice of Allowance dated Oct. 24, 2019.
U.S. Appl. No. 15/647,468 Office Action dated Jun. 5, 2019.
U.S. Appl. No. 15/690,863 Notice of Allowance dated Jan. 22, 2020.
U.S. Appl. No. 15/690,863 Office Action dated May 17, 2019.
U.S. Appl. No. 15/836,038 Notice of Allowance dated Jan. 9, 2019.
U.S. Appl. No. 16/202,758 Notice of Allowance dated Nov. 8, 2019.
U.S. Appl. No. 16/202,758 Notice of Allowance dated Oct. 7, 2019.
Vassiliev, et al. A new proposal for the binary (Sn,Sb) phase diagram and its thermodynamic properties based on a new e.m.f study Journal of Alloys and Compounds 247 (1997) 223-233.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium-antimony-lead liquid metal battery for grid-level energy storage. Nature. Oct. 16, 2014;514(7522):348-50. doi: 10.1038/nature13700. Epub Sep. 21, 2014.
Weaver, et al. The Sodium1Tin Liquid-Metal Cell. J. Electrochem. Soc., 109 (8), 653-657 (Aug. 1962).
Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12,1500271, Published online Apr. 17, 2015.
Yu, et al. Determination of the Lithium Ion Diffusion Coefficient in Graphite. J. Electrochem. Soc. 1999 vol. 146, issue 1, 8-14.
Zhang; et al. Pyrite FeS2 as an efficient adsorbent of lithium polysulfide for improved lithiumsulfur batteries. Journal of Materials Chemistry A, vol. 4, Feb. 23, 2016, pp. 4371-4374. doi: 10.1039/C6TA01214K. With supporting information.
Co-pending U.S. Appl. No. 17/510,056, inventors Bradwelldavid; J. et al., filed Oct. 25, 2021.
Co-pending U.S. Appl. No. 17/529,171, inventors Bradwelldavid; J. et al., filed Nov. 17, 2021.
Co-pending U.S. Appl. No. 17/670,168, inventors Thompsongreg et al., filed Feb. 11, 2022.
RU2031491C1 English translation. Nikolaev et al., Russia. Mar. 20, 1995.
U.S. Appl. No. 16/293,288 Office Action dated Sep. 28, 2021.
U.S. Appl. No. 16/592,621 Notice of Allowance dated Feb. 23, 2022.
U.S. Appl. No. 16/592,621 Office Action dated Jul. 6, 2021.
U.S. Appl. No. 16/718,020 Notice of Allowance dated Jul. 28, 2021.
U.S. Appl. No. 16/829,965 Notice of Allowance dated Nov. 19, 2021.
U.S. Appl. No. 16/858,189 Notice of Allowance dated Aug. 18, 2021.
Co-pending U.S. Appl. No. 17/747,333, inventors Bradwell, David; J. et al., filed on May 18, 2022.
Co-pending U.S. Appl. No. 17/840,395, inventors Bradwell, David; J. et al., filed on Jun. 14, 2022.
PCT/US2020/050547 International Preliminary Report on Patentability dated Mar. 24, 2022.
Poizeau, Sophie, Thermodynamic properties and atomic structure of Ca-based liquid alloys, PhD Thesis, Massachusetts Institute of Technology, pp. 1-164, Feb. 2013.
U.S. Appl. No. 16/293,288 Office Action dated May 13, 2022.

* cited by examiner

MOLTEN SALT BATTERY WITH SOLID METAL CATHODE

CROSS-REFERENCE

This application is a continuation of International Application No. PCT/US2018/026601, filed Apr. 6, 2018, which claims the benefit of U.S. Provisional Patent Application No. 62/483,208, filed Apr. 7, 2017, each of which are entirely incorporated herein by reference.

BACKGROUND

A battery is a device capable of converting chemical energy into electrical energy. Batteries are used in many household and industrial applications. In some instances, batteries are rechargeable such that electrical energy (e.g., converted from non-electrical types of energy such as mechanical energy) is capable of being stored in the battery as chemical energy, i.e., by charging the battery.

SUMMARY

This disclosure provides energy storage devices and systems. An energy storage device can include a negative electrode, an electrolyte, and a positive electrode, at least some of which may be in a liquid state during operation of the energy storage device. In some situations, during discharge of the energy storage device, an intermetallic compound forms at the positive electrode.

In an aspect, the present disclosure provides an electrochemical energy storage device, comprising: a first electrode comprising a first material, where the first electrode is in electrical communication with a negative current collector, where the first material comprises calcium; a second electrode comprising a second material, where the second electrode is in electrical communication with a positive current collector, where the second material comprises antimony, and wherein the positive current collector comprises a surface treatment that resists corrosion; and liquid electrolyte between the first electrode and the second electrode, where at an operating temperature of the electrochemical energy storage device the second material is solid, and where the liquid electrolyte is capable of conducting ions of the first material.

In some embodiments, the second electrode comprises a plurality of solid particles comprising the second material. In some embodiments, the plurality of solid particles comprises granules, flakes, needles, or any combination thereof. In some embodiments, an individual particle of the plurality of solid particles has a dimension of at least about 0.0001 millimeters. In some embodiments, an individual particle of the plurality of solid particles has a dimension of less than or equal to about 10 millimeters. In some embodiments, the electrochemical energy storage device further comprises an intermetallic material disposed at one or more interfaces between the plurality of solid particles and the liquid electrolyte upon discharge of the electrochemical energy storage device. In some embodiments, the intermetallic material comprises the first material and the second material. In some embodiments, the intermetallic material is included in an intermetallic layer at a given interface of the one or more interfaces. In some embodiments, the intermetallic material is included in a shell at least partially circumscribing a given solid particle of the plurality of solid particles.

In some embodiments, the operating temperature is at least about 500° C. In some embodiments, the operating temperature is from about 400° C. to 500° C. In some embodiments, the operating temperature is less than about 500° C. or 400° C. In some embodiments, the operating temperature is from about 300° C. to 650° C. In some embodiments, the first material and the second material comprise one or more metals.

In some embodiments, the first material comprises a calcium alloy. In some embodiments, the first material comprises lithium, magnesium, potassium, barium, strontium, copper, zinc, or any combination thereof. In some embodiments, the first material comprises lithium, sodium, magnesium, copper, zinc, or any combination thereof.

In some embodiments, the first electrode is solid at the operating temperature. In some embodiments, the first electrode is semi-solid at the operating temperature. In some embodiments, the first electrode is liquid at the operating temperature. In some embodiments, the first electrode comprises a semi-solid or a liquid at the operating temperature.

In some embodiments, the liquid electrolyte comprises a calcium salt. In some embodiments, the liquid electrolyte further comprises a salt additive. In some embodiments, the calcium salt is calcium chloride. In some embodiments, the salt additive comprises lithium chloride, sodium chloride, potassium chloride, strontium chloride, lithium bromide, sodium bromide, calcium bromide, potassium bromide, strontium bromide, barium chloride, barium bromide, or any composition thereof.

In some embodiments, the negative current collector comprises a porous basket. In some embodiments, the negative current collector comprises a porous metallic structure. In some embodiments, the negative current collector comprises a knitted metal mesh or a mesh wire cloth. In some embodiments, the electrochemical energy storage device further comprises a separator disposed between the first electrode and the second electrode, and wherein the separator prevents the second material from contacting the first electrode. In some embodiments, the separator comprises a mechanical layer and a metal mesh, and wherein the metal mesh comprises pores of an average diameter of less than or equal to about 0.8 millimeters. In some embodiments, the separator comprises steel or stainless steel, and wherein the separator comprises a metal mesh or expanded mesh. In some embodiments, the separator comprises the surface treatment. In some embodiments, the surface treatment comprises boronizing, nitriding, nitrocarburizing, or any combination thereof.

In another aspect, the present disclosure provides an electrochemical energy storage device, comprising: a first electrode comprising a first material, where the first electrode is in electrical communication with a negative current collector; a second electrode comprising a plurality of solid particles comprising a second material, where the second electrode is in electrical communication with a positive current collector, wherein the second material is reactive with the first material, wherein the second material of the plurality of solid particles has an electronic conductivity of greater than or equal to $1 \times 10^4$ Siemens per meter, and where at an operating temperature of the electrochemical energy storage device the second material is solid; and a liquid electrolyte between the first electrode and the second electrode, where the liquid electrolyte is capable of conducting ions of the first material.

In some embodiments, the first material and the second material comprise one or more metals. In some embodiments, the operating temperature is at least about 500° C. In some embodiments, the operating temperature is from about 400° C. to 500° C. In some embodiments, the operating temperature is less than about 500° C. or 400° C. In some embodiments, the operating temperature is from about 300° C. to 650° C.

In some embodiments, the first material comprises calcium. In some embodiments, the first material comprises a calcium alloy. In some embodiments, the first material comprises calcium or a calcium alloy. In some embodiments, the first material comprises lithium, sodium, magnesium, potassium, barium, strontium, copper, zinc, or any combination thereof. In some embodiments, the first material comprises lithium, sodium, magnesium, copper, zinc, or any combination thereof.

In some embodiments, the first electrode is solid at the operating temperature. In some embodiments, the first electrode is semi-solid at the operating temperature. In some embodiments, the first electrode is liquid at the operating temperature. In some embodiments, the first electrode comprises a semi-solid or a liquid at the operating temperature.

In some embodiments, the second material comprises antimony. In some embodiments, the plurality of solid particles comprises granules, flakes, needles, or any combination thereof. In some embodiments, an individual particle of the plurality of solid particles has a dimension of at least about 0.0001 millimeters. In an embodiment, an individual particle of the plurality of solid particles has a dimension of less than or equal to about 10 millimeters.

In some embodiments, the liquid electrolyte comprises a calcium salt. In some embodiments, the liquid electrolyte further comprises a salt additive. In some embodiments, the calcium salt is calcium chloride. In some embodiments, the salt additive comprises lithium chloride, potassium chloride, sodium chloride, potassium chloride, strontium chloride, lithium bromide, sodium bromide, calcium bromide, potassium bromide, strontium bromide, barium chloride, barium bromide, or any composition thereof.

In some embodiments, the electrochemical energy storage device further comprises an intermetallic material disposed at one or more interfaces between the plurality of solid particles of the second electrode and the liquid electrolyte upon discharge of the electrochemical energy storage device, where the intermetallic material comprises the first material and the second material. In some embodiments, the intermetallic material is included in an intermetallic layer at a given interface of the one or more interfaces. In some embodiments, the intermetallic material is included in a shell at least partially circumscribing a given solid particle of the plurality of solid particles.

In some embodiments, the negative current collector comprises a porous basket. In some embodiments, the negative current collector comprises an electrically conductive current lead and/or a porous metallic structure. In some embodiments, the negative current collector comprises a knitted metal mesh or a mesh wire cloth. In some embodiments, the electrochemical energy storage device further comprises a separator disposed between the first electrode and the second electrode, and wherein the separator prevents the second material from contacting the first electrode. In some embodiments, the separator comprises pores of an average diameter of less than or equal to about 0.8 millimeters. In some embodiments, the separator comprises a mechanical layer and a metal mesh, and wherein the metal mesh comprises pores of an average diameter of less than or equal to about 0.8 millimeters.

In another aspect, the present disclosure provides an electrochemical energy storage device, comprising: a container including a cavity comprising sidewalls and a lid assembly comprising a conductor aperture, where at an operating temperature of the electrochemical energy storage device, the lid assembly seals the container; an electrical conductor extending through the conductor aperture into the cavity of the container, where the electrical conductor is electrically isolated from the lid assembly by an electrically insulating seal; a negative current collector suspended within the cavity by the electrical conductor; and an electrochemical energy storage cell arranged within the cavity, where the electrochemical energy storage cell comprises a first electrode comprising a first material, a second electrode comprising a second material, a liquid electrolyte between the first electrode and the second electrode, where the liquid electrolyte is capable of conducting ions of the first material, where the first electrode is in electrical communication with the negative current collector, and where the second electrode is positioned along the sidewalls of the cavity such that ions of the first material are conducted through the liquid electrolyte along a general direction that is not parallel to a direction of a gravitational acceleration vector.

In some embodiments, the general direction is substantially orthogonal to the gravitational acceleration vector. In some embodiments, the first material and the second material comprise one or more metals. In some embodiments, the electrochemical energy storage device further comprises troughs mounted substantially perpendicular to the sidewalls of the cavity and where the second electrode is disposed in the troughs. In some embodiments, the troughs comprise at least two layers of troughs. In some embodiments, the electrochemical energy storage device further comprises a porous retaining wall mounted to an inner edge of the troughs and where the ions from the first material are free to pass through the porous retaining wall. In some embodiments, the electrochemical energy storage device further comprises a separator mounted to an inner edge of the troughs, and wherein the ions from the first material pass through the separator. In some embodiment, the separator comprises pores of an average diameter of less than or equal to about 0.8 millimeters. In some embodiments, the separator comprises a mechanical layer and a metal mesh, and wherein the metal mesh comprises pores of an average diameter of less than or equal to about 0.8 millimeters. In some embodiments, the separator comprises a surface treatment that is resistant to corrosion. In some embodiments, the positive current collector, container, an interior of the container, and/or the lid assembly comprises a surface treatment or coating that is resistant to corrosion. In some embodiments, the container, interior of the container, and/or the lid assembly comprises steel or stainless steel. In some embodiments, the surface treatment comprises boronizing, nitriding, nitrocarburizing, or any combination thereof. In some embodiments, the coating comprises silicon, nickel, chromium, or any combination thereof. In some embodiments, the surface treatment is boronizing, and the separator, positive current collector, container, interior of the container, and/or lid assembly comprise a surface layer of $Fe_2B$.

In some embodiments, the second electrode comprises a plurality of solid particles. In some embodiments, the plurality of solid particles comprises granules, flakes, needles, or any combination thereof. In some embodiments, an individual particle of the plurality of solid particles has a dimension of at least about 0.0001 millimeters. In some embodiments, an individual particle of the plurality of particles has a dimension of less than or equal to about 10 millimeters.

In some embodiments, the electrochemical energy storage device further comprises an intermetallic material disposed at one or more interfaces between the plurality of solid particles of the second electrode and the liquid electrolyte upon discharge of the electrochemical energy storage device. In some embodiments, the intermetallic material comprises the first material and the second material. In some embodiments, the intermetallic material is included in an intermetallic layer at a given interface of the one or more interfaces. In some embodiments, the intermetallic material is included in a shell at least partially circumscribing a given solid particle of the plurality of solid particles.

In some embodiments, at the operating temperature, the ions of the first material are conducted through the liquid electrolyte along an average flow path that is parallel to a plane of the lid assembly.

In some embodiments, the operating temperature is at least about 500° C. In some embodiments, the operating temperature is from about 400° C. to 500° C. In some embodiments, the operating temperature is less than about 500° C. or 400° C. In some embodiments, the operating temperature is from about 300° C. to 650° C.

In some embodiments, the first material comprises calcium. In some embodiments, the first material comprises a calcium alloy. In some embodiments, the first material comprises calcium or a calcium alloy. In some embodiments, the first material comprises lithium, sodium, magnesium, potassium, barium, strontium, copper, zinc, or any combination thereof. In some embodiments, the first material comprises lithium, sodium, magnesium, copper, zinc, or any combination thereof.

In some embodiments, the first electrode is solid at the operating temperature. In some embodiments, the first electrode is semi-solid at the operating temperature. In some embodiments, the first electrode is liquid at the operating temperature. In some embodiments, the second electrode is solid at the operating temperature. In some embodiments, the first electrode comprises a semi-solid or a liquid at the operating temperature. In some embodiments, the second electrode comprises antimony.

In some embodiments, the liquid electrolyte comprises a calcium salt. In some embodiments, the liquid electrolyte further comprises a salt additive. In some embodiments, the calcium salt is calcium chloride. In some embodiments, the salt additive comprises lithium chloride, potassium chloride, lithium bromide, calcium bromide, barium chloride, barium bromide, or any composition thereof.

In some embodiments, the negative current collector is porous. In some embodiments, the negative current collector comprises a porous basket. In some embodiments, the negative current collector comprises a knitted metal mesh or a mesh wire cloth. In some embodiments, the electrically insulating seal comprises ceramic. In some embodiments, the cavity of the container further comprises a gaseous headspace. In some embodiments, the gaseous headspace comprises an inert gas.

In another aspect, the present disclosure provides methods for operating an electrochemical energy storage device, comprising: (a) activating the electrochemical energy storage device coupled to an electrical load, wherein the comprising: a. a first electrode comprising a first material, wherein the first electrode is in electrical communication with a negative current collector, wherein at an operating temperature of the electrochemical energy storage device the first material is liquid; b. a second electrode comprising a plurality of solid particles comprising a second material, wherein the second electrode is in electrical communication with a positive current collector, wherein the second material is reactive with the first material, wherein the second material of the plurality of solid particles has an electronic conductivity of greater than or equal to $1 \times 10^4$ Siemens per meter, and wherein at the operating temperature of the electrochemical energy storage device the second material is solid; and c. a liquid electrolyte between the first electrode and the second electrode, wherein the liquid electrolyte is capable of conducting ions of the first material; and (b) charging or discharging the electrochemical energy storage device through the electrical load, wherein (i) during charging, the liquid electrolyte conducts ions of the first material to the first electrode, and (ii) during discharging, the liquid electrolyte conducts ions of the first material away from the first electrode.

In some embodiments, the operating temperature is between about 300° C. and 650° C. In some embodiments, the method further comprises operating the electrochemical cell at a voltage from about 0.6 volts to 1.2 volts.

In another aspect, the present disclosure provides methods for operating an electrochemical energy storage device, comprising: (a) activating the electrochemical energy storage device coupled to an electrical load, wherein the comprising: a. a container including a cavity comprising sidewalls and a lid assembly comprising a conductor aperture, wherein at an operating temperature of the electrochemical energy storage device, the lid assembly seals the container; b. an electrical conductor extending through the conductor aperture into the cavity of the container, wherein the electrical conductor is electrically isolated from the lid assembly by an electrically insulating seal; c. a negative current collector suspended within the cavity by the electrical conductor; and d. an electrochemical energy storage cell arranged within the cavity, wherein the electrochemical energy storage cell comprises a first electrode comprising a first material, a second electrode comprising a second material, a liquid electrolyte between the first electrode and the second electrode, wherein the liquid electrolyte is capable of conducting ions of the first material, wherein the first electrode is in electrical communication with the negative current collector, and wherein the second electrode is positioned along the sidewalls of the cavity such that ions of the first material are conducted through the liquid electrolyte along a general direction that is not parallel to a direction of a gravitational acceleration vector; and (b) charging or discharging the electrochemical energy storage device through the electrical load, wherein (i) during charging, the liquid electrolyte conducts ions of the first material to the first electrode, and (ii) during discharging, the liquid electrolyte conducts ions of the first material away from the first electrode.

In some embodiments, the operating temperature is between about 300° C. and 650° C. In some embodiments, the method further comprises operating the electrochemical cell at a voltage from about 0.6 volts to 1.2 volts.

In another aspect, the present disclosure provides methods for operating an electrochemical energy storage device, comprising: (a) activating the electrochemical energy storage device coupled to an electrical load, wherein the comprising: a. a first electrode comprising a first material, wherein the first electrode is in electrical communication with a negative current collector, wherein the first material comprises calcium; b. a second electrode comprising a second material, wherein the second electrode is in electrical communication with a positive current collector, wherein the second material comprises antimony, and wherein the positive current collector comprises a surface treatment that resists corrosion; and c. a liquid electrolyte between the first electrode and the second electrode, wherein at an operating temperature of the electrochemical energy storage device the second material is solid, and wherein the liquid electrolyte is capable of conducting ions of the first material; and (b) charging or discharging the electrochemical energy storage device through the electrical load, wherein (i) during charging, the liquid electrolyte conducts ions of the first material to the first electrode, and (ii) during discharging, the liquid electrolyte conducts ions of the first material away from the first electrode.

In some embodiments, the operating temperature is between about 300° C. and 650° C. In some embodiments, the method further comprises operating the electrochemical cell at a voltage from about 0.6 volts to 1.2 volts.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

FIG. 4A shows a cross-sectional side view of an example electrochemical cell or battery with one or more troughs; FIG. 4B shows a cross-sectional side view of an example electrochemical cell or batter without troughs;

FIG. 6A shows an example negative current collector with a perforated basket; FIG. 6B shows an example negative current collector with a perforated basket and mesh liner;

FIG. 9A shows a top view of an example separator; FIG. 9B shows a side view of an example separator.

DETAILED DESCRIPTION

Figure 1:
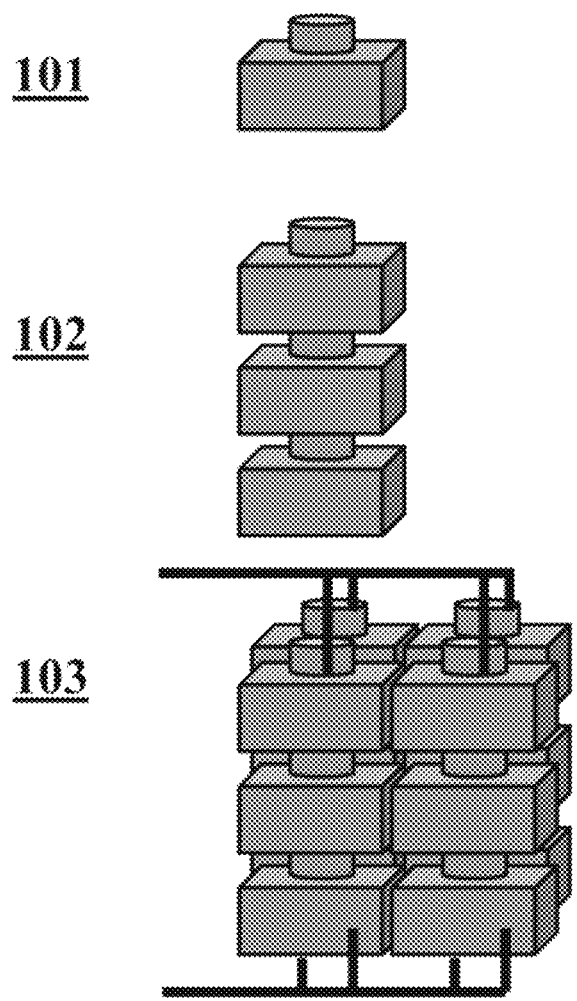
FIG. 1 illustrates an example electrochemical cell and an example compilation (i.e., battery) of electrochemical cells.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

The term "cell," as used herein, generally refers to an electrochemical cell. A cell can include a negative electrode of material 'A' and a positive electrode of material 'B', denoted as A∥B. The positive and negative electrodes can be separated by an electrolyte. A cell can also include a housing, one or more current collectors, and a high temperature electrically isolating seal.

The term "pack" or "tray," as used herein, generally refers to cells that are attached through different electrical connections (e.g., vertically and in series or parallel). A pack or tray can comprise any number of cells (e.g., 1, 2, 3, 4, 5, 6, 7, 8, 9, 10, 11, 12, 13, 14, 15, 16, 17, 18, 19, 20, 25, 30, 40, 50, 60, 80, 100, 120, 140, 160, 200, 250, 300 or more). In some cases, a pack or tray comprises 160 cells. In some cases, a pack is capable of storing at least about 64 kilowatt-hours of energy and/or delivering at least about 12 kilowatts of power.

The term "core," as used herein generally refers to a plurality of packs and/or trays that are attached through different electrical connections (e.g., in series and/or parallel). A core can comprise any number of packs or trays (e.g., 1, 2, 3, 4, 5, 6, 7, 8, 9, 10, 11, 12, 13, 14, 15, 16, 17, 18, 19, 20, or more). In some cases, the core also comprises mechanical, electrical, and thermal systems that allow the core to efficiently store and return electrical energy in a controlled manner. In some cases, a core comprises at least about 4 packs or at least about 6 trays. In some cases, a core is capable of storing at least about 250 kilowatt-hours of energy and/or delivering at least about 50 kilowatts of power.

The term "system," as used herein, generally refers to a plurality of cores that are attached through different electrical connections (e.g., in series and/or parallel). A system can comprise any number of cores (e.g., 2, 3, 4, 5, 6, 7, 8, 9, 10, 11, 12, 13, 14, 15, 16, 17, 18, 19, 20, or more). In some cases, a system comprises 4 cores. In some cases, a system is capable of storing about 4 megawatt-hours of energy and/or delivering at least about 500 kilowatts of power.

The term "battery," as used herein, generally refers to one or more electrochemical cells connected in series and/or parallel. A battery can comprise any number of electrochemical cells, packs, trays, cores, or systems.

The term "vertical," as used herein, generally refers to a direction that is parallel to the gravitational acceleration vector (g).

The term "cycle," as used herein, generally refers to a charge/discharge or discharge/charge cycle.

The term "voltage" or "cell voltage," as used herein, generally refers to the voltage of a cell (e.g., at any state of charge or charging/discharging condition). In some cases, voltage or cell voltage may be the open circuit voltage. In some cases, the voltage or cell voltage can be the voltage during charging or during discharging.

The term "oxidation state," as used herein, generally refers to a possible charged ionic state of a species when dissolved into an ionic solution or electrolyte, such as, for example, a molten halide salt (e.g., zinc$^{2+}$ ($Zn^{2+}$) has an oxidation state of 2+).

The term "coating," as used herein, generally refers to an organic or inorganic layer that is applied to a surface. For example, a coating may be applied to a surface of the housing, container lid, or other components of the electrochemical cell. The coating may increase resistance of a surface to corrosion from the components of the electrochemical cell (e.g., electrode or electrolyte materials). The coating may comprise one or more layers.

The term "surface treatment," as used herein, generally refers to a surface that comprises a top layer (e.g., outermost layer) that is metallurgically modified. For example, surface treatments may be applied to a surface of the housing, container lid, or other metallic components of the electrochemical cell. Surface treatments may increase the resistance of the surface to corrosion and/or may decrease thermal expansion.

This disclosure provides electrochemical energy storage devices (or batteries) and electrochemical battery housings. An electrochemical battery generally includes an electrochemical battery cell sealed (e.g., hermetically sealed) within an electrochemical battery housing.

Electrochemical Energy Storage Materials

The present disclosure provides electrochemical energy storage devices (e.g., batteries) and systems. An electrochemical energy storage device generally includes at least one electrochemical cell, also "cell" and "battery cell" herein, sealed (e.g., hermetically sealed) within a housing. A cell can be configured to deliver electrical energy (e.g., electrons under potential) to a load, such as, for example, an electronic device, another energy storage device or a power grid.

In an aspect, the present disclosure provides an electrochemical energy storage device comprising a first electrode in electrical communication with a negative current collector, a second electrode in electrical communication with a positive current collector, and a liquid electrode between the first and second electrodes. In some embodiments, the first electrode is a negative electrode. The negative electrode may be an anode during discharge. In some embodiments, the second electrode is a positive electrode. The positive electrode may be a cathode during discharge.

In some examples, an electrochemical energy storage device includes a liquid metal negative electrode, a solid metal positive electrode, and a liquid salt electrolyte separating the liquid metal negative electrode and the solid metal positive electrode. In some examples, an electrochemical energy storage device includes a solid metal negative electrode, a solid metal positive electrode, and a liquid salt electrolyte separating the solid metal negative electrode and the solid metal positive electrode. In some examples, an electrochemical energy storage device includes a semi-solid metal negative electrode, a solid metal positive electrode, and a liquid electrolyte separating the semi-solid metal negative electrode and the solid metal positive electrode.

Any description of a metal or molten metal negative electrode, or a negative electrode, herein may refer to an electrode including one or more of a metal, a metalloid and a non-metal. The negative electrode may comprise calcium (Ca). In some examples, the negative electrode may comprise a calcium alloy. The calcium alloy may include an alkali or alkaline earth metal, such as lithium (Li), sodium (Na), potassium (K), rubidium (Rb), cesium (Cs), magnesium (Mg), barium (Ba), strontium (Sr), or combinations thereof. The calcium alloy may include one or more transition metals, such as copper (Cu), iron (Fe), nickel (Ni), zinc (Zn), cobalt (Co), or gold (Au). In some examples, the negative electrode may form a eutectic mixture (e.g., enabling a lower operating temperature of the cell in some cases). The calcium alloy may comprise a calcium-lithium (Ca—Li), a calcium-magnesium (Ca—Mg), a calcium-lithium-magnesium (Ca—Li—Mg) alloy, a calcium-copper (Ca—Cu), a calcium-zinc (Ca—Zn) alloy, a calcium-lithium-magnesium-copper alloy (Ca—Li—Mg—Cu), a calcium-lithium-magnesium-zinc alloy (Ca—Li—Mg—Zn), a calcium-magnesium-copper alloy (Ca—Mg—Cu), a calcium-magnesium-zinc alloy (Ca—Mg—Zn), a calcium-magnesium-copper-zinc alloy (Ca—Mg—Cu—Zn), or a calcium-lithium-magnesium-copper-zinc alloy (Ca—Li—Mg—Cu—Zn). The calcium alloy may maintain the negative electrode (e.g., first electrode) as a liquid at the operating temperature of the electrochemical cell. An anode that includes calcium may form an alloy with one or more components of the liquid electrolyte. The alloy formed from the calcium first electrode and the liquid electrolyte may be formed spontaneously upon heating of the cell or over time as the cell cycles through charge and discharge states. For example, the liquid electrolyte may comprise lithium, sodium, or potassium and the calcium first electrode may form an alloy with the lithium, sodium, or potassium. The alloy component(s) (e.g., magnesium, zinc, copper, etc.) may be added to the cell (e.g., into the negative current collector) during assembly of the cell.

A first electrode comprising a material (e.g., calcium or calcium alloy) that are in a liquid state at an operating temperature may charge and discharge more efficiently due to a reduced formation of dendrites and/or reduced cell shorting. Formation of dendrites may not be possible in a cell comprising a liquid first electrode (e.g., anode or negative electrode). Additionally, a liquid first electrode may wet the negative current collector and may be held in a shape and location to increase cell performance. A variety of electrode additives may be added to the first material to reduce the melting point of the first material such that the first electrode is in a liquid state at the operating temperature of the cell. Electrode additives may include lithium, sodium, magnesium, copper, and zinc. A first electrode may comprise greater than or equal to about 5 mole percent (mol %), 10 mol %, 20 mol %, 30 mol %, 40 mol %, 50 mol %, 60 mol %, 70 mol %, 80 mol %, 90 mol %, or more calcium. As an alternative, the first electrode may comprise greater than or equal to about 5 mol %, 10 mol %, 20 mol %, 30 mol %, 40 mol %, 50 mol %, 60 mol %, 70 mol %, 80 mol %, 90 mol %, or more lithium. As another alternative, the first electrode may comprise greater than or equal to about 5 mol %, 10 mol %, 20 mol %, 30 mol %, 40 mol %, 50 mol %, 60 mol %, 70 mol %, 80 mol %, 90 mol %, or more sodium. As another alternative, the first electrode may comprise greater than or equal to about 5 mol %, 10 mol %, 20 mol %, 30 mol %, 40 mol %, 50 mol %, 60 mol %, 70 mol %, 80 mol %, 90 mol %, or more mol % magnesium. As another alternative, the first electrode may comprise greater than or equal to about 5 mol %, 10 mol %, 20 mol %, 30 mol %, 40 mol %, 50 mol %, 60 mol %, 70 mol %, 80 mol %, 90 mol %, or more copper. As another alternative, the first electrode may comprise greater than or equal to about 5 mol %, 10 mol %, 20 mol %, 30 mol %, 40 mol %, 50 mol %, 60 mol %, 70 mol %, 80 mol %, 90 mol %, or more zinc. An another alternative, the first electrode may comprise an alloy comprising at least 2, 3, 4, 5, or all of calcium, lithium, sodium, magnesium, zinc, and copper at various stoichiometries. A first electrode may comprise any of the compositions shown in Table 1. The compositions shown in Table 1 are approximate and may vary.

TABLE 1

Example compositions of the first electrode in mole percent.

| ID | Ca | Li | Na | Mg | Zn | Cu |
|---|---|---|---|---|---|---|
| 1 | 100 | | | | | |
| 2 | 74 | | | 26 | | |
| 3 | 10 | | | 90 | | |
| 4 | 75 | | | 14 | 11 | |
| 5 | 67 | | | 20 | | 13 |
| 6 | 71 | | | 25 | | 4 |
| 7 | 70 | 30 | | | | |
| 8 | 63 | | 37 | | | |
| 9 | 57 | 10 | 33 | | | |
| 10 | 50 | 20 | 30 | | | |
| 11 | 47 | 10 | 28 | 5 | 5 | 5 |

A cell comprising a Ca—Li alloy in the negative electrode may comprise an electrolyte that contains some amount (e.g., at least about 2 mole percent) of at least one lithium halide salt (e.g., lithium chloride). In an example, the negative electrode comprises calcium and the electrolyte comprises a lithium salt (e.g., lithium chloride) and the calcium of the electrode reacts with the lithium of the salt to form a Ca—Li alloy. The electrolyte may comprise at least about 0.5 mole percent (mol %), at least about 1 mol %, at least about 2 mol %, at least about 3 mol %, at least about 4 mol %, at least about 5 mol %, at least about 6 mol %, at least about 8 mol %, at least about 10 mol %, at least about 15 mol %, at least about 20 mol %, at least about 30 mol %, at least about 40 mol %, at least about 50 mol %, at least about 60 mol %, at least about 70 mol %, at least about 80 mol %, or more lithium halide salt. The ratio of calcium to lithium metal in the negative electrode may be at least about 1-to-1, 1.5-to-1, 2-to-1, 2.5-to-1, 3-to-1, 3.5-to-1, 4-to-1, 5-to-1, 6-to-1, 7-to-1, 8-to-1, 9-to-1, or 10-to-1. During charging of a cell containing a Ca—Li alloy negative electrode, the Ca—Li alloy may form on the negative electrode and/or the amount of Ca—Li alloy may be increased by co-deposition of calcium and lithium metal onto the negative electrode. During discharging of a cell containing a Ca—Li alloy negative electrode, both calcium and lithium may dissolve from the negative electrode into the electrolyte as ions (e.g., $Ca^{2+}$, $Li^+$).

A cell with a Ca—Mg alloy negative electrode may comprise a magnesium salt (e.g., magnesium chloride) electrolyte. The electrolyte may comprise less than about 10 mol %, less than about 8 mol %, less than about 6 mol %, less than about 5 mol %, less than about 4 mol %, less than about 3 mol %, less than about 2 mol %, less than about 1 mol %, less than about 0.5 mol %, or less magnesium halide salt. In some examples, the electrolyte may comprise less than about 5 mol % magnesium halide salt. The ratio of calcium to magnesium metal in the negative electrode may be at least about 1-to-10, 1-to-9, 1-to-8, 1-to-7, 1-to-6, 1-to-5, 1-to-4, 1-to-3, 1-to-2, 1-to-1, 1.5-to-1, 2-to-1, 2.5-to-1, 3-to-1, 3.5-to-1, 4-to-1, 5-to-1, 6-to-1, 7-to-1, 8-to-1, 9-to-1, or 10-to-1. In a cell comprising a Ca—Mg alloy in the negative electrode, the Ca—Mg alloy may form on the negative electrode by depositing calcium from the electrolyte onto a magnesium metal or magnesium alloy during charging. During discharging, the Ca—Mg alloy may convert to magnesium or a magnesium alloy by preferentially dissolving calcium metal ions (e.g., Ca') from the Ca—Mg alloy into the electrolyte, thus leaving behind magnesium metal or magnesium alloy with a low amount of calcium metal (e.g., as compared to a cell in a charged state).

In some examples, the negative electrode may contain barium (Ba) metal and at least one barium halide salt. The ratio of barium to other metals in the negative electrode may be at least about 1-to-10, 1-to-9, 1-to-8, 1-to-7, 1-to-6, 1-to-5, 1-to-4, 1-to-3, 1-to-2, 1-to-1, 1.5-to-1, 2-to-1, 2.5-to-1, 3-to-1, 3.5-to-1, 4-to-1, 5-to-1, 6-to-1, 7-to-1, 8-to-1, 9-to-1, or 10-to-1. In one example, the negative electrode contains at least about a 1-to-1 ratio of barium to other metals. The electrolyte may comprise greater than or equal to about 0.5 mol %, 1 mol %, 2 mol %, 3 mol %, 4 mol %, 5 mol %, 6 mol %, 8 mol %, 10 mol 15 mol %, 20 mol %, 30 mol %, 40 mol %, 50 mol %, or more barium halide salt.

In some examples, the positive electrode (e.g., second electrode) may comprise antimony (Sb). In an example, the positive electrode may include one or more of antimony, tin, lead, bismuth, tellurium, selenium, or any combination thereof. In another example, the positive electrode may include an alkali or alkaline earth metal alloyed in, or reacted with, the positive electrode (e.g., second electrode). The positive electrode may be solid, semi-solid, or liquid at an operating temperature of the cell. In one example, the positive electrode comprises particles of solid antimony when the cell is in a charged state. The particles may be solid or semi-solid. In a discharged state, the cell may comprise solid antimony-containing intermetallic compounds (e.g., reaction products), such as $Ca_xSb_y$ intermetallic compounds (e.g., $CaSb_2$, $Ca_{11}Sb_{10}$, $Ca_5Sb_3$, $Ca_2Sb$), $Li_xSb_y$ intermetallic compounds (e.g., $Li_3Sb$, $Li_2Sb$, $Li_3Sb_2$, $LiSb_2$), $Li_xCa_ySb_z$ (e.g., $Li_1Ca_1Sb_1$) intermetallic compounds, or any combination thereof. In some embodiments, barium, sodium, potassium, or strontium may deposit into the solid positive electrode material (e.g., Sb), forming intermetallic compounds of Ba—Sb, Sr—Sb, Na—Sb, K—Sb, or any combination thereof. The intermetallic compounds may form during discharging through the electrochemical deposition of calcium, lithium, barium, and/or strontium from the electrolyte comprising the metal positive electrode (e.g., antimony metal or various intermetallic compounds).

The electrolyte may participate in one or more reactions with the second electrode during cycling of the cell and one or more additional metal antimonides may be generated during discharge. For example, the second electrode may react with components of the electrolyte to form sodium or lithium antimonides (e.g., $NaSb_3$ and $LiSb_3$, respectively). Non-stoichiometric materials may also be formed, such as lithium-doped antimony or sodium-doped antimony. Heterometallic antimonides may be formed by one or more reactions between the second electrode, one or more components of the first electrode, and/or the electrolyte during discharge. Heterometallic antimonides may include, but are not limited to, $LiCaSb$, $Li_{1.38}Ca_{10.62}Sb_9$, and $Sr_{2.37}Ca_{8.63}Sb_{10}$.

The second electrode (e.g., cathode or negative electrode) may include one or more non-electrochemically active additives or one or more electrochemically active additives. Non-electrochemically active additives may include steel, graphite, tungsten carbide, aluminum nitride, or any combination thereof. Aluminum nitride may be added to the second electrode as a particle. The particles may comprise various sized and/or morphologies. Aluminum nitride particles may be added as shot, fibers, powder, flakes, needles, particles, or any combination thereof. Non-electrochemically active additives may modify the electronic conductivity or active particle density of the second electrode.

The first and second electrodes may be added to the electrochemical cell in a given molar ratio. The molar ratio of the first electrode material (e.g., calcium) to second electrode material (e.g., antimony) may be selected to increase the efficiency of the electrochemical cell (e.g., charge and/or discharge). The molar ratio of the first electrode material to the second electrode material may be greater than or equal to about 1-to-1, 1-to-2, 1-to-3, 1-to-4, 1-to-5, 1-to-6, 1-to-7, 1-to-8, 1-to-9, 1-to-10, 2-to-1, 2-to-3, 2-to-5, 2-to-7, 2-to-9, 3-to-1, 3-to-2, 3-to-4, 3-to-5, 3-to-6, 3-to-7, 3-to-8, 3-to-9, 3-to-10, 4-to-1, 4-to-3, 4-to-5, 4-to-7, 4-to-9, 5-to-1, 5-to-2, 5-to-3, 5-to-4, 5-to-6, 5-to-7, 5-to-8, 5-to-9, 5-to-10, 6-to-1, 6-to-5, 6-to-7, 7-to-1, 7-to-2, 7-to-3, 7-to-4, 7-to-5, 7-to-6, 7-to-8, 7-to-9, 7-to-10, 8-to-1, 8-to-3, 8-to-5, 8-to-7, 8-to-9, 9-to-1, 9-to-2, 9-to-4, 9-to-5, 9-to-7, 9-to-8, or 9-to-10. In an example, the molar ratio of the first electrode material to the second electrode material is 3-to-2. In an example, the first electrode material is calcium, the second electrode material is antimony, and the molar ratio of calcium to antimony is 3-to-2.

The electrolyte may include a salt (e.g., molten salt), such as an alkali metal halide salt, alkaline earth metal salt, and/or a calcium salt. The electrolyte may be in a liquid or molten state at an operating temperature of the cell. The electrolyte may comprise a single substance (e.g., a single salt) or may be a mixture of substances. The electrolyte may comprise greater than or equal to 1, 2, 3, 4, 5, 6, 8, 10, 12, or more substances. The electrolyte may support ionic conduction of metal ions. For example, the electrolyte may permit conduction of cations, anions, or both cations and anions from the first and second electrodes. The solubility of the metallic components (e.g., first and/or second electrode materials and intermetallic compounds) in the electrolyte may be low. The electrolyte may have low electronic conductivity and permit high reaction kinetics.

The electrolyte may comprise a molten calcium salt. The calcium salt may permit rapid conduction of calcium ions through the electrolyte. Examples of calcium salts include, but are not limited to, calcium chloride ($CaCl_2$)), calcium fluoride ($CaF_2$), calcium bromide ($CaBr_2$), calcium iodide ($CaI_2$), or combinations thereof. In an example, the calcium salt is calcium chloride or calcium bromide. The electrolyte may comprise greater than or equal to about 1 mol %, 5 mol %, 10 mol %, 15 mol %, 20 mol %, 25 mol %, 30 mol %, 40 mol %, 50 mol %, 60 mol %, 70 mol %, 80 mol %, 90 mol %, or more calcium salt. The electrolyte may include a salt additive. Examples of salt additives include, but are not limited to, salt compounds that include fluorides (F), chlorides (Cl), bromides (Br), sodium (Na), potassium (K), rubidium (Rb), cesium (Cs), magnesium (Mg), strontium (Sr), or barium (Ba), such as lithium fluoride (LiF), lithium chloride (LiCl), lithium bromide (LiBr), lithium iodide (LiI), potassium chloride (KCl), barium fluoride ($BaF_2$), barium chloride ($BaCl_2$), barium bromide ($BaBr_2$), barium iodide ($BaI_2$), strontium fluoride ($SrF_2$), strontium chloride ($SrCl_2$), strontium bromide ($SrBr_2$), sodium fluoride (NaF), sodium chloride (NaCl), sodium bromide (NaBr), sodium iodide (NaI), or combinations thereof. The electrolyte may comprise greater than or equal to about 0.5 mol %, 1 mol %, 2 mol %, 3 mol %, 4 mol %, 5 mol %, 6 mol %, 8 mol %, 10 mol %, 15 mol %, 20 mol %, 30 mol %, 40 mol %, 50 mol %, or more salt additive. In one example, the electrolyte comprises about 30 mol % calcium chloride, about 15 mol % potassium chloride, and about 55 mol % lithium chloride. In one example, the electrolyte comprises about 35 mol % calcium chloride and about 65 mol % lithium chloride. In one example, the electrolyte comprises about 24 mol % lithium chloride, about 38 mol % calcium chloride, and about 38 mol % strontium chloride. In one example, the electrolyte comprises at least about 20 weight percent (wt %) calcium chloride, at least about 20 wt % strontium chloride, and at least about 10 wt % potassium chloride. In one example, the electrolyte comprises at least about 10 wt % lithium chloride, at least about 30 wt % calcium chloride, at least about 30 wt % strontium chloride, and at least about 10 wt % potassium chloride. Other example salt compositions are shown in Table 2. The values shown in Table 2 are approximate values and may vary.

TABLE 2

Example electrolyte compositions in mole percent by cation

| ID | CaCl$_2$ | LiCl | NaCl | KCl | SrCl2 | BaCl2 | CaBr$_2$ | LiBr | NaBr |
|---|---|---|---|---|---|---|---|---|---|
| 1 | 35 | 65 | | | | | | | |
| 2 | 48 | | 52 | | | | | | |
| 3 | 40.0 | | 41.9 | | 18.1 | | | | |
| 4 | 51.5 | | | | | | | 7.6 | 40.9 |
| 5 | 7.2 | 17.3 | | 48.2 | 27.3 | | | | |
| 6 | 40.0 | | | | 18.1 | | | | 41.9 |
| 7 | | | | 13 | | 29 | 58 | | |
| 8 | 11.7 | 45 | | 27.5 | 15.8 | | | | |
| 9 | 12.8 | 39.5 | | 30.3 | 17.4 | | | | |
| 10 | 14 | 34 | | 33 | 19 | | | | |
| 11 | 26.4 | 34.0 | 27.6 | | 11.9 | | | | |
| 12 | 20.4 | 49.1 | 21.3 | | 9.2 | | | | |
| 13 | 24.0 | 40.0 | 25.1 | | 10.9 | | | | |
| 14 | 28.4 | 29.0 | 29.7 | | 20.4 | | | | |
| 15 | 21 | | 23 | 56 | | | | | |
| 16 | 19 | | 21 | 50 | 10 | | | | |
| 17 | 55 | | 40 | 5 | | | | | |
| 18 | 50 | | 36 | 4 | 10 | | | | |
| 19 | 40 | | | 42 | 18 | | | | |

TABLE 2-continued

Example electrolyte compositions in mole percent by cation

| ID | CaCl$_2$ | LiCl | NaCl | KCl | SrCl2 | BaCl2 | CaBr$_2$ | LiBr | NaBr |
|----|------|------|------|-----|-------|-------|------|------|------|
| 20 | 36 | 5 | 5 | 38 | 16 | | | | |
| 21 | 52 | | 48 | | | | | | |
| 22 | 47 | 10 | 43 | | | | | | |
| 23 | 47 | 5 | 43 | 5 | | | | | |
| 24 | 47 | | 43 | 10 | | | | | |

Alternatively, or in addition to, the salt of the alkali metal may be for example, a non-chloride halide, bistriflimide, fluorosulfano-amine, perchlorate, hexaflourophosphate, tetrafluoroborate, carbonate, hydroxide, nitrates, nitrites, sulfates, sulfites, or combinations thereof.

In an example, the negative electrode and the positive electrode of an electrochemical energy storage device are in a liquid state at an operating temperature of the energy storage device. In another example, the negative electrode and the positive electrode of an electrochemical energy storage device are in a solid state at an operating temperature of the energy storage device. In another example, the negative electrode and the positive electrode of an electrochemical energy storage device are in a semi-solid state at an operating temperature of the energy storage device. In another example, the negative electrode is in a liquid state and the positive electrode is in a solid state at an operating temperature of the energy storage device. In another example, the negative electrode is in a semi-solid state and the positive electrode is in a solid state at an operating temperature of the energy storage device. In another example, the negative electrode is in a liquid state and the positive electrode is in a semi-solid state at an operating temperature of the energy storage device. In another example, the negative electrode is in a solid state and the positive electrode is in a semi-solid state at an operating temperature of the energy storage device. In another example, the negative electrode is in a solid state and the positive electrode is in a liquid state at an operating temperature of the energy storage device.

To maintain the electrolyte and/or at least one of the electrodes in the liquid or semi-solid states, the battery cell may be heated to any suitable temperature. In some examples, the battery cell is heated to and/or maintained at a temperature of about 100° C., 150° C., 200° C., 250° C., 300° C., 350° C., 400° C., 450° C., 500° C., 550° C., 600° C., 650° C., or 700° C. The battery cell may be heated to and/or maintained at a temperature of greater than or equal to about 100° C., 150° C., 200° C., 250° C., 300° C., 350° C., 400° C., 450° C., 500° C., 550° C., 600° C., 650° C., 700° C., or more. In some situations, the battery cell is heated from about 150° C. to about 600° C., about 400° C. to about 500° C., or about 450° C. to about 575° C. In an example, an electrochemical cell is operated at a temperature between about 300° C. and 650° C.

The electrochemical cell or energy storage device may be at least partially or fully self-heated. For example, a battery may be sufficiently insulated, charged, discharged, and/or conditioned at sufficient rates, and/or cycle a sufficient percentage of the time to allow the system to generate sufficient heat through inefficiencies of the cycling operation that cells are maintained at a given operating temperature (e.g., a cell operating temperature above the freezing point of the electrolyte and/or at least one of the electrodes) without the need for additional energy to be supplied to the system to maintain the operating temperature.

Electrochemical cells of the disclosure may be adapted to cycle between charged (or energy storage) modes and discharged (or energy release) modes. In some examples, an electrochemical cell can be fully charged, partially charged or partially discharged, or fully discharged.

During a charging mode of an electrochemical energy storage device, electrical current received from an external power source (e.g., a generator or an electrical grid) may cause metal atoms in the metal positive electrode to release one or more electrons, dissolving into the electrolyte as a positively charged ion (i.e., cation). Simultaneously, cations of the same species of cations of a different species can migrate through the electrolyte and may accept electrons at the negative electrode, causing the cations to transition to a neutral metal species, thereby adding to the mass of the negative electrode. The removal of one or more metal species from the positive electrode and the addition of metal to the negative electrode stores electrochemical energy. During an energy discharge mode, an electrical load is coupled to the electrodes and the previously added metal species in the negative electrode can be released from the metal negative electrode, pass through the electrolyte as ions, and the added metal species or another metal species deposits as a neutral species with the positive electrode (and in some cases alloy with the positive electrode material), with the flow of ions accompanied by the external and matching flow of electrons through the external circuit/load. This electrochemically facilitated metal alloying reaction discharges the previously stored electrochemical energy to the electrical load. During charging, the alloy at the positive electrode disassociates to yield metal cations, which migrates through the electrolyte to the negative electrode where metal cations may be reduced to neutral metal and may be added to the negative electrode.

In some examples, ions can migrate through an electrolyte from an anode to a cathode, or vice versa. In some cases, ions can migrate through an electrolyte in a push-pop fashion in which an entering ion of one type ejects an ion of the same type from the electrolyte. For example, during discharge, a calcium anode and a calcium chloride electrolyte can contribute a calcium cation to a cathode by a process in which a calcium cation formed at the anode interacts with the electrolyte to eject a calcium cation from the electrolyte into the cathode. The calcium cation formed at the anode in such a case may not necessarily migrate through the electrolyte to the cathode. The cation can be formed at an interface between the anode and the electrolyte, and accepted at an interface of the cathode and the electrolyte.

In an example cell, upon discharging, cations formed at the negative electrode can migrate into the electrolyte. During operation, cells with different electrolytes and electrode compositions may not behave the same during cycling. Some cell chemistries may involve the movement of one species (e.g., Ca) from the negative electrode to the positive electrode and vice versa. Other cell chemistries may involve multiple species depositing on and being extracted from either electrode. The multiple species may be the same on both electrodes (e.g., Ca and Li depositing onto the negative electrode during charging, and Ca and Li depositing into the positive electrode during discharging) of the multiple species may not be the same on both electrodes (e.g., Ca deposits onto negative electrode while charging, and Ca and Li deposit onto positive electrode during discharging). Concurrently, the electrolyte may provide a cation of the same or a different species (e.g., the cation of the negative electrode material or cations from the electrolyte) to the positive electrode, which may reduce from a cation to a neutrally charged species, and alloy or form an intermetallic compound with the positive electrode. In a discharged state, the negative electrode may comprise a relatively small amount of electrode material (compared to a charged state) and/or be depleted of the negative electrode material (e.g., Ca, Li, Na, Mg). During charging, the cathode alloy or intermetallic compound at the positive electrode may disassociate to yield cations (e.g. $Ca^{2+}$, $Li^+$, $Na^+$, $Mg^{2+}$, $Ba^{2+}$), which migrate into the electrolyte, and intermetallic compound converts to a positive electrode metal (e.g., Sb) or metal alloy with negligible amounts of the negative electrode metal(s) or metal species associated with the cations in the electrolyte. The electrolyte may then provide cations (e.g., the cation of the negative electrode material) to the negative electrode, which may replenish the negative electrode to provide a cell in a charged state. A cell may operate in a push-pop fashion, in which the entry of a cation into the electrolyte results in the discharge of the same cation from the electrolyte.

Electrochemical cells of the disclosure can include housings that may be suited for various uses and operations. A housing can include one cell or a plurality of cells. A housing can be configured to electrically couple the electrodes to a switch, which can be connected to the external power source and the electrical load. The cell housing may include, for example, an electrically conductive container that is electrically coupled to a first pole of the switch and/or another cell, and an electrically conductive terminal (e.g., a terminal on the seal) that are electrically isolated from the electrically conductive container is electrically coupled to a second pole of the switch and/or another cell. The cell can be arranged within a cavity of the container. A first one of the electrodes of the cell can contact and be electrically coupled with an end wall of the container. An electrically insulating seal (e.g., bonded ceramic ring) may electrically isolate negative potential portions of the cell from positive portions of the cell (e.g., electrically insulate the negative current lead from the positive current lead). In an example, the negative current lead and the container lid (e.g., cell cap) can be electrically isolated from each other, where a dielectric sealant material can be placed between the negative current lead and the cell cap. As an alternative, a housing includes an electrically insulating sheath (e.g., alumina sheath) or corrosion resistant and electrically conductive sheath or crucible (e.g. graphite sheath or crucible). In some cases, a housing and/or container may be a battery housing and/or container.

Electrochemical Cells

A battery, as used herein, can comprise a plurality of electrochemical cells. Individual cells of the plurality can be electrically coupled to one another in series and/or in parallel. In serial connectivity, the positive terminal of a first cell is connected to a negative terminal of a second cell. In parallel connectivity, the positive terminal of a first cell can be connected to a positive terminal of a second, and/or additional, cell(s).

Reference will now be made to the figures, wherein like numerals refer to like parts throughout. It will be appreciated that the figures and features therein are not necessarily drawn to scale.

With reference to FIG. 1, an electrochemical cell 101 is a unit comprising an anode and a cathode. The cell may comprise an electrolyte and be sealed in a housing as described herein. In some cases, the electrochemical cells can be stacked 102 to form a battery (i.e., a compilation of electrochemical cells). The cells can be arranged in parallel, in series, or both in parallel and in series 103.

Electrochemical cells of the disclosure may be capable of storing and/or receiving input of ("taking in") substantially large amounts of energy. In some instances, a cell is capable of storing and/or taking in about 1 Watt-hour (Wh), 5 Wh, 25 Wh, 50 Wh, 100 Wh, 500 Wh, 1 kilowatt-hour (kWh), 1.5 kWh, or 2 kWh. In some instances, the battery is capable of storing and/or taking in greater than or equal to about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, a 30 kWh, 40 kWh, 50 kWh, or more. A cell can be capable of providing a current at a current density of greater than or equal to about 10 $mA/cm^2$, 20 $mA/cm^2$, 30 $mA/cm^2$, 40 $mA/cm^2$, 50 $mA/cm^2$, 60 $mA/cm^2$, 70 $mA/cm^2$, 80 $mA/cm^2$, 90 $mA/cm^2$, 100 $mA/cm^2$, 200 $mA/cm^2$, 300 $mA/cm^2$, 400 $mA/cm^2$, 500 $mA/cm^2$, 600 $mA/cm^2$, 700 $mA/cm^2$, 800 $mA/cm^2$, 900 $mA/cm^2$, 1 $A/cm^2$, 2 $A/cm^2$, 3 $A/cm^2$, 4 $A/cm^2$, 5 $A/cm^2$, or 10 $A/cm^2$. In an example, the cell provides a current density of less than or equal to about 300 $mA/cm^2$. The current density may be determined based on the effective cross-sectional area of the electrolyte and where the cross-sectional area is the area that is orthogonal to the net flow direction of ions through the electrolyte during charge or discharge processes. In some instances, a cell can be capable of operating at a direct current (DC) efficiency of greater than or equal to about 10%, 20%, 30%, 35%, 40%, 45%, 50%, 55%, 60%, 65%, 70%, 75%, 80%, 90%, 95%, and the like. In some instances, a cell can be capable of operating at a charge efficiency of greater than or equal to about 10%, 20%, 30%, 40%, 50%, 60%, 70%, 80%, 85%, 90%, 95%, 98%, 99%, and the like.

An electrochemical cell may operate in a voltage-limited mode, capacity-limited mode, constant current mode, constant power mode, constant voltage mode, or any combination thereof. An electrochemical cell can be operated at a voltage of greater than or equal to about 0.1 V, 0.2 V, 0.3 V, 0.4 V, 0.5 V, 0.6 V, 0.8 V, 1 V, 1.2 V, 1.4 V, 1.6 V, or more. In an example, an electrochemical cell may be operated from about 0.2 V to 1.5 V or from about 0.6 V to 1.2 V.

An electrochemical cell of the present disclosure can have a response time of any suitable value (e.g., suitable for responding to disturbances in the power grid). In some instances, the response time is about 100 milliseconds (ms), 50 ms, 10 ms, 1 ms, and the like. In some cases, the response time is less than or equal to about 100 ms, 50 ms, 10 ms, 1 ms, or less.

A compilation or array of cells (i.e., battery) can include any suitable number of cells, such as greater than or equal to about 2, 5, 10, 50, 100, 500, 1000, 5000, 10000, or more. In some examples, a battery includes 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000, or 1,000,000 cells.

Batteries of the disclosure may be capable of storing and/or taking in a substantially large amount of energy for use with a power grid (i.e., a grid-scale battery) or other loads or uses. In some instances, a battery is capable of storing and/or taking in about 5 kilowatt-hour (kWh), 25 kWh, 50 kWh, 100 kWh, 500 kWh, 1 megawatt-hour (MWh), 1.5 MWh, 2 MWh, 3 MWh, 5 MWh, 10 MWh, 25 MWh, 50 MWh, or 100 MWh. In some instances, the battery is capable of storing and/or taking in greater than or equal to about 1 kWh, 5 kWh, 25 kWh, 50 kWh, 100 kWh, 500 kWh, 1 MWh, 1.5 MWh, 2 MWh, 3 MWh, 5 MWh, 10 MWh, 25 MWh, 50 MWh, 100 MWh, or more.

In some instances, the cells and cell housings are stackable. Any suitable number of cells can be stacked. Cells can be stacked side-by-side, on top of each other, or both. In some instances, greater than or equal to about 10, 50, 100, or 500 cells are stacked. In some cases, a stack of 100 cells is capable of storing and/or taking in at least 50 kWh of energy. A first stack of cells (e.g., 10 cells) can be electrically connected to a second stack of cells (e.g., another 10 cells) to increase the number of cells in electrical communication (e.g., 20 in this instance). In some instances, the energy storage device comprises a stack of 1 to 10, 11 to 50, 51 to 100, or more electrochemical cells.

An electrochemical energy storage device can include one or more individual electrochemical cells. An electrochemical cell can be housed in a container, which can include a container lid (e.g., cell cap) and seal component. The device can include greater than or equal to about 1, 2, 3, 4, 5, 6, 7, 8, 9, 10, 20, 30, 40, 50, 100, 200, 300, 400, 500, 1000, 10,000, 100,000 or 1,000,000 cells. The container lid may utilize, for example, a seal (e.g., annular dielectric gasket) to electrically isolate the positively polarized portion of the cell (e.g., cell lid) from the negatively polarized portion of the cell (e.g., negative current lead terminal on the seal). Such a component may be constructed from an electrically insulating material, such as, for example, glass, oxide ceramics, nitride ceramics, chalcogenides, or a combination thereof (e.g., ceramic, silicon oxide, aluminum oxide, nitrides comprising boron nitride, aluminum nitride, zirconium nitride, titanium nitride, carbides comprising silicon carbide, titanium carbide, or other oxide comprising of lithium oxide, calcium oxide, barium oxide, yttrium oxide, silicon oxide, aluminum oxide, or lithium nitride, or any combinations thereof). A seal may be fabricated using a high temperature 'brazing' process, whereby a braze material may be used to bond an electrically insulating ceramic material (e.g., aluminum nitride) component to one or more thin metal components (e.g., stainless steel, steel, iron or nickel alloy metal sleeve with a thickness less than about 0.1 mm), and the thin metal components may be joined to other metal components via a joining process (e.g., brazing or welding). Suitable braze materials may include silver, aluminum, titanium, or alloys thereof. Braze alloys may include a silver-aluminum braze alloy (e.g., the alloy may comprise about 95% silver and about 5% aluminum) or a titanium-based braze alloy (e.g., a titanium braze comprising about 40% titanium, about 20% zirconium, about 20% copper and about 20% nickel). The seal may be made hermetic by one or more methods. For example, the seal may be subject to relatively high compressive forces (e.g., greater than 10,000 psi) between the container lid and the container in order to provide a seal in addition to electrical isolation. Alternatively, the seal may be bonded through a weld or other chemically adhesive material that joins relevant cell components to the insulating sealant material.

Figure 2:
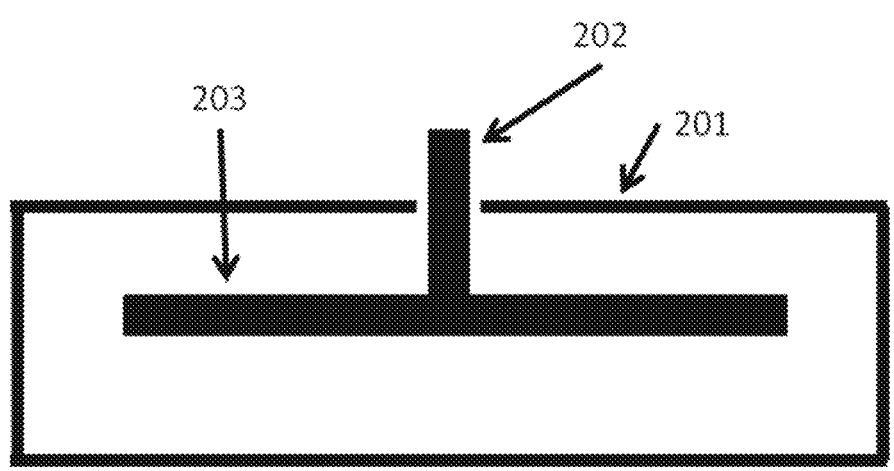
FIG. 2 shows a schematic cross-sectional illustration of an example housing having a conductor in electrical communication with a current collector passing through an aperture in the housing.

FIG. 2 schematically illustrates a battery that comprises an electrically conductive housing 201 and a conductor 202 in electrical communication with a current collector 203. The battery of FIG. 2 can be a cell of an energy storage device. The conductor can be electrically isolated from the housing and can protrude through the housing through an aperture in the housing such that the conductor of a first cell is in electrical communication with the housing of a second cell when the first and second cells are stacked.

In some cases, a cell comprises a negative current collector, a negative electrode, an electrolyte, a positive electrode and a positive current collector. The negative electrode can be part of the negative current collector. As an alternative, the negative electrode is separate from, but otherwise kept in electrical communication with, the negative current collector. The positive electrode can be part of the positive current collector. As an alternative, the positive electrode can be separate from, but otherwise kept in electrical communication with, the positive current collector.

A cell housing can comprise an electrically conductive container and a conductor in electrical communication with a current collector. The conductor may protrude through the housing through an aperture in the container and may be electrically isolated from the container. The conductor of a first housing may contact the container of a second housing when the first and second housings are stacked.

In some instances, the area of the aperture through which the conductor protrudes from the housing and/or container is small relative to the area of the housing and/or container. In some cases, the ratio of the area of the aperture to the area of the housing is about 0.001, 0.005, 0.01, 0.05, 0.1, 0.15, 0.2, or 0.3. In some cases, the ratio of the area of the aperture to the area of the housing is less than or equal to about 0.001, 0.005, 0.01, 0.05, 0.1, 0.15, 0.2, or 0.3.

A cell can comprise an electrically conductive housing and a conductor in electrical communication with a current collector. The conductor protrudes through the housing through an aperture in the housing and may be electrically isolated from the housing. The ratio of the area of the aperture to the area of the housing may be less than or equal to about 0.3, 0.2, 0.15, 0.1, 0.05, 0.01, 0.005, or 0.001.

A cell housing can comprise an electrically conductive container and a conductor in electrical communication with a current collector. The conductor protrudes through the container through an aperture in the container and is electrically isolated from the container. The ratio of the area of the aperture to the area of the container may be less than or equal to about 0.3, 0.2, 0.15, 0.1, 0.05, 0.01, 0.005, or 0.001. The housing can be capable of enclosing a cell that is capable of storing and/or taking in less than about 100 Wh of energy, about 100 Wh of energy, or more than about 100 Wh of energy. The cell can be capable of storing and/or taking in greater than or equal to about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh of energy.

Figure 3:
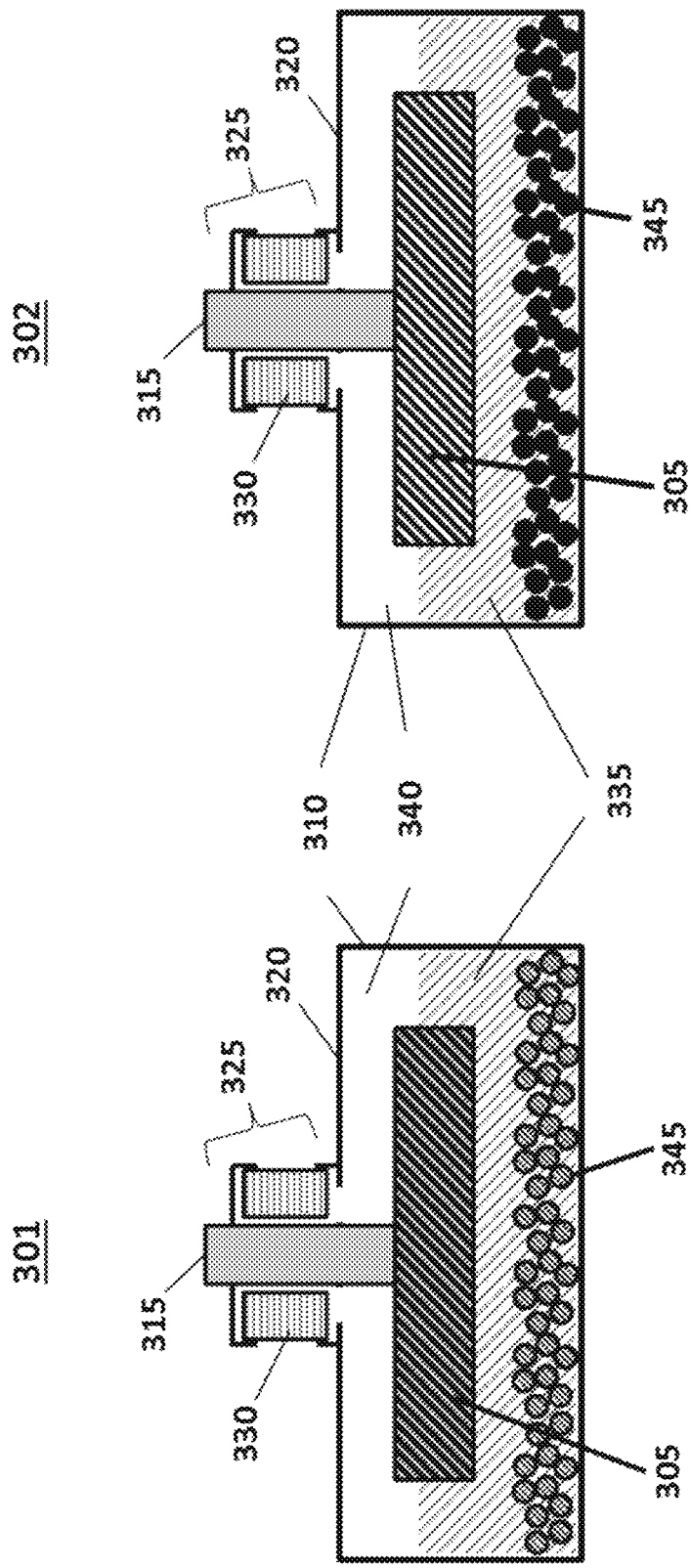
FIG. 3 shows a cross-sectional side view of an example electrochemical cell or battery.

FIG. 3 is a cross-sectional side view of an electrochemical cell or battery comprising a housing 310, an electrically conductive feed-through 315 (i.e., conductor, such as a negative current lead) that passes through an aperture in the housing and is in electrical communication with a metal negative electrode 305, a metal positive electrode 345, and a liquid salt electrolyte 335 between the metal electrodes. The negative current lead 315 may be electrically isolated from the housing (e.g., using electrically insulating seals). The negative current collector may comprise and/or be fabricated from porous stainless steel, such as, but not limited to stainless steel foam, woven mesh, expanded mesh, felt, perforated sheets, or any combination thereof. The negative current collector may contain the negative electrode. The negative electrode may be in a liquid, semi-solid, or solid state. The negative electrode may be in contact with the molten salt electrolyte. The salt electrolyte may be in contact with the positive metal electrode. The positive metal electrode may be in electrical communication with the housing along the side walls and/or along the bottom end wall of the housing.

The housing can be constructed from an electrically conductive material such as, for example, steel, iron, stainless steel, graphite, nickel, nickel based alloys, titanium, aluminum, molybdenum, tungsten, conductive compounds such as nitrides (e.g., silicon carbide or titanium carbide), or a combination thereof (e.g., alloy).

The housing may include a container and a container lid (e.g., cell cap). The container and container lid may be connected mechanically. The cross-sectional geometry of the housing (e.g., the geometry parallel to the container lid) can be circular, elliptical, square, rectangular, polygonal, curved, symmetric, asymmetric or any other compound shape based on design requirements for the battery. The negative current lead may be electrically isolated from the container and/or container lid (e.g., cell cap), via, for example, the use of an electrically insulating hermetic seal. In some examples, an electrically insulating barrier (e.g., seal) may be provided between the negative current lead and the container lid. As an alternative, the seal can be in the form of a gasket, for example, and placed between the container lid, and the container. In some examples, the electrochemical cell or battery may comprise two or more conductors passing through one or more apertures and in electrical communication with the metal negative electrode. In some instances, a separator structure (not shown) may be arranged within the electrolyte between the negative electrode and the positive electrode.

The housing may comprise a housing interior. The housing interior may include, but is not limited to, a sheath (e.g., a graphite sheath), a coating, a crucible (e.g., a graphite crucible), a surface treatment, a lining, or any combination thereof. In one example, the housing interior is a sheath. In another example, the housing interior is a crucible. In further examples, the housing interior is a coating or surface treatment. The housing interior may be thermally conductive, thermally insulating, electrically conductive, electrically insulating, or any combination thereof. In some cases, the housing interior may be provided for the protection of the housing (e.g., for protecting the stainless steel material of the housing from corrosion). In some examples, the housing interior is corrosion resistant. In some cases, the housing interior may be anti-wetting to a liquid electrode. In other cases, the housing interior may be anti-wetting to the liquid electrolyte.

The housing may comprise a thinner lining component of a separate metal or compound, or a coating (e.g., an electrically insulating coating), such as, for example, a steel housing with a graphite lining, or a steel housing with a nitride coating or lining (e.g., boron nitride, aluminum nitride), a titanium coating or lining, or a carbide coating or lining (e.g., silicon carbide, titanium carbide). The coating can exhibit favorable properties and functions, including surfaces that are anti-wetting. In some cases, the lining (e.g., graphite lining) may be dried by heating above room temperature in air or dried in a vacuum oven before or after being placed inside the cell housing. Drying or heating the lining may remove moisture from the lining prior to adding the electrolyte, positive electrode, or negative electrode to the cell housing.

The housing may include a thermally and/or electrically insulating sheath or crucible. In this configuration, the negative electrode may extend laterally between the side walls of the housing defined by the sheath without being electrically connected (i.e., shorted) to the positive electrode. Alternatively, the negative electrode may extend laterally between a first negative electrode end and a second negative electrode end. When the sheath is not provided, the negative electrode may have a diameter (or other characteristic dimension) that is less than the diameter (or other characteristic dimension such as width for a cuboid container) of the cavity defined by the housing.

The housing interior (e.g., sheath, crucible, and/or coating) can be constructed from a thermally insulating, thermally conductive, and/or electrically insulating or electrically conductive materials such as, for example, graphite, carbide (e.g., silicon carbide, titanium carbide, diamond-like carbide, vanadium carbide), nitride (e.g., boron nitride, titanium nitride, aluminum titanium nitride), alumina, titania, silica, magnesia, steel, stainless steel, molybdenum, tungsten, or a mixed oxide, such as, for example calcium oxide, aluminum oxide, silicon oxide, elemental silicon, lithium oxide, magnesium oxide, or any combination thereof. The housing interior may be coated using vapor deposition or another coating or surface treatment process, such as using physical vapor deposition and chemical vapor deposition. The housing interior may be a paint and may be applied by dipping, spraying, or brushing. For example, the coating may be a zinc phosphate primer, high temperature ceramic paint, graphite paint, or silicon coating. The housing interior may be plated, such as with a nickel or chrome plating. The coating may include passivation or pickling of the surface. For example, the housing interior may have an annular cross-sectional geometry that can extend laterally between a first housing interior end and a second housing interior end. The housing interior may be dimensioned such the housing interior is in contact and pressed up against the side walls of the cavity defined by the housing cavity. As an alternative, the housing interior can be used to prevent corrosion of the container and/or to prevent wetting of the a material up the side wall, and may be constructed out of an electronically conductive material, such as steel, stainless steel, tungsten, molybdenum, nickel, nickel based alloys, graphite, titanium, or titanium nitride. For example, the housing interior may be a thin metal (e.g., steel or stainless steel) and may be a coating. For example, the housing interior may be a thin mild steel or stainless steel metal liner that has undergone a boronization surface treatment or has received a silicon coating. The coating can cover just the inside of the walls, and/or, can also cover the bottom of the inside of the container. In some cases, the housing interior may be dried by heating above room temperature in air or dried in a vacuum oven before or after being placed inside the cell housing. Drying or heating the lining may remove moisture from the lining prior to adding the electrolyte, positive electrode, or negative electrode to the cell housing.

In some examples, an interior of the housing can have a thickness from about 3 millimeter (mm) to about 30 mm. In some examples, the housing interior (e.g., graphite crucible) can have a thickness of at least or equal to about 3 mm, 6 mm, 9 mm, 12 mm, 15 mm, 20 mm, 30 mm and the like. In some examples, the housing interior (e.g., graphite crucible) can have a thickness of less than about 3 mm, 6 mm, 9 mm, 12 mm, 15 mm, 20 mm, 30 mm and the like. In some examples, the housing interior can be less than about 1 mm thick. In some examples, the housing interior can be at least about 1 micrometer thick. For example, the housing interior can be from about 1 micrometer to about 1 mm thick.

Figure 5:
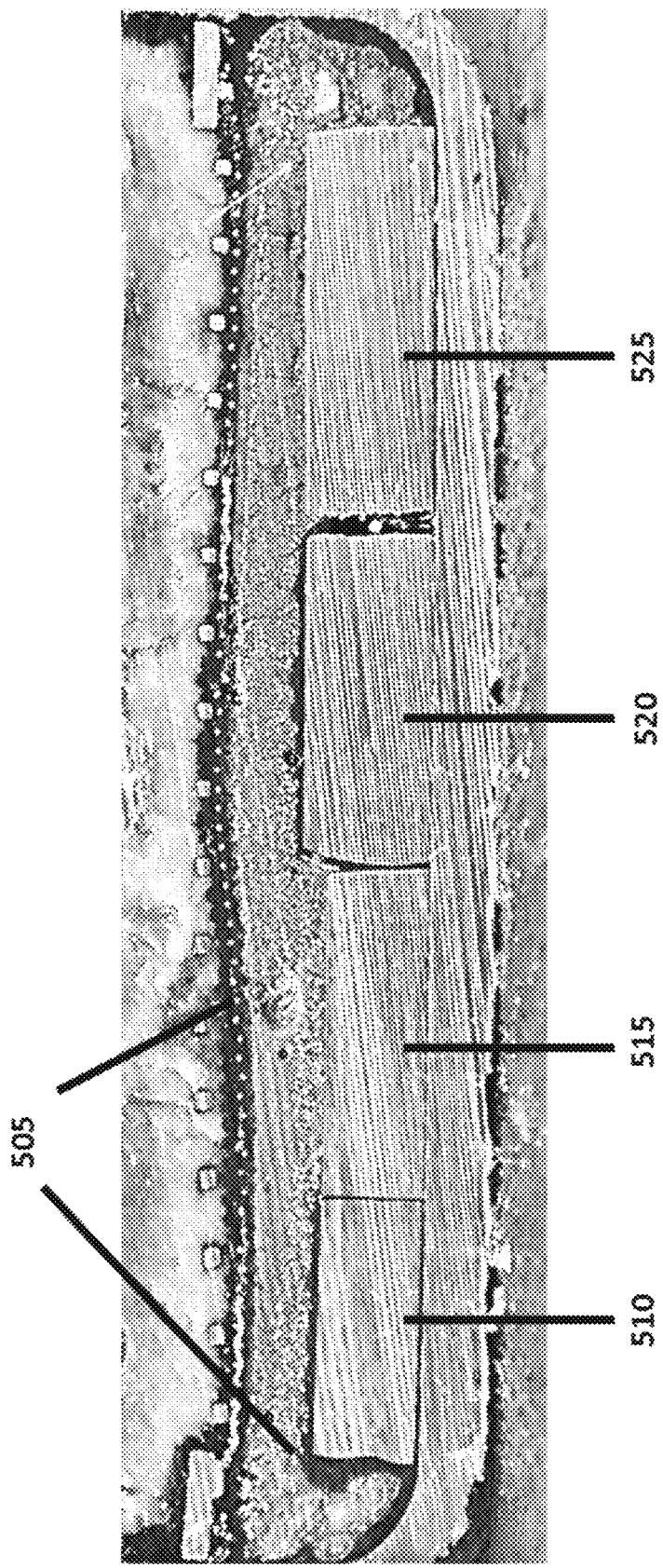
FIG. 5 shows an example of reactivity between electrode material and various housing materials.

The housing may comprise a surface treatment. The surface treatment may harden the material of the housing (e.g., stainless steel) and may increase the resistance of the housing material (e.g., stainless steel) to corrosion. The second electrode material (e.g., antimony particles) may react with iron within the housing and increase corrosion of the housing. Unlike a coating, a surface treatment may chemically modify the top surface of a material and, therefore, increase corrosion resistance. Example surface treatments include, but are not limited to, boronizing, nitriding, nitrocarburizing, carburizing, or any combination thereof. The surface of a steel or stainless steel boronized component (e.g., cell housing, housing interior, porous electrode separate layers) may include $Fe_xB_y$ (e.g., $Fe_2B$ or $FeB$) compounds, where 'x' and 'y' are numbers greater than zero. FIG. 5 shows an example of reactivity between electrode material (e.g., the second electrode) and various housing materials. Reaction components 505 may be seen at the interface between various housing materials and the second electrode material. The second electrode material may be reactive with non-treated mild steel 510 and non-treated 304 stainless steel 520. The second electrode material may not be reactive with or may have limited reactivity with boronized mild steel 515 and boronized 304 stainless steel 525.

Figure 6A:
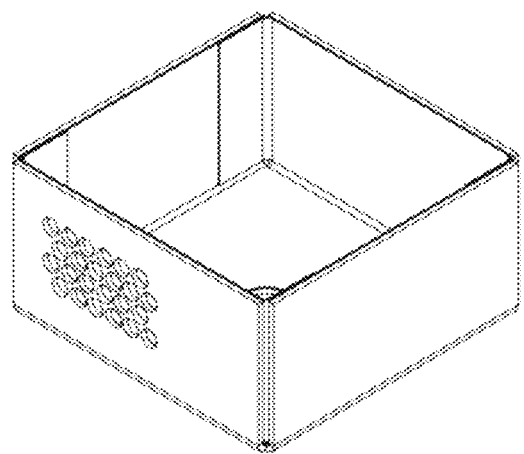
FIGS. 6A and 6B show example negative current collector baskets.
Figure 6B:
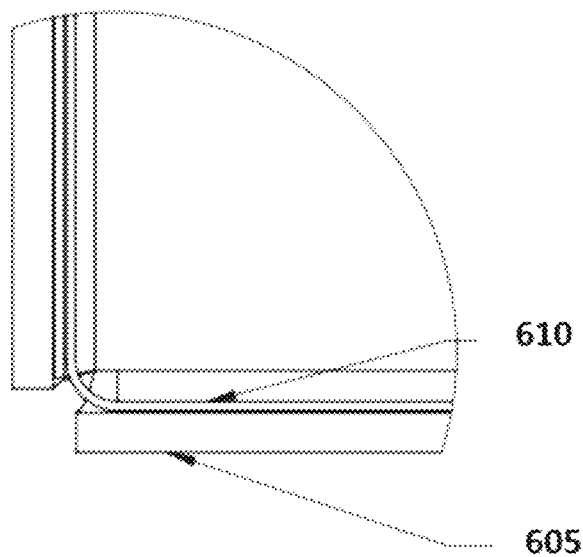

The cell can also include a first (e.g., negative) current collector and a second (e.g., positive) current collector. The negative current collector may be constructed from an electrically conductive material such as, for example, metal (e.g., stainless steel or steel) foam, perforated stainless steel or steel sheet, sheets of corrugated stainless steel or steel, sheets of woven mesh or expanded metal, or any combination thereof. The negative current collector may have a collector diameter that is less than or equal to approximately the diameter of the cavity defined by the housing. In some cases, the negative current collector may have a collector diameter (or other characteristic dimension) that is less than, equal to, or more than the diameter (or other characteristic dimension) of the negative electrode. The negative current collector may permit ions from the first electrode to migrate in and out of the current collector. The negative current collector may comprise a mechanical component that is rigid and provides geometric stability to the first electrode. The mechanical component may be an electrically conductive metal plate, perforated metal plate, an expanded metal sheet or plate, and/or a basket comprising one or more plates. The mechanical component may comprise a metal basket or a metal plate. The plate may be disposed in the electrochemical cell such that one of the two long dimensions (e.g., height) of the plate is substantially parallel to a gravitational acceleration vector (e.g., a long dimension is not parallel to the lid assembly). The metal may be 304 stainless steel, 304 L stainless steel, 316 stainless steel, or mild steel. The plate may have a thickness of less than or equal to about 5 mm, 4 mm, 3 mm, 2 mm, 1.5 mm, 1.2 mm, 1 mm, 0.8 mm, 0.5 mm, or less. The plate may have a thickness of greater than or equal to 0.5 mm, 0.8 mm, 1 mm, 1.2 mm, 1.5 mm, 2 mm, 3 mm, 4 mm, 5 mm, or more. In an example, the plate is about 1.2 mm thick. The plate may be solid or may comprise holes (e.g., holes through the plate) such as perforations or holes formed from creating the expanded metal sheet. Holes (e.g., perforations) in the plate may be disposed across the entire plate or sections of the plate may comprise holes. The holes may be less than or equal to about 10 mm, 8 mm, 6 mm, 4 mm, 2 mm, 1 mm, 0.5 mm, or less in diameter. The holes may be greater than or equal to about 0.5 mm, 1 mm, 2 mm, 4 mm, 6 mm, 8 mm, 10 mm, or more in diameter. The diameter of the holes may be constant across the plate or may vary across the plate. The plate may have a metal material disposed around the plate or disposed along one or more surfaces of the plate. The metal material may be a metal mesh, metal cloth, metal knit, or any other metal material capable of wetting a liquid metal electrode. The metal material (e.g., metal cloth) may be wrapped around the plate. The metal material may be welded to the plate via spot welding, tungsten inert gas (TIG) welding, laser welding, or brazing. Alternatively, or in addition to, the metal material may be attached to the plate by one or more fasteners, such as with bolts or rivets. In an example, the negative current collector may comprise a basket formed of one or more metal plates. The basket may be lined with a wire cloth, mesh, metal knit, metal foam, or any combination thereof. FIG. 6A shows an example perforated metal basket that may be used as a negative current collector. The basket may comprise five sides, each comprising a perforated metal plate. As shown in FIG. 6B, the walls 605 of the basket may be lined with a metal mesh or cloth 610. The walls of the basket may be coupled via welding, such as by spot welding or tungsten inert gas (TIG) welding.

The negative current collector may comprise a porous metallic region in which the first electrode material (e.g., liquid metal) associates. The first electrode material may be internal to or surround the porous metal region. The porous metallic region may comprise metal foam, mesh, knit, mesh wire cloth, expanded metal, or other electrically conductive material. The metal foam, mesh, knit, mesh wire cloth, and expanded metal may comprise 304 stainless steel, 304 L stainless steel, 316 stainless steel, mild steel, or other ferrous alloy. The electrically conductive material may be dispose internal to the metal basket. In an example, the porous metallic region is a wire cloth and multiple layers of the cloth are added to each surface of the metal current collector plate. The characteristic diameter or width of the pores within the porous metallic layer/component may be less than about 10 mm, 5 mm, 2 mm, 1 mm, 0.5 mm, 0.25 mm, 0.1 mm, 0.05 mm, 0.01 mm. For example, a perforated metal plate may have multiple layers of mesh wire cloth disposed adjacent to each surface of the plate. The plate may comprise greater than or equal to 1, 2, 3, 4, 5, 6, 8, 10, 12, or more layers of mesh wire cloth. In an example, the plate comprises five or more layers of mesh wire cloth. The cloth may be layered to create a structure that comprises pores between the intersecting wires of the cloth and between the layers of the cloth. Alternatively, or in addition to, the knitted mesh parts may be disposed adjacent to the plate. Formed knitted mesh parts may be disposed adjacent to the plate or around the negative current lead attached to the negative current collector. The plate may be formed into any geometry, such as cubic, prismatic, cylindrical, or any other shape.

The negative electrode may be contained within the negative current collector (e.g., foam or layers of metal mesh). In this configuration, the electrolyte layer comes up in contact with the bottom, sides, and/or the top of the negative current collector. The metal contained in the negative current collector (i.e., the negative electrode material) can be held away from the sidewalls of the housing, such as, for example, by the absorption and retention of a liquid metal negative electrode into the negative current collector, thus allowing the cell to run without an insulating sheath. In some embodiments, the negative electrode may be in a solid or semi-solid state. The solid or semi-solid metal negative electrode may be incorporated throughout the negative current collector. Alternatively, or in addition to, the solid or semi-solid metal negative electrode may be encompass and/or surround the negative current collector. In some embodiments, the negative electrode may comprise calcium. In some embodiments, the negative electrode may comprise a calcium alloy.

The positive current collector may be configured as part of the housing; for example, the bottom end wall and/or sidewalls of the housing may be configured as the positive current collector. The positive current collector may include a coating or a surface treatment as described elsewhere herein. Alternatively, the current collector may be discrete from the cell housing and may be electrically connected to the cell housing. In some cases, the positive current collector may not be electrically connected to the cell housing.

The second electrode (e.g., positive electrode) may be in electrical communication with a positive current collector. The positive electrode may be in electrical communication with the housing. The positive electrode may comprise antimony or an antimony alloy. In an example, the positive electrode may be a solid metal electrode. The solid metal positive electrode may be in a slab configuration. Alternatively, or in addition to, the solid metal positive electrode may comprise particles. The particles may comprise granules, flakes, needles, or any combination thereof of solid material. In an example, the positive electrode may be solid antimony. The solid antimony may be in a slab configuration. Alternatively, or in addition to, the solid antimony may be particles comprising granules, flakes, needles, or any combination thereof of solid material. The solid metal positive electrode particles may comprise a dimension of greater than or equal to about 0.00001 mm, 0.0001 mm, 0.001 mm, 0.01 mm, 0.1 mm, 0.25 mm, 0.5 mm, 1 mm, 2 mm, 3 mm, 5 mm, or larger. The solid particles may range in size from about 0.00001 mm to 0.0001 mm, 0.00001 mm to 0.001 mm, 0.00001 mm to 0.01 mm, 0.00001 mm to 0.1 mm, 0.00001 mm to 1 mm, 0.00001 mm to 10 mm. The size of the second electrode particles may remain constant as the cell cycles or change size as the cell cycles. The morphology of the second electrode may remain constant or may change as the cell cycles. In an example, small amounts of material spall off of a larger starting material to form particles. The larger starting material may be a particle or other geometry. In an example, the second electrode material may be added to the container as particles ranging in size from about 5 mm to 8 mm. The spalled off material may generate particles that range between about 0.1 micrometers (μm) and 100 μm. The second electrode material may be added to the electrochemical cell as particles, plates, or slabs of the second material. The plates or slabs of material may have at least one dimension that is greater than or equal to about 1 inch (in), 2 in, 3 in, 4 in, 5 in, 6 in, 7 in, 8 in, or more. In an example, the plates or slabs of material may have at least one dimension between about 4 in and 8 inch.

The solid particles of the second electrode (e.g., solid metal positive electrode) may be small to increase rate capability, electrode utilization, and cell capacity. Smaller particles may have a reduced diffusion distance, which may increase access and utilization of the second material (e.g., positive electrode material). The solid second electrode particles may comprise a dimension of less than or equal to about 10 mm, 8 mm, 6 mm, 5 mm, 4 mm, 3 mm, 2 mm, 1 mm, 0.5 mm, 0.25 mm, 0.1 mm, 0.01 mm, 0.001 mm, 0.0001 mm, 0.00001 mm, or smaller. In an example, the solid electrode particles of the second electrode may be less than or equal to about 10 mm. In an example, the solid electrode particles of the second electrode may be less than or equal to about 1 mm.

During operation the spalled off particles may be solid, semi-solid, or liquid. The second electrode may remain in the same state or may change states during operation. For example, the second electrode may transition from solid to semi-solid during charging and discharging cycles. The second electrode may comprise particles and the particles may agglomerate into larger structures and spall off into smaller structures during charging and discharging cycles. The particles or structures of the second electrode may be in electrical contact with each other during operation. The particles or structures of the second electrode may be in electrical contact with a positive current collector during operation. The positive current collector may be the housing or container of the electrochemical cell. The particles or structures of the second electrode may be in ionic contact with the electrolyte. The electrolyte may be disposed on top of the positive electrode. Alternatively, or in addition to, the second electrode may be submerged in or surrounded by the electrolyte. The second electrode and the electrolyte may behave as a Newtonian fluid, a non-Newtonian fluid, gel, or semi-solid material. The behavior of the second electrode and electrolyte may depend on the particle size distribution and particle density of the second electrode within the electrolyte.

The second electrode may comprise solid particles with a high electronic conductivity. The high electronic conductivity may permit the second electrode to conduct electrons without the use of other highly conductive materials or additives. For example, the second electrode may consist of particles of a single metal or metal alloy and may not comprise additional particles or materials to act as electrical conductors (e.g., graphite particles). The material of the solid particles of the second electrode may have an electronic conductivity of greater than or equal to about $2.5 \times 10^3$ Siemens per meter (S/m), $5 \times 10^3$ S/m, $7.5 \times 10^3$ S/m, $1 \times 10^4$ S/m, $2.5 \times 10^4$ S/m, $5 \times 10^4$ S/m, $7.5 \times 10^4$ S/m, $1 \times 10^5$ S/m, $2.5 \times 10^5$ S/m, $5 \times 10^5$ S/m, $7.5 \times 10^5$ S/m, $1 \times 10^6$ S/m, $2.5 \times 10^6$ S/m, $5 \times 10^6$ S/m, $7.5 \times 10^6$ S/m, $1 \times 10^7$ S/m, $2.5 \times 10^7$ S/m, $5 \times 10^7$ S/m, $7.5 \times 10^7$ S/m, $1 \times 10^8$ S/m, or more. In an example, the material of the solid particles of the second electrode has an electronic conductivity of greater than or equal to $1 \times 10^4$ S/m. The material of the solid particles of the second electrode may have an electronic conductivity from about $2.5 \times 10^3$ S/m to $5 \times 10^3$ S/m, $2.5 \times 10^3$ S/m to $7.5 \times 10^3$ S/m, $2.5 \times 10^3$ S/m to $1 \times 10^4$ S/m, $2.5 \times 10^3$ S/m to $2.5 \times 10^4$ S/m, $2.5 \times 10^3$ S/m to $5 \times 10^4$ S/m, $2.5 \times 10^3$ S/m to $7.5 \times 10^4$ S/m, $2.5 \times 10^3$ S/m to $1 \times 10^5$ S/m, $2.5 \times 10^3$ S/m to $2.5 \times 10^5$ S/m, $2.5 \times 10^3$ S/m to $5 \times 10^5$ S/m, $2.5 \times 10^3$ S/m to $7.5 \times 10^5$ S/m, $2.5 \times 10^3$ S/m to $1 \times 10^6$ S/m, $2.5 \times 10^3$ S/m to $2.5 \times 10^6$ S/m, $2.5 \times 10^3$ S/m to $5 \times 10^6$ S/m, $2.5 \times 10^3$ S/m to $7.5 \times 10^6$ S/m, $2.5 \times 10^3$ S/m to $1 \times 10^7$ S/m, $2.5 \times 10^3$ S/m to $2.5 \times 10^7$ S/m, $2.5 \times 10^3$ S/m to $5 \times 10^7$ S/m, $2.5 \times 10^3$ S/m to $7.5 \times 10^7$ S/m, or $2.5 \times 10^3$ S/m to $1 \times 10^8$ S/m.

The second electrode may comprise solid particles that are dispersed within a liquid (e.g., molten) salt. The solid particles may comprise the second material (e.g., in a charged state) or an intermetallic material comprising the first material and the second material (e.g., in a discharged state). The particles may be larger particles (e.g. on the order of five to eight millimeters) or smaller particles (e.g., on the order of about 1 to 100 micrometers). The second electrode may be disposed in an electrode compartment (e.g., a cathode or positive electrode compartment). The second electrode compartment may be disposed between the housing of the container (e.g., positive current collector) and a separator. The compartment may comprise the solid particles of the second electrode and the liquid electrolyte. The solid particles may comprise greater than or equal to about 5 volume percent (vol %), 10 vol %, 15 vol %, 20 vol %, 25 vol %, 30 vol %, 35 vol %, 40 vol %, 45 vol %, 50 vol %, 55 vol %, 60 vol %, or more volume percent of the second electrode compartment. The solid particles may comprise from about 5 vol % to 10 vol %, 5 vol % to 15 vol %, 5 vol % to 20 vol %, 5 vol % to 25 vol %, 5 vol % to 30 vol %, 5 vol % to 35 vol %, 5 vol % to 40 vol %, 5 vol % to 45 vol %, 5 vol % to 50 vol %, 5 vol % to 55 vol %, or 5 vol % to 60 vol % of the electrode compartment. In an example, the solid particles comprise from about 10 vol % to 25 vol % of the electrode compartment. The remaining volume of the second electrode compartment may comprise the electrolyte.

Current may be distributed substantially evenly across a positive and/or negative metal electrode in contact with an electrolyte along a surface (i.e., the current flowing across the surface may be uniform such that the current flowing through any portion of the surface does not substantially deviate from an average current density). In some examples, the maximum density of current flowing across an area of the surface is less than or equal to about 105%, 115%, 125%, 150%, 175%, 200%, 250%, 300%, or less of the average density of current flowing across the surface. In some examples, the minimum density of current flowing across an area of the surface is greater than or equal to about 50%, 60%, 70%, 80%, 90%, 95%, or more of the average density of current flowing across the surface.

The electrochemical cell may be arranged within the housing so that the average flow path of ions is substantially perpendicular to the plane of the container lid (e.g., ions flow vertically between the negative and positive electrode when the lid is facing in an upwards direction). This configuration, shown in FIG. 3, may comprise a negative electrode contained within a negative current collector 305 suspended within the cavity of the housing 310 by a negative current lead 315. The negative current lead 315 may extend through an aperture in the container lid 320 of the cell housing 310. A seal 325 may couple the negative current lead 315 to the container lid 320. The seal 325 may electrically isolate the negative current lead 315 from the container lid 320 using an insulating ceramic 330. In this configuration, the width of the negative current collector 305 may be greater than the height of the negative current collector 305. The negative electrode may be partially or fully submerged in a molten salt electrolyte 335. A gaseous headspace 340 may be present above the negative electrode (i.e., between the negative electrode and the container lid 315). The molten salt electrolyte 335 may be between, and separate, the negative electrode and the positive electrode 345. The positive electrode 335 may be position at or near the bottom (i.e., opposite the container lid 325) of the cavity. The positive electrode 345 may comprise a solid slab geometry or may comprise particles of solid material. The positive electrode may be positioned below the electrolyte 335 or may be submerged or surrounded by the electrolyte 335. During discharge, ions may flow from the negative electrode to the positive electrode 345 with an average flow path that is perpendicular to and away from the container lid 315. In a discharged state 302, the negative current collector 305 may contain a small amount of or substantially none of the negative electrode material and the positive electrode 345 may comprise one or more intermetallic compounds (e.g., as a layer, a shell, or particles). During charging, ions may flow from the positive electrode to the negative electrode with an average flow path that is perpendicular to and towards the container lid 320. In a charged state 301, the negative current collector 305 may comprise the negative electrode material (e.g., calcium or a calcium alloy) in a solid, semi-solid, or liquid state and the positive electrode 345 may predominantly comprise positive electrode material (e.g., the positive electrode material may be substantially free of intermetallic components).

Figure 4A:
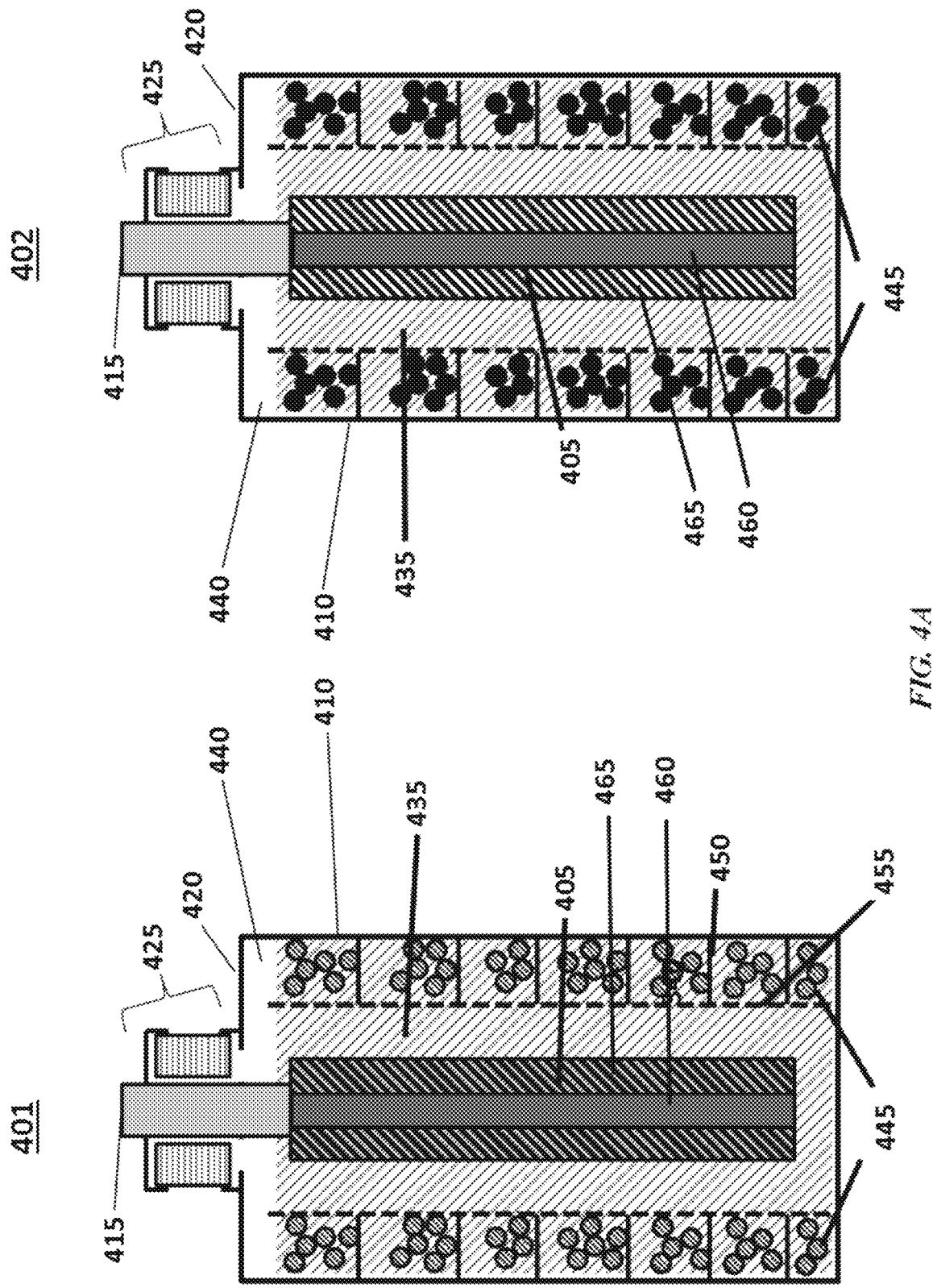
FIGS. 4A and 4B show example electrochemical cells or batteries with an electrode positioned along the sidewall of the cell.
Figure 4B:
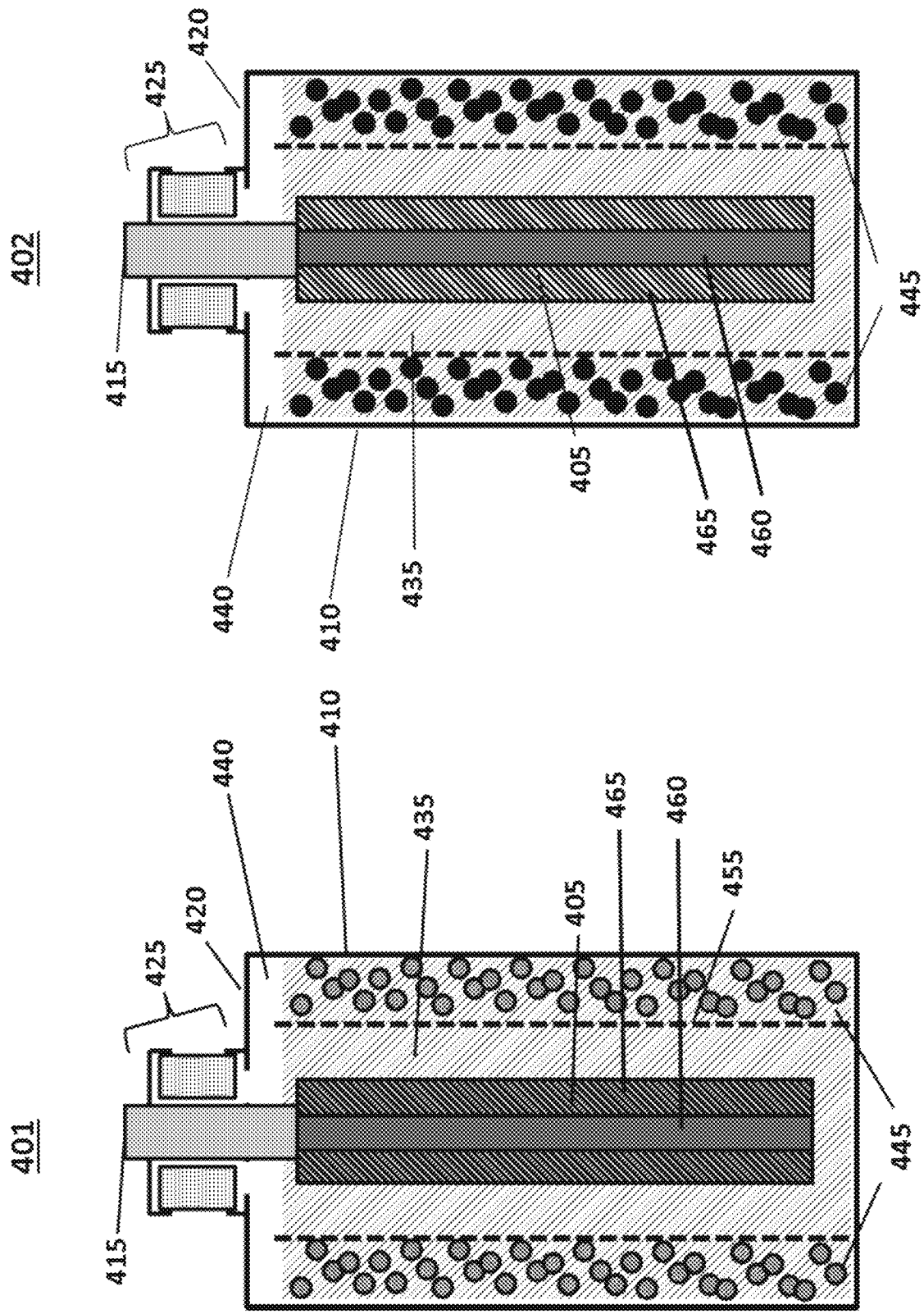

The electrochemical cell may be arranged within the housing such that the average flow path of ions is substantially parallel to the plane of the container lid (e.g., ions flow horizontally between the negative and positive electrode when the lid is facing in an upward direction). FIGS. 4A and 4B show example electrochemical cells in a charged state 401 and a discharged state 402. The electrochemical cell configuration may comprise a negative electrode contained within a negative current collector 405 suspended within the cavity of the housing 410 by a negative current lead 415. The cell may have height, width, and depth dimensions. The height may be a dimension that is parallel to a gravitational acceleration vector (e.g., substantially perpendicular to the plane of the lid assembly or vertical). The depth and width dimensions may be substantially not parallel to a gravitational acceleration vector (e.g., parallel to the plane of the lid assembly or horizontal). In an example, the depth and width dimensions may be the same dimension. In an example, the width may be the smaller horizontal dimension (e.g., perpendicular to the gravitational acceleration vector) and the depth may be the larger horizontal dimension (e.g., perpendicular to the gravitation al acceleration vector). In this configuration, the height of the negative current collector 405 may be greater than the width. The negative current collector 405 may comprise a metal plate 460 (e.g., steel or stainless steel) that is surrounded by or wrapped in a metal mesh, metal cloth, or expanded metal 465. The metal mesh may be a knit or woven mesh. In an example, the negative current collector 405 comprises one or more metal plates. The negative electrode may be partially or fully submerged in a molten salt electrolyte 445. A gaseous headspace 440 may be present between the negative electrode and the container lid 420. In some embodiments, the negative electrode may be submerged and covered by a molten electrolyte 435 and the gaseous headspace 440 may be between the electrolyte 435 and the container lid 420. The positive electrode 445 may be positioned along the sidewalls of the housing 410 between the bottom of the cavity and the container lid 420. The positive electrode 445 may be positioned along a portion of the interior sidewall or cover the entire interior sidewall of the cavity. The positive electrode 445 may cover an area that is greater than or equal to about 5%, 10%, 20%, 30%, 40%, 50%, 60%, 70%, 80%, 90%, or more of the sidewall. The sidewall of the housing 410 may be coupled to one or more troughs or trays 450. FIG. 4A shows an electrochemical cell with multiple troughs 450. The troughs 450 may be electrically coupled to the sidewall of the housing 410 by a weld, braze, or other bonding or adhesive method. The troughs 450 may hold or support the positive electrode 445. An internal edge of the troughs 450 (e.g., the edge closest to the negative current collector 405) may be coupled to a separator 455 (e.g., such as a retaining wall). Alternatively, as shown in FIG. 4B, an electrochemical cell may have one or no troughs and the positive electrode may be disposed in a cathode compartment between to a sidewall of the cell and one or more separators 455. The separator 455 may comprise a metal mesh, metal cloth, or sintered layers of metal mesh or cloth. The separator 455 may reduce, limit, or prevent positive electrode material from diffusing through the electrolyte 435 to contact the negative current collector 405. The troughs, positive current collector (e.g., internal surface of the housing), and separator may be surface treated to reduce or prevent corrosion. The surface treatment may be as described elsewhere herein.

The positive electrode may comprise a shell adjacent to the side wall. The positive electrode may be configured to allow the positive electrode material (e.g., solid antimony metal particles) to be dispersed along a region near or adjacent to the sidewalls of the container. When the cell is in a charged state, a signification portion (e.g., greater than fifty volume percent) of the region of the cell that contains the positive electrode may be filled with the electrolyte. During discharge of the battery, the positive electrode materials may expand as cations from the electrolyte and/or negative electrode are deposited onto the positive electrode particles. During discharge, the first electrode (e.g., positive electrode) may expand by greater than or equal to about 5 volume percent (vol %), 10 vol %, 20 vol %, 30 vol %, 40 vol %, 50 vol %, 60 vol %, 70 vol %, 80 vol %, 90 vol %, 100 vol %, 125 vol %, 150 vol %, 175 vol %, 200 vol %, or more. The capacity density (based on the surface area of the cathode that is orthogonal to the average flow of ions through that surface area) of the second electrode may be greater than or equal to about 0.1 ampere hour per square centimeter ($Ah/cm^2$), 0.2 $Ah/cm^2$, 0.3 $Ah/cm^2$, 0.4 $Ah/cm^2$, 0.5 $Ah/cm^2$, 0.6 $Ah/cm^2$, 0.7 $Ah/cm^2$, 0.8 $Ah/cm^2$, or more. The capacity density of the second electrode may be between about 0.1 $Ah/cm^2$ and 0.2 $Ah/cm^2$, 0.1 $Ah/cm^2$ and 0.3 $Ah/cm^2$, 0.1 $Ah/cm^2$ and 0.4 $Ah/cm^2$, 0.1 $Ah/cm^2$ and 0.5 $Ah/cm^2$, 0.1 $Ah/cm^2$ and 0.6 $Ah/cm^2$, 0.1 $Ah/cm^2$ and 0.7 $Ah/cm^2$, or 0.1 $Ah/cm^2$ and 0.8 $Ah/cm^2$. In an example, the capacity density of the second electrode is between about 0.16 $Ah/cm^2$ and 0.78 $Ah/cm^2$. The capacity volumetric density of the second electrode may be greater than or equal to about 0.1 ampere hour per milliliter (Ah/mL), 0.2 Ah/mL, 0.3 Ah/mL, 0.4 Ah/mL, 0.5 Ah/mL, 0.6 Ah/mL, 0.7 Ah/mL, 0.8 Ah/mL, 0.9 Ah/mL, 1 Ah/mL, 1.25 Ah/mL, or 1.5 Ah/mL.

There are multiple cell configurations that may provide expansion space for the positive electrode material, such as, but not limited to, using layers of troughs that line the cell walls (e.g., FIG. 4A) such that the positive electrode materials may be held on the bottom of each of these troughs and include room for a layer of molten salt above the positive electrode material. In a cell configuration that utilizes troughs, the troughs may be individual troughs connected to theسaidewall or stacks of interconnected troughs. The positive electrode may comprise slabs of solid material positioned on or in the troughs. Alternatively, or in addition to, the positive electrode may comprise solid particles positioned on or in the troughs. The positive electrode may be positioned as a shell surrounding the molten electrolyte. Alternatively, the electrolyte may fill the cavity and the positive electrode may be surrounded by or submerged in the electrolyte. The positive electrode may be in electrical communication with the sidewalls. In housing configurations utilizing troughs, the positive electrode may be in electrical communication with the troughs and the troughs may be in electrical communication with the sidewall. During discharge, ions may flow from the negative electrode to the positive electrode with an average flow path that is parallel to the container lid and towards theسidewalls of the housing. During charging, ions may flow from the positive electrode to the negative electrode with an average flow path that is parallel to the container lid and away from the sidewalls of the housing.

The troughs may be mounted substantially perpendicular to the sidewall of the housing. The housing may comprise greater than or equal to about 1, 2, 5, 10, 15, 20, 50, 100, or more troughs layered within the interior of the housing. The positive electrode may be placed on or in all troughs or may be placed on or in selected troughs. The interior of the housing may further comprise a retaining wall positioned to maintain the positive electrode on or in the troughs. The retaining wall may be a porous material that allows ions from the negative electrode, electrolyte, or positive electrode to flow freely through the wall. In some embodiments, the porous material may allow for the molten electrolyte to flow freely through the wall. The retaining wall may be a single porous sheet of material positioned from the bottom of the cavity to the lid. The pores of the retaining wall may have an average diameter less than or equal to about 5 millimeters (mm), 3 mm, 2 mm, 1 mm, 0.5 mm, 0.25, 0.1 mm, 0.01 mm, 0.001 mm, or smaller. The retaining wall may be a self-supporting (e.g., a sheath-like) structure within the housing. Alternatively, the retaining wall may be connected to the interior edge of one or more of the troughs. The retaining wall may comprise a single sheet of porous material. Alternatively, or in addition to, the retaining wall may comprise segments of porous material. Each segment may be connected to one or more troughs. The retaining wall may be connected to the troughs by solder, braze, weld, or any other method of adhesion. The retaining wall may be in electrical communication with the housing. Alternatively, the retaining wall may not be in electrical communication with the housing.

The cross-sectional geometry of the cell or battery can be circular, elliptical, square, rectangular, polygonal, curved, symmetric, asymmetric or any other compound shape based on design requirements for the battery. In an example, the cell or battery is axially symmetric with a circular or square cross-section. Components of cell or battery (e.g., negative current collector) may be arranged within the cell or battery in an axially symmetric fashion. In some cases, one or more components may be arranged asymmetrically, such as, for example, off the center of the axis.

The combined volume of positive and negative electrode material may be at least about 5%, 10%, 20%, 30%, 40%, 50%, 60%, 70%, 80%, 90%, or 95% of the volume of the battery (e.g., as defined by the outer-most housing of the battery, such as a shipping container). In some cases, the combined volume of anode and cathode material is greater than or equal to about 5%, 10%, 20%, 40%, 60%, or 75% of the volume of the cell. In some cases, the volume of the cell not comprising the anode, cathode, and electrolyte may comprise a gaseous headspace. The gaseous headspace may comprise an inert, non-reactive gas. The inert gas may comprise argon, a noble gas, or any combination thereof. The combined volume of the positive and negative electrodes material may grow or shrink (e.g., in height) during operation due to the volume (size) growth or shrinkage of the positive or negative electrode. In an example, during discharge, the volume of the negative electrode (anode during discharge) may be reduced due to transfer of the negative electrode material to the positive electrode (cathode during discharge), wherein the volume of the positive electrode is increased (e.g., as a result of an alloying reaction). The volume reduction of the negative electrode may or may not equal the volume increase of the positive electrode. The positive and negative electrode materials may react with each other to form a solid or semi-solid intermetallic compound, which may have a density that is the same, lower, or higher than the densities of the positive and/or negative electrode materials. Although the mass of material in the electrochemical cell or battery may be constant, one, two or more phases (e.g., liquid or solid) may be present, and each such phase may comprise a certain material composition (e.g., an alkali metal may be present in the materials and phases of the cell at varying concentrations: a liquid metal negative electrode may contain a high concentration of an alkali metal, a liquid metal positive electrode may contain an alloy of the alkali metal and the concentration of the alkali metal may vary during operation, and a intermetallic compound product of the positive and negative liquid metal electrodes may contain the alkali metal at a fixed or variable stoichiometry). The phases and/or materials may have different densities. As material is transferred between the phases and/or materials of the electrodes, a change in combined electrode volume may result.

In some cases, a cell can include one or more alloyed products that are liquid, semi-liquid (or semi-solid), or solid. The alloyed products can be immiscible with the negative electrode, positive electrode and/or electrolyte. The alloyed products can form from electrochemical processes during charging or discharging of a cell.

An alloyed product can include an element constituent of a negative electrode, positive electrode and/or electrolyte. An alloyed product can have a different density than the negative electrode, positive electrode or electrolyte, or a density that is similar or substantially the same. The location of the alloyed product can be a function of the density of the alloyed product compared to the densities of the negative electrode, electrolyte and positive electrode. The alloyed product can be situated in the negative electrode, positive electrode, or electrolyte, or at a location (e.g., interface) between the negative electrode and the electrolyte or between the positive electrode and the electrolyte. In an example, an alloyed product is an intermetallic layer between the positive electrode and the electrolyte (see FIG. 3 and FIGS. 4A and 4B). In other examples, the alloyed product can be at other locations within the cell and be formed of a material of different stoichiometries/compositions, depending on the chemistry, temperature, and/or charged state of the cell.

The intermetallic layer can include an intermetallic compound of a material originating from the negative electrode and positive electrode material. The intermetallic compound may be formed during discharging at an interface between a positive liquid metal electrode (liquid metal cathode in this configuration) and a liquid metal electrolyte. The intermetallic compound (or product) can be solid or semi-solid. In an example, the intermetallic layer can form at the interface between the liquid metal cathode and the liquid metal electrolyte. One surface of the intermetallic layer may be in contact with the positive electrode and another surface of the intermetallic layer may be in contact with the electrolyte. In some cases, the intermetallic layer may exhibit liquid properties (e.g., the intermetallic may be semi-solid, or it may be of a higher viscosity or density than one or more adjacent phases/materials).

In some embodiments, the positive electrode may comprise a layer of solid particles and an intermetallic layer may form above the layer of solid particles. Alternatively, or in addition to, an intermetallic layer may form around and/or circumscribe the individual particles. In an alternative embodiment, an intermetallic layer may form around and/or circumscribe a group of particles. In an example, a negative electrode includes calcium (Ca) or a calcium alloy, the positive electrode includes antimony (Sb), and the intermetallic layer includes Ca and Sb ($Ca_xSb$, where 'x' is a number greater than zero), such as, for example, $CaSb_2$. Cells with a Ca||Sb chemistry may contain calcium ions within the electrolyte as well as other salts (e.g., $CaCl_2$), LiCl, KCl, NaCl, $SrCl_2$, or a combination thereof). In a discharged state, the cell is deficient in Ca in the negative electrode and the positive electrode comprises an alloy of Ca—Sb, and during charging, Ca is supplied from the positive electrode, passes through the electrolyte as a positive ion, and deposits onto the negative current collector as Ca. In some cases, the product of the discharge reaction may be an intermetallic compound (i.e. $Ca_5Sb_3$ for the Ca||Sb cell chemistry), where the intermetallic layer may develop as a distinct solid phase by growing and expanding at the interface between the positive electrode and the electrolyte. For example, the intermetallic layer may grow and expand as a layer over the positive electrode or the intermetallic layer may grow as a shell around and into the positive electrode particles. The growth may be axially symmetrical or asymmetrical with respect to an axis of symmetry located at the center of the cell or battery. Alternatively, the solid intermetallic layer may develop and expand starting from one or more locations (also "nucleation sites" herein) along an interface between the metal cathode and liquid electrolyte. The nucleation sites may be located in a predetermined pattern along the surface; alternatively, the location of the nucleation sites may be stochastic (random), or determined by natural or induced defects at the interface between the metal cathode and the liquid electrolyte, or elsewhere within the cell or battery. In some examples, the solid or semi-solid intermetallic layer may not grow and expand horizontally. For example, the solid or semi-solid intermetallic layer may form evenly across the interface. In some examples, the intermetallic compounds may form on or adjacent to the surface of antimony particles and subsequently break-away from the surface of the antimony particles and become interspersed with electrolyte, while in some cases remaining in electronic communication with the positive current collector.

The solid intermetallic layer may begin developing at or near a location corresponding to the location of the external surface of the metal cathode particles at the commencement of discharging (i.e., the interface between the metal cathode and the electrolyte at the commencement of discharging), and may then grow in a radial direction of the metal cathode particles. Thus, the solid intermetallic layer may have an external interface or surface and an internal interface or surface. The external interface may remain in an approximately fixed location along the radius of the particle or granule, while the internal interface moves in a radial direction during discharge. In some cases, the solid intermetallic layer may grow and/or deform in the radial direction (i.e., intermetallic material is added to the layer from the radial direction).

During cycling, the formation of intermetallic compounds and the back-conversion of these intermetallic compounds to antimony may result in fragmentation of the antimony containing (e.g., antimony or antimony alloy) positive electrode particles, resulting in the formation of smaller positive electrode particles (e.g., at least about 0.0001 mm) than those initially assembled into the cell. The positive electrode particles may interserse (e.g., be surrounded) with the molten salt electrolyte. Alternatively, or in addition to, the positive electrode may experience substantially no fragmentation and the small antimony or intermetallic compound particles may remain substantially similar in size to the initial assembled particles after cycling the cell multiple times. The positive electrode may therefore comprise small (e.g., at least about 0.0001 mm) particles of antimony, an antimony alloy, and/or intermetallic compounds (e.g., comprising Ca, Li, Ba, and/or Sr, and Sb) interspersed with molten salt electrolyte.

Figure 7:
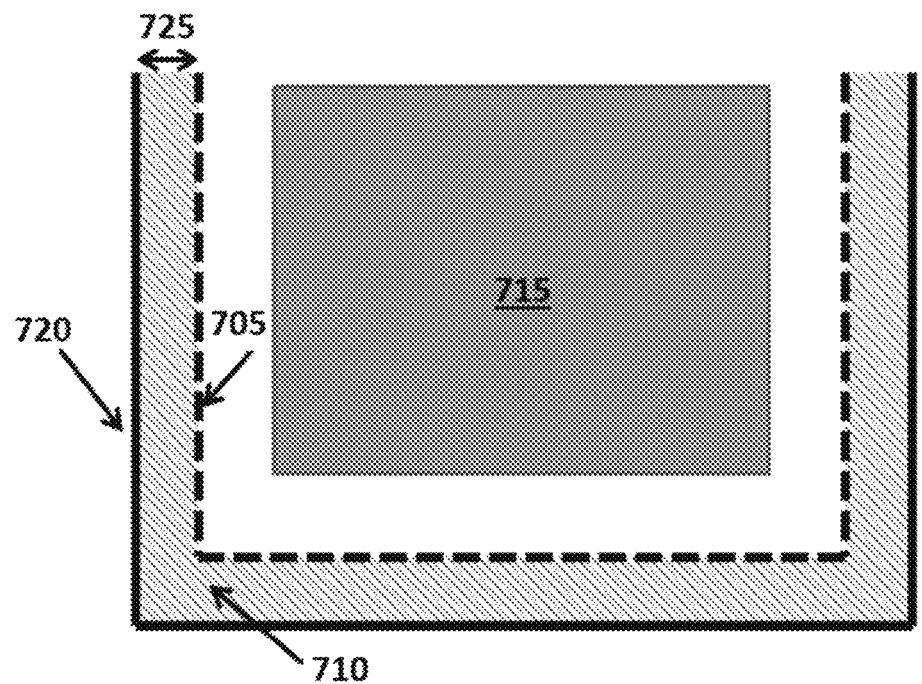
FIG. 7 shows a cross-sectional side view of an example electrochemical cell or battery with an electrode positioned along the sidewall and bottom of the cell.

During operation, positive electrode particles (e.g., the second material) may drift to the negative electrode which may result in lost cell capacity, internal cell shorting, increased leakage current, or any combination thereof, which may reduce the efficiency of the battery. Positive electrode particle drift may be prevented by incorporating a separator, such as a metal (e.g., stainless steel or steel) screen, woven or expanded metal mesh, perforated sheet, felt, or any combination thereof, electrically connected to the second electrode (e.g., positive electrode). FIG. 7 shows an example electrochemical cell with a separator 705 that forms a positive electrode 710 compartment and reduces or prevents diffusion or migration of the positive electrode material through the electrolyte to the negative electrode 715. The separator may be disposed internal to the housing such that the positive electrode 710 is disposed as a shell around the internal surface of the cell container 720. The separator may be positioned away from the internal walls of the container 720 such that the thickness 725 of the positive electrode 710 is greater than or equal to about 0.05 inches (in), 0.1 in, 0.15 in, 0.2 in, 0.3 in, 0.4 in, 0.5 in, 0.6 in, 0.8 in, 1.0 in, or more inches. The thickness 510 of the positive electrode may be less than or equal to 1.0 in, 0.8 in, 0.6 in, 0.5 in, 0.4 in, 0.3 in, 0.2 in, 0.15 in, 0.1 in, 0.05 in, or fewer inches.

The separator may be positioned such that that the second electrode (e.g., positive electrode) is confined to a volume of the electrochemical cell. The volume that the second electrode is confined to may be greater than or equal to about 1, 2, 3, 4, 5, 6, 7, 8, 9, 10, 15, 20, or more times the volume of the non-expanded or non-dispersed second electrode material (e.g., the initial volume of the second electrode material before heating and cell cycling). In an example, the volume that the second electrode is confine to is about eight times the volume of the non-expanded second electrode material.

Figure 8:
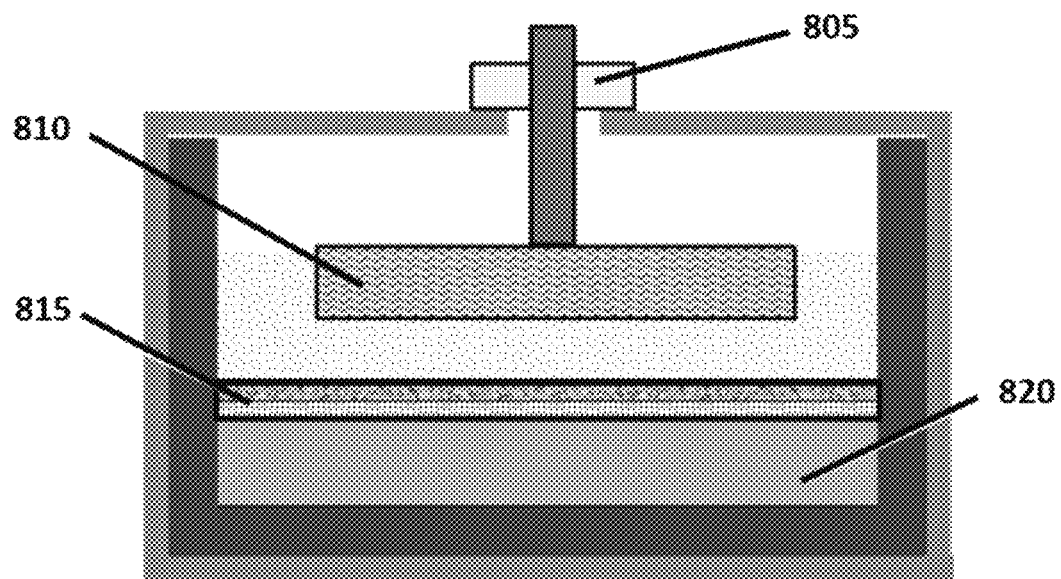
FIG. 8 shows a cross-sectional side view of an example electrochemical cell or battery with a separator positioned between the electrodes.
Figure 9A:
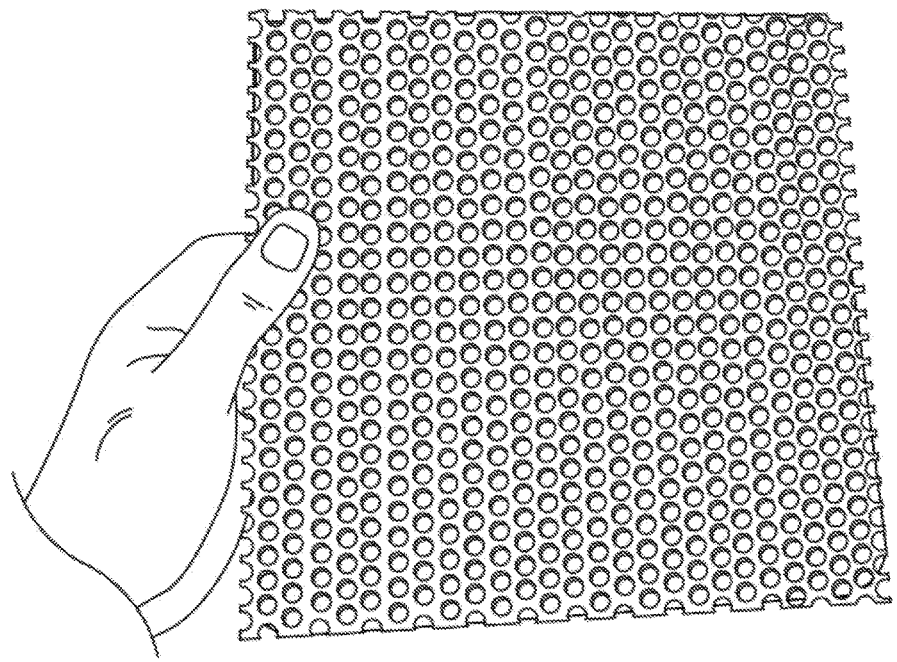
FIGS. 9A and 9B show example separator materials.
Figure 9B:
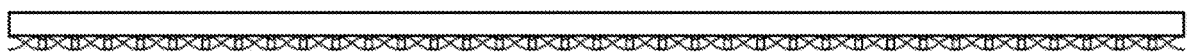

The separator may be disposed between the first electrode and the second electrode. FIG. 8 shows an example electrochemical cell configuration with a seal 805, first electrode in a negative current collector 810, second electrode 820, and separator 815 disposed between the negative current collector 810 and the second electrode 820. The separator may be positioned such that a long dimension of the separator is substantially orthogonal to vector of gravitational acceleration, as in FIG. 8, or such that a long dimension of the separator is substantially parallel to a vector of gravitational acceleration, as in FIGS. 4A and 4B. In an example, the separator is both substantially parallel and substantially orthogonal to a vector of gravitational acceleration, as shown in FIG. 7.

The separator may reduce or prevent the migration or diffusion of the second material (e.g., positive electrode material) and/or intermetallic material to the first electrode and negative current collector. In the absence of a separator, the intermetallic materials may migrate to the first electrode and contact the first electrode, thus shorting the electrochemical cell. The separator may act as a physical barrier to contain the material of the second electrode and/or the intermetallic material to a defined region of the cell. The separator may allow ionic species from the electrolyte (e.g., $Ca^{2+}$, $Na^+$, $K^+$, $Sr^+$) and molten salt to pass through.

The separator may comprise multiple layers. In an example, the separator comprises two layers, a structural layer and a filtering layer. The structural layer may comprise a perforated plate or other porous rigid material. The structural layer may reduce or prevent physical distortion of the separator layer (e.g., bowing or bending). The plate may have a thickness of less than or equal to about 5 mm, 4 mm, 3 mm, 2 mm, 1.5 mm, 1.2 mm, 1 mm, 0.8 mm, 0.5 mm, 0.1 mm, or less. The plate may have a thickness of greater than or equal to 0.1 mm, 0.5 mm, 0.8 mm, 1 mm, 1.2 mm, 1.5 mm, 2 mm, 3 mm, 4 mm, 5 mm, or more. In an example, the plate is about 1.2 mm thick. The plate may be perforated (e.g., comprise holes through the plate) or may be an expanded metal. The perforations or holes in the expanded metal may be less than or equal to about 10 mm, 8 mm, 6 mm, 4 mm, 2 mm, 1 mm, 0.5 mm, or less in diameter. The perforations or holes in the expanded metal may be greater than or equal to about 0.5 mm, 1 mm, 2 mm, 4 mm, 6 mm, 8 mm, 10 mm, or more in diameter. In an example, the diameter of the perforations or the width of the holes in the expanded metal is about 2 mm. The diameter of the perforations may be constant across the plate or may vary across the plate. The plate may be any size suitable to separate materials of the second electrode from the negative current collector. The plate may be substituted with an expanded metal, ridged wire cloth, or any other material that has holes and is suitably mechanically robust.

The filtering layer may comprise a wire cloth, mesh, felt, expanded metal, metal with holes formed within it, or sintered porous material. The filtering layer may be a single layer or may be multiple layers. In an example the filtering layer is a wire cloth with a weave pattern. Weave patterns may include a plain weave, twill weave, plain Dutch weave, and twilled Dutch weave, for wire cloths. In an example, the filtering layer comprises a plain Dutch weave. The filtering layer may be joined to the plate by a spot weld. The filtering layer may comprise greater than or equal to about 1, 2, 3, 4, 5, 6, 8, 10, 12, or more layers of wire cloth. The filtering layer may be disposed on the plate on the side adjacent to the second electrode (e.g., positive electrode). The filtering layer may have a nominal pore size of less than or equal to about 1 mm, 0.8 mm, 0.6 mm, 0.5 mm, 0.4 mm, 0.3 mm, 0.2 mm, 0.1 mm, 500 µm, 400 µm, 300 µm, 200 µm, 100 µm, 50 µm, 25 µm, or less. In an example, the filtering layer has a nominal pore size of less than about 0.8 mm. In an example, the filtering layer has a nominal pore size of about 25 µm. FIG. 10A shows a top view of a two layer separator comprising a perforated plate and mesh cloth and FIG. 10B shows a side view of the two layer separator. The top surface of the separator comprises a perforated plate and the bottom surface comprises a wire cloth. The filtering layer may comprise 304 stainless steel, 304 L stainless steel, 316 stainless steel, graphite felt, or mild steel. In an example, the filtering layer comprises graphite felt. The structural layer and/or the filtering layer may be surface treated or coated. The surface treatment or coating may be any of the surface treatments or coating described elsewhere herein. In an example, both the structural layer and the filtering layer are boronized.

The porous metal separator may comprise pores that are small enough to slow or stop the migration of the positive electrode particles from the positive electrode to the negative electrode. A sufficiently small pore size in the metal separator may be smaller than most of the positive electrode particles, thereby physically blocking positive electrode particles from passing through the metal separator. Alternatively, or in addition to, the pores of the metal separator may be sufficiently small as to slow the convective flow of molten salt across the separator, which may thereby reduce or prevent the positive electrode particles from flowing to the negative electrode by convective flow of the electrolyte. Alternatively, or in addition to, the pores of the metal separator may be sufficiently small as to slow or reduce flux of the positive electrode particles through the separator through indirect-physical means, such as through electrostatic repulsion based on the polarity of the separator and the surface charge of cathode particles. In one embodiment, a cell arranged with a layer of solid positive electrode particles on the bottom of a cell housing (e.g., FIG. 3) may also comprise a layer of stainless steel mesh positioned above the positive electrode particles, thereby preventing the positive electrode particles from drifting up to the negative electrode. A similar approach may be used in a cell configuration where the ion flow path is parallel with the cell lid orientation (e.g., FIG. 4), where a porous metal separator is positioned between the positive electrode and the negative electrode, whereby the metal separator is in electronic connection with the positive electrode and is electronically isolated from the negative electrode, thus preventing flow of the positive electrode particles to the negative electrode.

In one example, a cell may operate at about 500° C. and comprise a stainless steel (e.g., grade 304 stainless steel) cell body, a ceramic-to-metal braze seal comprising an aluminum nitride ceramic and a silver-based or titanium-based braze alloy, a calcium-lithium alloy negative electrode with a negative current collector comprising components fabricated from porous stainless steel sheets (e.g., perforated or expanded metal sheet), a positive electrode comprising solid antimony particles, an electrolyte comprising about 35 mol % lithium chloride and 65 mol % calcium chloride, and may comprise a porous metal (e.g., stainless steel) separator that is joined to the cell body and is electronically connected to the positive electrode. In one example, a cell may operate at about 500° C. and comprise a stainless steel (e.g., grade 304 stainless steel) cell body, a ceramic-to-metal braze seal comprising an aluminum nitride ceramic and a silver-based or titanium-based braze alloy, a calcium metal or calcium-magnesium metal alloy negative electrode with a negative current collector comprising components fabricated from porous stainless steel sheets (e.g., perforated or expanded metal sheet), a positive electrode comprising solid antimony particles, an electrolyte comprising at least about 30 mol % calcium chloride, at least about 30 mol % strontium chloride, and may comprise about 10 mol % potassium chloride, and may comprise a porous metal (e.g., stainless steel) separator that is joined to the cell body and is electronically connected to the positive electrode.

Any aspects of the disclosure described in relation to cathodes may equally apply to anodes at least in some configurations. Similarly, one or more battery electrodes and/or the electrolyte may not be liquid in alternative configurations. In an example, the electrolyte can be a polymer, a gel, or a paste. The electrolyte may be an ionic liquid electrolyte or an organic-based electrolyte. In a further example, at least one battery electrode can be a solid or a gel. Furthermore, in some examples, the electrodes and/or electrolyte may not include metal. Aspects of the disclosure are applicable to a variety of energy storage/transformation devices without being limited to liquid metal batteries.

The electrochemical cells can be arranged in series and/or parallel to form an electrochemical energy storage system (i.e., battery). The energy storage system can comprise packs and/or cores of electrochemical cells surrounded by a frame.

Energy Storage Systems and Computer Systems

Electrochemical cells can be attached in series and parallel in various configurations to produce packs, trays, cores, or electrochemical systems. The number and arrangement of various groups of electrochemical cells can be chosen to create the desired system voltage and energy storage capacity. The packs, trays, cores, or systems can then be enclosed together in high temperature insulation to create a system that can heat itself using the energy created from cells charging and discharging.

The packs or trays themselves can be connected vertically and/or horizontally to one another through busbars (e.g., unlike the cell-to-cell connections within a pack or tray which are generally direct connections such as brazes). In some cases, the busbar is flexible or comprises a flexible section (e.g., due to the non-isothermal expansion of the system throughout heat up and operation).

Also provided herein are control systems including computers programmed to control an energy storage system of the disclosure. An energy storage system can include an electrochemical energy storage device with one or more electrochemical energy storage cells. The device can be coupled to a computer system that regulates the charging and discharging of the device. The computer system can include one or more computer processors and a memory location coupled to the computer processor. The memory location comprises machine-executable code that, upon execution by the computer processor, implements any of the methods above or elsewhere herein.

An energy storage system can include an electrochemical energy storage device with one or more electrochemical energy storage cells. The device can be coupled to a computer system that regulates the charging and discharging of the device. The computer system can include one or more computer processors and a memory location coupled to the computer processor. The memory location comprises machine-executable code that, upon execution by the computer processor, implements any of the methods above or elsewhere herein.

Figure 10:
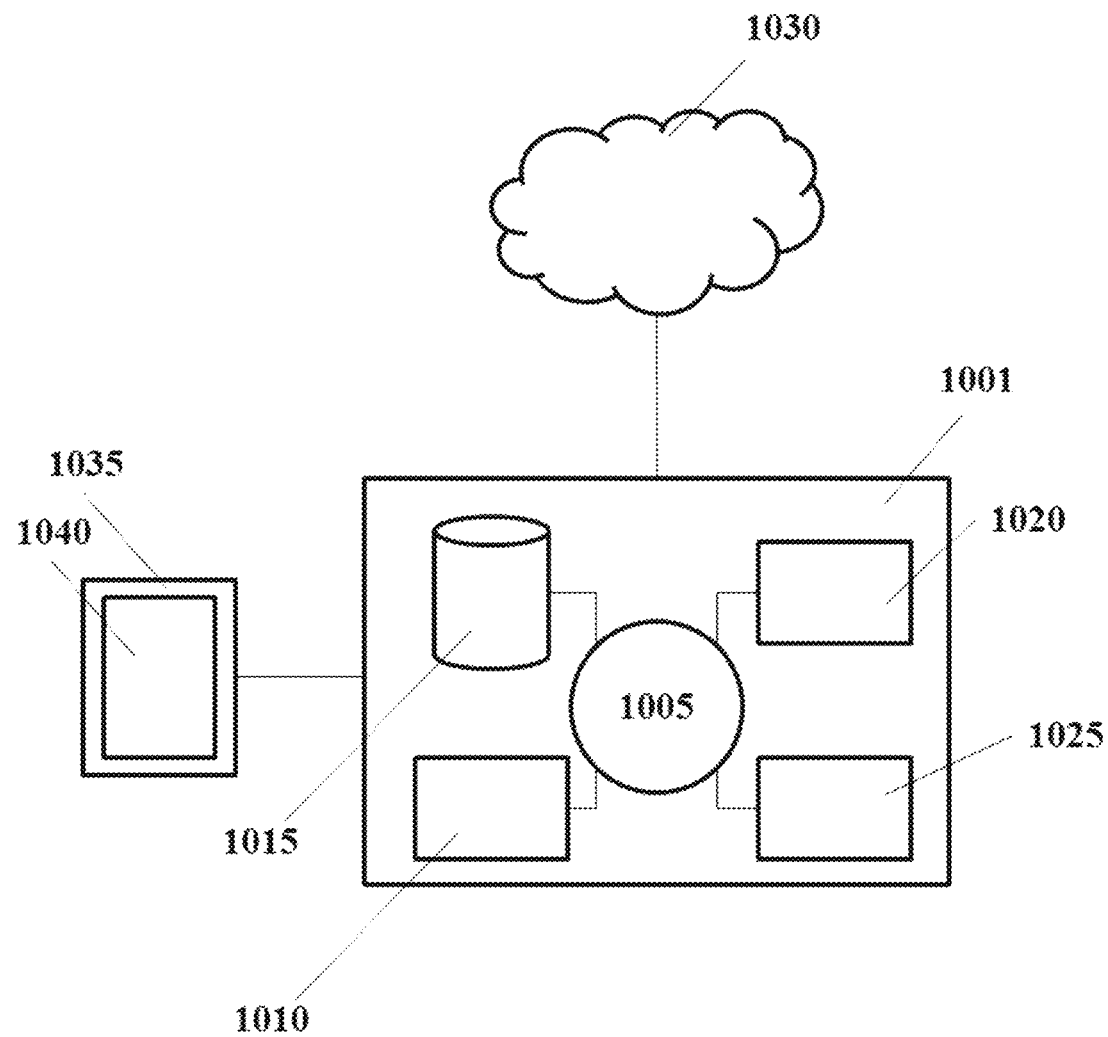
FIG. 10 shows a system programmed or otherwise configured to control or regulate one or more process parameters of an energy storage system of the present disclosure.

FIG. 10 shows a system 1000 programmed or otherwise configured to control or regulate one or more process parameters of an energy storage system of the present disclosure. The system 1000 includes a computer server ("server") 1001 that is programmed to implement methods disclosed herein. The server 1001 includes a central processing unit (CPU, also "processor" and "computer processor" herein) 1005, which can be a single core or multi core processor, or a plurality of processors for parallel processing. The server 1001 also includes memory 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The server 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the server 1001, can implement a peer-to-peer network, which may enable devices coupled to the server 1001 to behave as a client or a server. The server 1001 can be coupled to an energy storage system 1035 either directly or through the network 1030.

The storage unit 1015 can store process parameters of the energy storage system 1035. The process parameters can include charging and discharging parameters. The server 1001 in some cases can include one or more additional data storage units that are external to the server 1001, such as located on a remote server that is in communication with the server 1001 through an intranet or the Internet.

The server 1001 can communicate with one or more remote computer systems through the network 1030. In the illustrated example, the server 1001 is in communication with a remote computer system 1040. The remote computer system 1040 can be, for example, a personal computers (e.g., portable PC), slate or tablet PC (e.g., Apple® iPad, Samsung® Galaxy Tab), telephone, Smart phone (e.g., Apple® iPhone, Android-enabled device, Blackberry®), or personal digital assistant.

In some situations, the system 1000 includes a single server 1001. In other situations, the system 1000 includes multiple servers in communication with one another through an intranet and/or the Internet.

Methods as described herein can be implemented by way of machine (or computer processor) executable code (or software) stored on an electronic storage location of the server 1001, such as, for example, on the memory 1010 or electronic storage unit 1015. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010. Alternatively, the code can be executed on the second computer system 1040.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the server 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Various parameters of an energy storage system can be presented to a user on a user interface (UI) of an electronic device of the user. Examples of UI's include, without limitation, a graphical user interface (GUI) and web-based user interface. The UI (e.g., GUI) can be provided on a display of an electronic device of the user. The display can be a capacitive or resistive touch display. Such displays can be used with other systems and methods of the disclosure.

Systems, apparatuses and/or methods of the present disclosure may be combined with or modified by other systems, apparatuses and/or methods, such as, for example, those described in U.S. Pat. No. 3,663,295 ("STORAGE BATTERY ELECTROLYTE"), U.S. Pat. No. 3,775,181 ("LITHIUM STORAGE CELLS WITH A FUSED ELECTROLYTE"), U.S. Pat. No. 8,268,471 ("HIGH-AMPERAGE ENERGY STORAGE DEVICE WITH LIQUID METAL NEGATIVE ELECTRODE AND METHODS"), U.S. Patent Publication No. 2011/0014503 ("ALKALINE EARTH METAL ION BATTERY"), U.S. Patent Publication No. 2011/0014505 ("LIQUID ELECTRODE BATTERY"), and U.S. Patent Publication No. 2012/0104990 ("ALKALI METAL ION BATTERY WITH BIMETALLIC ELECTRODE"), each of which is entirely incorporated herein by reference.

Energy storage devices of the disclosure may be used in grid-scale settings or stand-alone settings. Energy storage device of the disclosure can, in some cases, be used to power vehicles, such as scooters, motorcycles, cars, trucks, trains, helicopters, airplanes, and other mechanical devices, such as robots.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. An electrochemical energy storage device, comprising:
a first electrode comprising a first material, wherein said first electrode is in electrical communication with a negative current collector;
a second electrode comprising a plurality of solid particles comprising a second material, wherein said second electrode is in electrical communication with a positive current collector, wherein said second material is reactive with said first material, wherein said second material of said plurality of solid particles has an electronic conductivity of greater than or equal to $1\times10^4$ Siemens per meter, and wherein at an operating temperature of said electrochemical energy storage device said second material is solid;
a liquid electrolyte between said first electrode and said second electrode, wherein said liquid electrolyte is capable of conducting ions of said first material.

2. The electrochemical energy storage device of claim 1, wherein said first material and said second material comprise one or more metals.

3. The electrochemical energy storage device of claim 1, wherein said operating temperature is from about 300° C. to 650° C.

4. The electrochemical energy storage device of claim 1, wherein said first material comprises calcium or a calcium alloy.

5. The electrochemical energy storage device of claim 4, wherein said first material comprises lithium, sodium, magnesium, copper, zinc, or any combination thereof.

6. The electrochemical energy storage device of claim 1, wherein said first electrode comprises a semi-solid or a liquid at said operating temperature.

7. The electrochemical energy storage device of claim 1, wherein said second material comprises antimony.

8. The electrochemical energy storage device of claim 1, wherein an individual particle of said plurality of solid particles has a dimension of at least about 0.0001 millimeters.

9. The electrochemical energy storage device of claim 1, wherein an individual particle of said plurality of solid particles has a dimension of less than or equal to about 10 millimeters.

10. The electrochemical energy storage device of claim 1, wherein said liquid electrolyte comprises a calcium salt.

11. The electrochemical energy storage device of claim 10, wherein said liquid electrolyte further comprises a salt additive.

12. The electrochemical energy storage device of claim 11, wherein said calcium salt is calcium chloride.

13. The electrochemical energy storage device of claim 11, wherein said salt additive comprises lithium chloride, sodium chloride, potassium chloride, strontium chloride, lithium bromide, sodium bromide, calcium bromide, potassium bromide, strontium bromide, barium chloride, barium bromide, or any composition thereof.

14. The electrochemical energy storage device of claim 1, further comprising an intermetallic material disposed at one or more interfaces between said plurality of solid particles of said second electrode and said liquid electrolyte upon discharge of said electrochemical energy storage device, wherein said intermetallic material comprises said first material and said second material.

15. The electrochemical energy storage device of claim 14, wherein said intermetallic material is included in an intermetallic layer at a given interface of said one or more interfaces.

16. The electrochemical energy storage device of claim 14, wherein said intermetallic material is included in a shell at least partially circumscribing a given solid particle of said plurality of solid particles.

17. The electrochemical energy storage device of claim 1, wherein said negative current collector comprises an electrically conductive current lead and/or a porous metallic structure.

18. The electrochemical energy storage device of claim 1, further comprising a separator disposed between said first electrode and said second electrode, and wherein said separator prevents said second material from contacting said first electrode.

19. The electrochemical energy storage device of claim 18, wherein said separator comprises pores of an average diameter of less than or equal to about 0.8 millimeters.

20. A method for operating an electrochemical energy storage device, comprising:
(a) activating said electrochemical energy storage device coupled to an electrical load, wherein said electrochemical energy storage device comprises:
a. a first electrode comprising a first material, wherein said first electrode is in electrical communication with a negative current collector, wherein at an operating temperature of said electrochemical energy storage device said first material is liquid;
b. a second electrode comprising a plurality of solid particles comprising a second material, wherein said second electrode is in electrical communication with a positive current collector, wherein said second material is reactive with said first material, wherein said second material of said plurality of solid particles has an electronic conductivity of greater than or equal to $1\times10^4$ Siemens per meter, and wherein at said operating temperature of said electrochemical energy storage device said second material is solid; and c. a liquid electrolyte between said first electrode and said second electrode, wherein said liquid electrolyte is capable of conducting ions of said first material; and (b) charging or discharging said electrochemical energy storage device through said electrical load, wherein (i) during charging, said liquid electrolyte conducts ions of said first material to said first electrode, and (ii) during discharging, said liquid electrolyte conducts ions of said first material away from said first electrode.

* * * * *